US012744288B2

(12) United States Patent
Lim et al.

(10) Patent No.: US 12,744,288 B2
(45) Date of Patent: Sep. 22, 2026

(54) CYLINDRICAL BATTERY, AND BATTERY PACK AND VEHICLE INCLUDING THE SAME

(71) Applicant: LG ENERGY SOLUTION, LTD., Seoul (KR)

(72) Inventors: Jae-Won Lim, Daejeon (KR); Min-Ki Jo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 490 days.

(21) Appl. No.: 18/290,555

(22) PCT Filed: Oct. 21, 2022

(86) PCT No.: PCT/KR2022/016194
§ 371 (c)(1),
(2) Date: Nov. 14, 2023

(87) PCT Pub. No.: WO2023/068884
PCT Pub. Date: Apr. 27, 2023

(65) Prior Publication Data

US 2024/0266690 A1 Aug. 8, 2024

(30) Foreign Application Priority Data

Oct. 22, 2021 (KR) ........................ 10-2021-0142184

(51) Int. Cl.
*H01M 2/08* (2006.01)
*B60L 50/60* (2019.01)
(Continued)

(52) U.S. Cl.
CPC ........... *H01M 50/538* (2021.01); *B60L 50/60* (2019.02); *H01M 50/107* (2021.01);
(Continued)

(58) Field of Classification Search
CPC ............. H01M 50/538; H01M 50/536; H01M 50/533; H01M 50/534; H01M 50/107;
(Continued)

(56) References Cited

U.S. PATENT DOCUMENTS 7,988,745 B2 * 8/2011 Okabe ................. H01M 50/538 29/623.2
2001/0007729 A1 7/2001 Kitoh et al.
(Continued)

FOREIGN PATENT DOCUMENTS

CN 1407642 A 4/2003
CN 101203969 A 6/2008
(Continued)

OTHER PUBLICATIONS

Extended European Search Report for European Application No. 22884105.2, dated Nov. 27, 2024.
(Continued)

*Primary Examiner* — Raymond Alejandro
(74) *Attorney, Agent, or Firm* — Birch, Stewart, Kolasch & Birch, LLP

(57) ABSTRACT

A cylindrical battery includes an electrode assembly; a battery housing configured to accommodate the electrode assembly through an open portion; a first current collecting plate having a support portion disposed on the electrode assembly, at least one tab coupling portion extending from the support portion, and at least one housing coupling portion extending from an end of the tab coupling portion and coupled to an inner surface of the battery housing, the first current collecting plate being located within the battery housing; a cap plate configured to cover the open portion; a terminal passing through the battery housing at a side opposite to the open portion; and a sealing spacer configured
(Continued)

to prevent movement of the electrode assembly and to enhance a sealing force of the battery housing.

24 Claims, 35 Drawing Sheets

(51) Int. Cl.
*H01M 50/107* (2021.01)
*H01M 50/152* (2021.01)
*H01M 50/184* (2021.01)
*H01M 50/186* (2021.01)
*H01M 50/533* (2021.01)
*H01M 50/536* (2021.01)
*H01M 50/538* (2021.01)

(52) U.S. Cl.
CPC ....... *H01M 50/152* (2021.01); *H01M 50/184* (2021.01); *H01M 50/186* (2021.01); *H01M 50/533* (2021.01); *H01M 50/536* (2021.01)

(58) Field of Classification Search
CPC ............. H01M 50/103; H01M 50/186; H01M 50/184; H01M 50/188; H01M 50/152; H01M 50/15
See application file for complete search history.

(56) References Cited

U.S. PATENT DOCUMENTS

2003/0049536 A1 3/2003 Wiepen
2009/0087733 A1 4/2009 Yoon et al.
2009/0208830 A1 8/2009 Okabe et al.
2009/0233157 A1 9/2009 Kim
2014/0308554 A1 10/2014 Khakhalev
2015/0287965 A1* 10/2015 Kim .................... H01M 50/581 429/82
2020/0144676 A1 5/2020 Tsuruta et al.
2020/0295318 A1 9/2020 Kim et al.
2020/0373559 A1 11/2020 Baek et al.
2020/0395587 A1 12/2020 Ryu et al.
2021/0190878 A1 6/2021 Lee et al.
2023/0118425 A1 4/2023 Kadowaki et al.
2023/0155183 A1 5/2023 Tsuruta et al.
2023/0246306 A1* 8/2023 Bai ..................... H01M 50/107 429/211
2024/0266690 A1 8/2024 Lim et al.

FOREIGN PATENT DOCUMENTS

CN 112429782 A 3/2021
CN 112909445 A 6/2021
CN 214043927 U 8/2021
CN 219350421 U 7/2023
EP 2045854 B1 7/2019
EP 4 044 334 A2 8/2022
JP 8-64198 A 3/1996
JP 2000-3726 A 1/2000
JP 2001-93579 A 4/2001
JP 2005-149909 A 6/2005
JP 2008-243811 A 10/2008
JP 2009-289683 A 12/2009
JP 2016-225014 A 12/2016
JP 2021-502545 A 1/2021
JP 2021-508162 A 2/2021
KR 10-0536253 B1 12/2005
KR 10-0786871 B1 12/2007
KR 10-2009-0099273 A 9/2009
KR 10-2016-0043724 A 4/2016
KR 10-2018-0003908 A 1/2018
KR 10-2018-0116003 A 10/2018
KR 10-2019-0040411 A 4/2019
KR 10-2020-0007562 A 1/2020
WO WO2020/096973 A1 5/2020
WO WO 2021/145438 A1 7/2021

OTHER PUBLICATIONS

International Search Report (PCT/ISA/210) issued in PCT/KR2022/016194 mailed on Feb. 3, 2023.
Indian Office Action and Search Report for Indian Application No. 202417000795, dated Jul. 14, 2026.

* cited by examiner

Conventional Art

Conventional Art

Conventional Art

New CNT

FIG. 21
Existing CNT
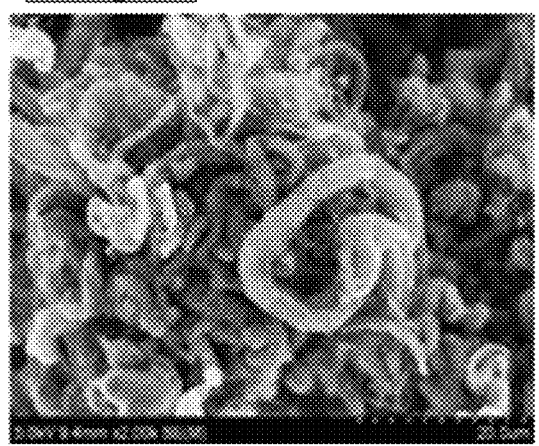
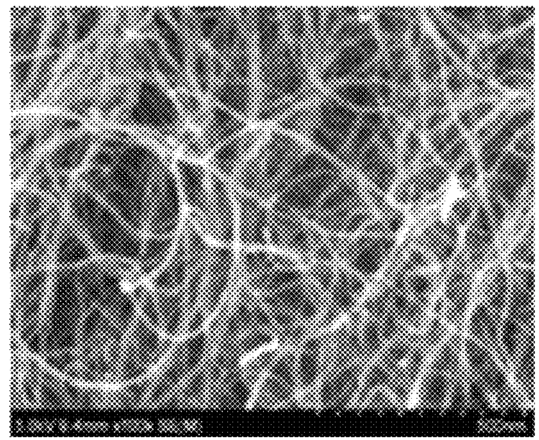
FIG. 22
| Property | | Existing CNT | New CNT |
|---|---|---|---|
| Powder | Specific Surface Area ($m^2/g$) | 200~300 | 300~450 |
| | Diameter(nm) | 10 | 3~6 |
| | Wall Number | 9~14 | 2~5 |

| | #1 | #2 | #3 | #4 | #6 |
|---|---|---|---|---|---|
| Item | Exiting CNT | New CNT | | | |
| Conductive Material Content | 0.90% | 0.45% | 0.50% | 0.55% | 0.6% |
| Solid Content | 67% | 73% | 72% | 71% | 70.5% |
| Viscosity(cp) | 7,000 | 8,500 | 6,400 | 6,900 | 6,600 |
| MP Coating Layer | 10.57 | 13.44 | 13.67 | 10.03 | 9.55 |
| MP Interface Layer | 0.095 | 0.106 | 0.070 | 0.061 | 0.053 |

CYLINDRICAL BATTERY, AND BATTERY PACK AND VEHICLE INCLUDING THE SAME

TECHNICAL FIELD

The present disclosure relates to a cylindrical battery, a current collecting plate applied thereto, and a battery pack and a vehicle including the cylindrical battery.

More specifically, the present disclosure relates to a cylindrical battery having a structure capable of preventing a force from being concentrated on a welding portion between components even when an external impact or vibration is applied during the use of a battery, and a current collecting plate applied thereto, and a battery pack and a vehicle including the cylindrical battery.

In addition, the present disclosure relates to a positive electrode for an electrochemical device having improved electrochemical characteristics, and an electrode assembly including the positive electrode.

The present application claims priority to Korean Patent Application No. 10-2021-0142184 filed on Oct. 22, 2021 in the Republic of Korea, the disclosures of which are incorporated herein by reference.

BACKGROUND ART

Secondary batteries that are easily applicable to various product groups and have electrical characteristics such as high energy density are universally applied not only to portable devices but also to electric vehicles (EVs) or hybrid electric vehicles (HEVs) driven by an electric drive source.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. Such a unit secondary battery cell has an operating voltage of about 2.5V to 4.5V. Therefore, when a higher output voltage is required, a battery pack is configured by connecting a plurality of batteries in series. In addition, a plurality of batteries may be connected in parallel to form a battery pack according to the charge/discharge capacity required for the battery pack. Accordingly, the number of batteries included in the battery pack and the form of electrical connection may be variously set according to the required output voltage and/or charge/discharge capacity.

Meanwhile, as a kind of secondary battery cell, there are known cylindrical, rectangular, and pouch-type batteries. In the case of a cylindrical battery, a separator serving as an insulator is interposed between a positive electrode and a negative electrode, and they are wound to form an electrode assembly in the form of a jelly roll, which is inserted into a battery housing together with an electrolyte to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap plate of a sealing body that seals the opening of the battery housing, and the negative electrode terminal is the battery housing.

However, according to the conventional cylindrical battery having such a structure, since current is concentrated in the strip-shaped electrode tab coupled to the uncoated portion of the positive electrode and/or the uncoated portion of the negative electrode, the current collection efficiency is not good due to large resistance and large heat generation.

For small cylindrical batteries with a form factor of 18650 or 21700, resistance and heat are not a major issue. However, when the form factor is increased to apply the cylindrical battery to an electric vehicle, the cylindrical battery may ignite while a lot of heat is generated around the electrode tab during the rapid charging process.

In order to solve this problem, there is provided a cylindrical battery (so-called tab-less cylindrical battery) in which the uncoated portion of the positive electrode and the uncoated portion of the negative electrode are designed to be positioned at the top and bottom of the jelly-roll type electrode assembly, respectively, and the current collecting plate is welded to the uncoated portion to improve the current collecting efficiency.

Next, a conventional cylindrical battery will be described in more detail with reference to FIGS. 1 to 4.

FIGS. 1 to 3 are diagrams showing a process of manufacturing a tab-less cylindrical battery. FIG. 1 shows the structure of an electrode, FIG. 2 shows a process of winding the electrode, and FIG. 3 shows a process of welding a current collecting plate to a bent surface of an uncoated portion. FIG. 4 is a sectional view showing a tab-less cylindrical battery, taken along the longitudinal direction Y.

Referring to FIGS. 1 to 4, the positive electrode 500 has a structure in which a positive electrode active material portion 520 and a positive electrode uncoated portion 530 at one long side along the winding direction are provided on a positive electrode sheet 500S, and the negative electrode 400 has a structure in which a negative electrode active material portion 420 and a negative electrode uncoated portion 430 at one long side along the winding direction are provided on the negative electrode sheet 400S. The electrode assembly 300 is manufactured by sequentially stacking the positive electrode 500 and the negative electrode 400 together with two separators 600 as shown in FIG. 2 and then winding them in one direction X. At this time, the uncoated portion 530 of the positive electrode 500 and the uncoated portion 430 of the negative electrode 400 are disposed in opposite directions.

After the winding process, the uncoated portion 530 of the positive electrode 500 and the uncoated portion 430 of the negative electrode 400 are bent toward the core. After that, the current collecting plates P, 30 are welded and coupled to the uncoated portions 530, 430, respectively.

An electrode tab is not separately coupled to the positive electrode uncoated portion 530 and the negative electrode uncoated portion 430, the current collecting plates P, 30 are connected to external electrode terminals, and a current path is formed with a large cross-sectional area along the winding axis direction of electrode assembly 300 (see arrow), which has an advantage of lowering the resistance of the battery. This is because resistance is inversely proportional to the cross-sectional area of the path through which the current flows.

However, when the form factor of the cylindrical battery increases and the magnitude of the charging current during rapid charging increases, the heat problem occurs again in the tab-less cylindrical battery.

Specifically, the conventional tab-less cylindrical battery 1 includes a battery housing 20 and a sealing body A as shown in FIG. 4. The sealing body A includes a cap plate 40, a sealing gasket G1 and a connection plate C1. The sealing gasket G1 surrounds the edge of the cap plate 40 and is fixed by a crimping portion 22. In addition, the electrode assembly 300 is fixed in the battery housing 20 by a beading portion 21 to prevent vertical movement.

Typically, the positive electrode terminal is the cap plate 40 of the sealing body A, and the negative electrode terminal is the battery housing 20. Therefore, the second current collecting plate P coupled to the uncoated portion 530 of the positive electrode 500 is electrically connected to the connection plate C1 attached to the cap plate 40 through the lead L in a strip form. In addition, the first current collecting plate 30 coupled to the uncoated portion 430 of the negative electrode 400 is electrically connected to the bottom of the battery housing 20. The insulator S covers the second current collecting plate P to prevent the battery housing 20 and the uncoated portion 530 of the positive electrode 500 having different polarities from contacting each other and causing a short circuit.

When the second current collecting plate P is connected to the connection plate C1, the lead L of a strip form is used. The lead L is separately attached to the second current collecting plate P or is manufactured integrally with the second current collecting plate P. However, since the lead L is in the form of a thin strip, its sectional area is small, and thus, when a rapid charging current flows, a lot of heat is generated. In addition, excessive heat generated from the lead L is transferred toward the electrode assembly 300 to shrink the separator 600, which may cause an internal short circuit that is a main cause of thermal runaway.

The lead L also occupies a significant installation space inside the battery housing 20. Therefore, the cylindrical battery 1 including the lead L has low space efficiency, so there is a limit in increasing the energy density.

Moreover, in order to connect the conventional tab-less cylindrical batteries 1 in series and/or parallel, it is necessary to connect a bus bar component to the cap plate 40 of the sealing body A and the bottom surface of the battery housing 20, so space efficiency is reduced. A battery pack mounted to an electric vehicle includes hundreds of cylindrical batteries I. Accordingly, the inefficiency of the electrical wiring causes considerable inconvenience in the electric vehicle assembling process and the maintenance of the battery pack. Therefore, it is required to develop a cylindrical battery having a structure in which the positive electrode terminal and the negative electrode terminals are applied in the same direction so as to simplify the electrical connection structure of a plurality of cylindrical batteries.

In the cylindrical battery having the structure as described above, a relatively large empty space may be formed between the negative electrode current collecting plate and the cap plate. In addition, an empty space may also be formed between the bottom surface of the battery housing opposite to the cap plate and the positive electrode current collecting plate.

These empty spaces may cause the jelly-roll type electrode assembly to move particularly along the vertical direction, namely the height direction of the cylindrical battery, inside the battery housing. If the jelly-roll moves up and down like this, damage may occur to the coupling portion between the current collecting plate and the electrode tab, and also damage may further occur to the coupling portion between the current collecting plate and the battery housing, the coupling portion between the current collecting plate and the electrode terminal, or the like.

Therefore, it is necessary to reduce the space in which the electrode assembly can move as much as possible. In addition, when additional components applied to reduce the space in which the electrode assembly moves is used, the complexity of the process may increase and the manufacturing cost may also increase, so there is a need to solve these problems by utilizing components that have already been applied.

Meanwhile, a conventional cylindrical battery generally has a structure in which a tab for connecting the electrode assembly and an external terminal is connected to a foil of the electrode assembly by welding. In the cylindrical battery of this structure, the current path is limited and the resistance of the electrode assembly itself is inevitably very high.

Accordingly, a method of lowering the resistance by increasing the number of taps for connecting the electrode assembly and an external terminal has been attempted, but there is a limit in lowering the resistance to a desired level and securing a sufficient current path just by increasing the number of taps in this way.

Accordingly, it is necessary to develop a new electrode assembly structure for reducing the resistance of the electrode assembly itself and to develop a current collecting plate structure suitable for the electrode assembly structure. In particular, the application of the electrode assembly and the current collecting plate of this new structure is more necessary for devices requiring a battery pack having a high output/high capacity such as, for example, an electric vehicle.

In addition, there is a need to develop a cylindrical battery having a structure in which the coupling force between the current collecting plate and the battery housing is maintained in an improved state, and a current collecting plate structure applied to the cylindrical battery.

On the other hand, by applying a conventional positive electrode active material containing secondary particles, particle breakage may occur during electrode manufacturing, and the amount of gas generated due to internal cracking during charging and discharging may increase, which may cause problems with battery stability.

To solve this problem, a positive electrode active material in the form of a single particle or pseudo-single particle having a relatively large primary particle size has been developed. However, if the positive electrode active material in the form of a single particle or pseudo-single particle is applied to a high loading electrode and then rolling is performed, there is a problem in that the electrode is broken in a state where the electrode porosity is not achieved to a target level, and there is a problem in that the resistance characteristics and charge/discharge efficiency of the lithium secondary battery are not good.

DISCLOSURE

Technical Problem

The present disclosure designed to solve the problems of the related art, and the present disclosure is directed to providing a current collecting plate having a structure suitable for an electrode assembly having a low resistance structure, and a cylindrical battery including the same.

The present disclosure is also directed to providing a current collecting plate having a structure capable of improving the coupling force of a coupling portion between the current collecting plate and the battery housing, and a cylindrical battery including the same.

The present disclosure is also directed to preventing an electrical coupling portion from being damaged due to the movement of a jelly-roll inside a battery housing.

The present disclosure is also directed to preventing the complexity of the manufacturing process and increase in manufacturing cost caused by the application of additional components by preventing the movement of the electrode assembly by utilizing previously applied components in manufacturing a cylindrical battery.

The present disclosure is also directed to providing a current collecting plate having a structure capable of improving the energy density of a cylindrical battery, and a cylindrical battery including the same.

The present disclosure is also directed to providing a current collecting plate having a structure capable of increasing the convenience of a welding process for electrical connection between a battery housing and a current collecting plate in manufacturing a cylindrical battery, thereby improving productivity, and a cylindrical battery including the same.

The present disclosure is also directed to providing a cylindrical battery including the electrode assembly of an improved structure, a battery pack including the cylindrical battery, and a vehicle including the battery pack.

The present disclosure is also directed to providing an electrode that can implement excellent thermal stability, high electrical conductivity and high rolling characteristics by applying single particles or pseudo-single particles as a positive electrode active material, and an electrode assembly including the same.

The present disclosure is also directed to providing an electrode assembly with improved energy density by including a silicon-based negative electrode active material in the negative electrode.

The present disclosure is also directed to providing an electrode assembly in which the range of the positive electrode active material portion is increased without worrying about lithium precipitation.

The present disclosure is also directed to providing a cylindrical battery capable of exhibiting excellent thermal stability even when the volume of the battery increases due to an increase in form factor.

However, the technical object to be solved by the present disclosure is not limited to the above, and other objects not mentioned herein will be clearly understood by those skilled in the art from the following disclosure.

Technical Solution

In one aspect of the present disclosure, there is provided a cylindrical battery, comprising: an electrode assembly including a first electrode tab and a second electrode tab; a battery housing configured to accommodate the electrode assembly through an open portion formed in a first side of the battery housing; a first current collecting plate having a support portion disposed on a first surface of the electrode assembly, at least one tab coupling portion extending from the support portion and coupled to the first electrode tab, and at least one housing coupling portion extending from an end of the at least one tab coupling portion and coupled to an inner surface of the battery housing, the first current collecting plate being located within the battery housing; a cap plate configured to cover the open portion of the battery housing; a battery terminal electrically connected to the second electrode tab; and a sealing spacer configured to prevent movement of the electrode assembly and to enhance a sealing force of the battery housing.

The battery housing may include a beading portion formed at an end adjacent to the open portion and inwardly press-fitted.

The at least one housing coupling portion may be coupled to the beading portion.

The at least one housing coupling portion may include a contact portion coupled to the beading portion; and a connection portion for connecting the at least one tab coupling portion and the contact portion.

The cylindrical battery may further comprise a sealing gasket provided between the battery housing and the cap plate.

The contact portion may be interposed and fixed between the beading portion of the battery housing and the sealing gasket.

In the cylindrical battery, a welding portion may be formed between the beading portion and the contact portion of the current collecting plate.

In the cylindrical battery, a boundary portion of the at least one tab coupling portion and the at least one housing coupling portion may be located inwardly of an innermost part of the beading portion.

The at least one tab coupling portion is a plurality of tab coupling portions and the at least one housing coupling portion in is a plurality of housing coupling portions.

The connection portion may include at least one bending portion in which an extension direction is changed.

The contact portion may have an arc shape extending along the beading portion.

The connection portion may have an arc shape extending along the contact portion.

The sealing spacer may include a movement preventer interposed between the first current collecting plate and the cap plate; a sealing portion interposed between the battery housing and the cap plate; and a connection portion configured to connect the movement preventer and the sealing portion.

The movement preventer may have a height corresponding to a distance between the first current collecting plate and the cap plate.

The movement preventer may be located at a center on the first surface of the electrode assembly.

The movement preventer may have a spacer hole aligned with a winding center hole of the electrode assembly.

The sealing portion may extend along a periphery of an inner circumference of the battery housing.

The connection portion may include a plurality of extension legs extending radially from the movement preventer.

The plurality of extension legs may be configured not to contact the first current collecting plate.

The plurality of extension legs may be configured not to contact the cap plate.

The connection portion may be positioned not to overlap with the at least one housing coupling portion along a height direction of the cylindrical battery.

The cylindrical battery may include a second current collecting plate coupled with the second electrode tab; and an insulator interposed between a closed portion formed at an upper end of the battery housing and the second current collecting plate.

The insulator may have a height corresponding to a distance between the second current collecting plate and the closed portion.

The active material layer of the second electrode may include a positive electrode active material containing a single particle, a pseudo-single particle, or a combination thereof, $D_{min}$, which a minimum particle size in a cumulative volume distribution of the positive electrode active material, may be 1.0 μm or more; in the volume cumulative distribution of the positive electrode active material, $D_{50}$, which is a particle size when a volume cumulative amount is 50%, may be 5.0 μm or less, and $D_{max}$, which is a maximum particle size in the volume cumulative distribution of the positive electrode active material, may be 12 μm to 17 μm.

The positive electrode active material may have a unimodal particle size distribution showing a single peak in a volume cumulative particle size distribution graph, and the particle size distribution (PSD) represented by the following formula may be 3 or less:

$$PSD = (D_{max} - D_{min})/D_{50}. \quad \text{Formula}$$

The single particle, the pseudo-single particle, or the combination thereof may be included in an amount of 95 wt % to 100 wt % based on the total weight of the positive electrode active material included in the active material layer of the second electrode.

The positive electrode active material may include a lithium nickel-based oxide containing 80 mol % or more of Ni based on the total number of moles of a transition metal.

The active material layer of the second electrode may have a porosity of 15% to 23%, and the active material layer of the first electrode may contain flake graphite in a weight ratio of 0.05 wt % to 5 wt %.

The active material layer of the second electrode may further contain carbon nanotubes.

The active material layer of the first electrode may include a silicon-based negative electrode active material and a carbon-based negative electrode active material, and the silicon-based negative electrode active material and the carbon-based negative electrode active material may be included in a weight ratio of 1:99 to 20:80.

In another aspect of the present disclosure, there is also provided a battery pack, comprising a cylindrical battery according to an embodiment of the present disclosure as above.

In another aspect of the present disclosure, there is also provided a vehicle, comprising the battery pack according to an embodiment of the present disclosure as above.

Advantageous Effects

According to the present disclosure, it is possible to greatly reduce resistance in electrically connecting the electrode assembly and the battery housing.

In addition, according to the present disclosure, it is possible to improve the coupling strength of the coupling portion between the current collecting plate and the battery housing.

Moreover, according to the present disclosure, it is possible to improve the energy density of a cylindrical battery.

In addition, according to the present disclosure, in manufacturing a cylindrical battery, it is possible to increase the convenience of a welding process for electrical connection between the battery housing and the current collecting plate, thereby improving productivity.

In addition, according to an aspect of the present disclosure, it is possible to prevent an electrical coupling portion from being damaged since the movement of a jelly-roll inside a battery housing is minimized.

According to another aspect of the present disclosure, it is possible to prevent the complexity of the manufacturing process and increase in manufacturing cost by utilizing previously applied components instead of additionally applying a component for preventing the movement of the jelly-roll.

According to still another aspect of the present disclosure, since the positive electrode includes positive electrode active material powder having $D_{min}$ of 1.0 μm or more, thermal safety of the battery may be further improved. According to the study by inventors of the present discloser, even if a single particle and/or pseudo-single particle is applied as the positive electrode active material, the effect of suppressing particle breakage and improving thermal safety after rolling is different depending on the particle size of the positive electrode active material powder. In particular, when particles with a particle diameter of less than 1.0 μm are included in the positive electrode active material powder, the line pressure increases during the rolling process, resulting in increased particle breakage and reduced thermal stability, so it is impossible to sufficiently secure thermal stability when applying a large-sized cylindrical battery. Therefore, in the present disclosure, the effect of improving thermal safety can be maximized by using a positive electrode active material powder having a minimum particle size ($D_{min}$) controlled to 1.0 μm or more.

According to still another aspect of the present disclosure, since the positive electrode contains a positive electrode active material powder whose $D_{50}$, $D_{max}$, and particle size distribution (PSD) are appropriately adjusted so as to minimize the increase in resistance due to single particle application, it is possible to implement excellent capacity characteristics and power characteristics.

According to still another aspect of the present disclosure, the conductivity of the electrode can be improved by including a single particle-based positive electrode active material coated with a conductive coating layer or by containing new CNT as a conductive material.

According to still another aspect of the present disclosure, since the positive electrode active material layer contains flake graphite, when the positive electrode active material layer is rolled, the flake graphite provides a sliding effect to the positive electrode active material, so that the rolling properties of the electrode are improved, and the electrode porosity can be lowered to the target level. Accordingly, stability, initial resistance characteristics, and charge/discharge efficiency of the cylindrical battery are improved.

According to still another aspect of the present disclosure, a higher energy density can be implemented by including a silicon-based negative electrode active material with a large capacity in the negative electrode.

According to still another aspect of the present disclosure, since a loading reduction portion with a small loading amount of the positive electrode active material is included in the positive electrode, the range of the positive electrode active material portion can be increased without worrying about lithium precipitation.

According to still another aspect of the present disclosure, compared to a conventional battery having a strip-shaped electrode tab, internal heat generation of the battery can be effectively reduced, so the thermal safety of the battery can be improved.

However, effects obtainable through the present disclosure are not limited to the above, and other effects not mentioned herein will be clearly understood by those skilled in the art from the following disclosure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 21 is a SEM photograph showing a new CNT according to an embodiment of the present disclosure.

FIG. 22 is a table showing the comparison of physical properties of the existing CNT and the new CNT.

BEST MODE

Figure 1:
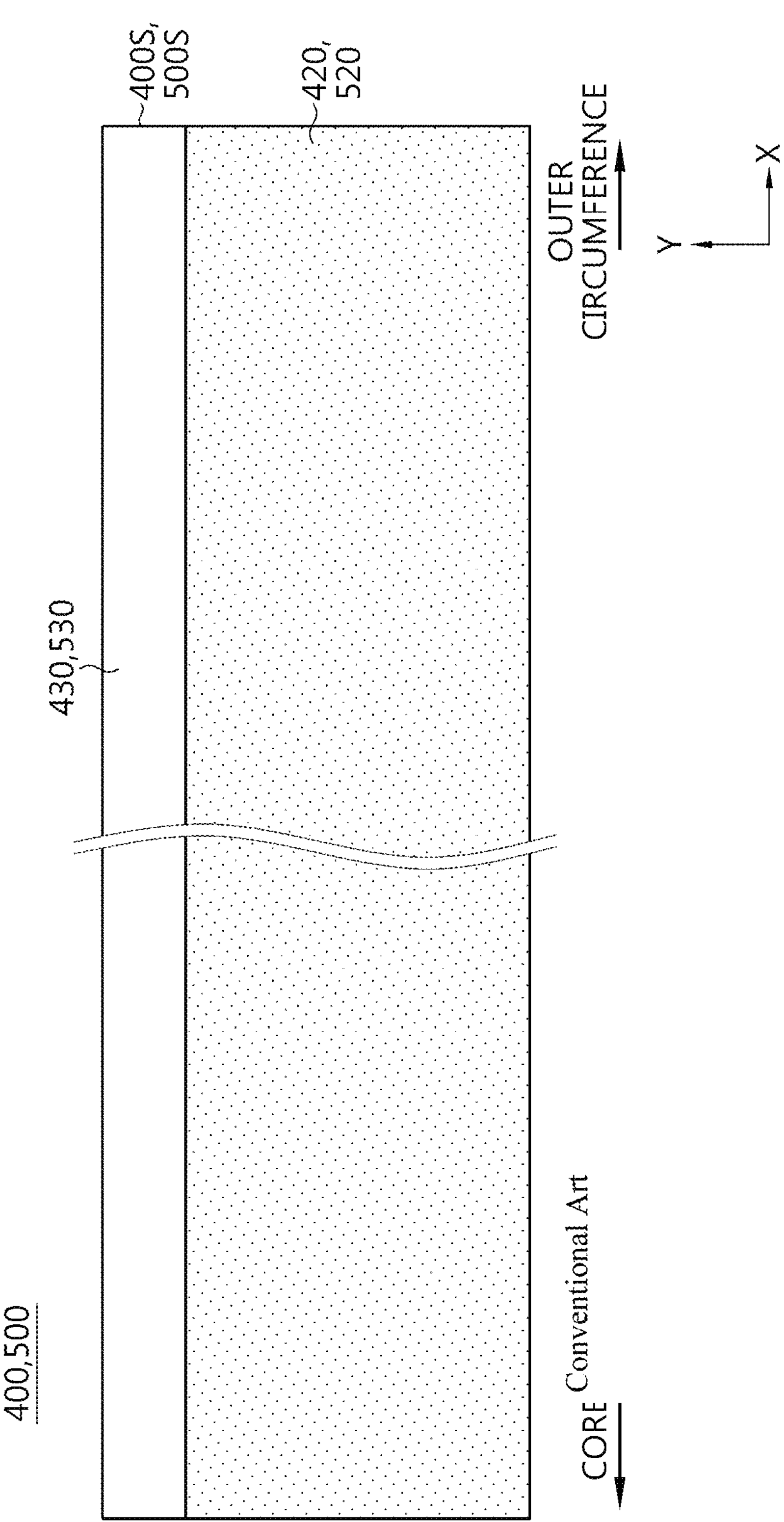
FIG. 1 is a plan view showing a structure of an electrode used for a conventional tab-less cylindrical battery cell.
Figure 2:
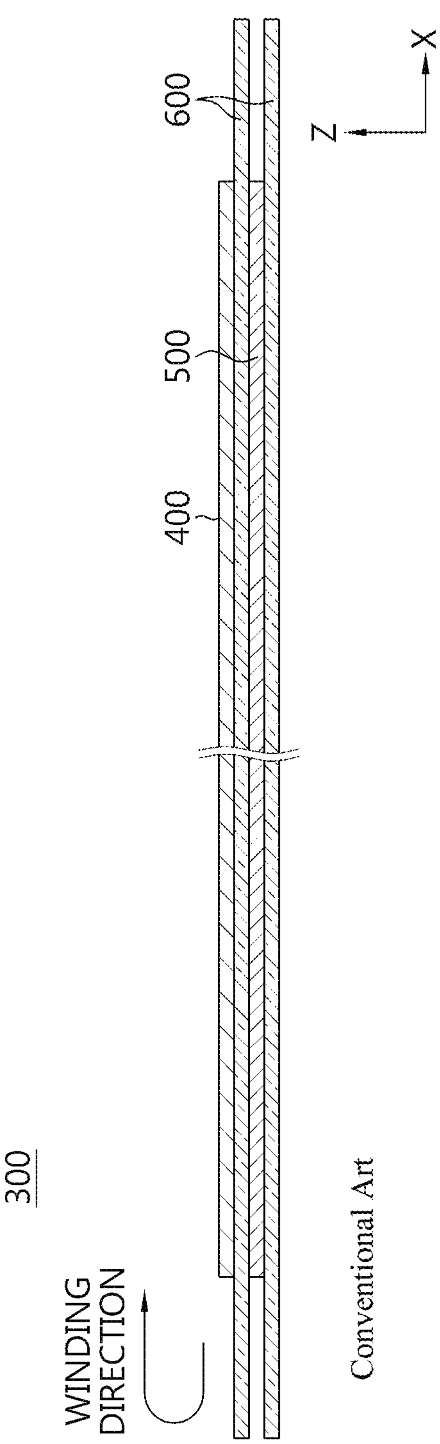
FIG. 2 is a diagram showing a process of winding an electrode assembly included in the conventional tab-less cylindrical battery cell.
Figure 3:
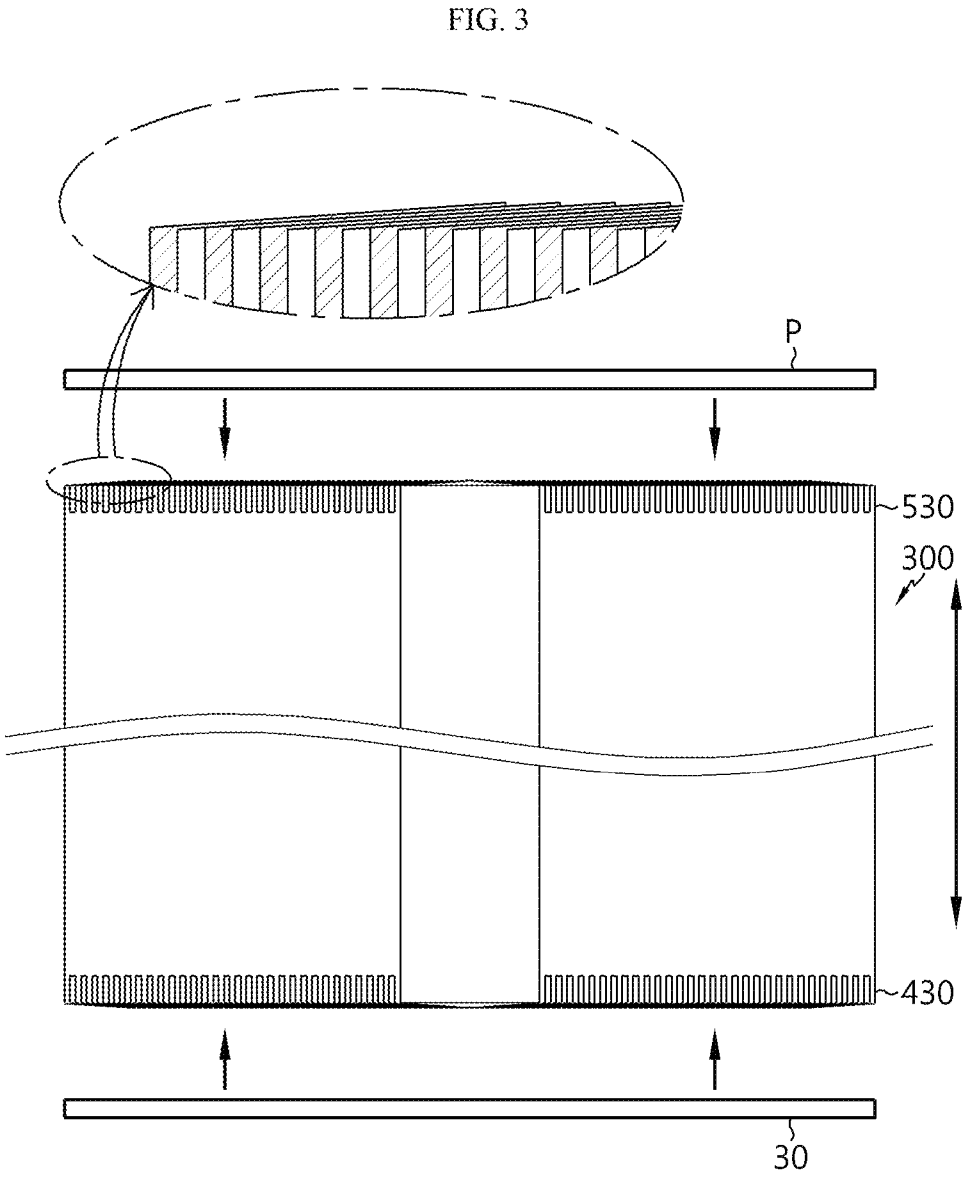
FIG. 3 is a diagram showing a process of welding a current collecting plate to a bent surface of an uncoated portion in the electrode assembly of FIG. 2.
Figure 4:
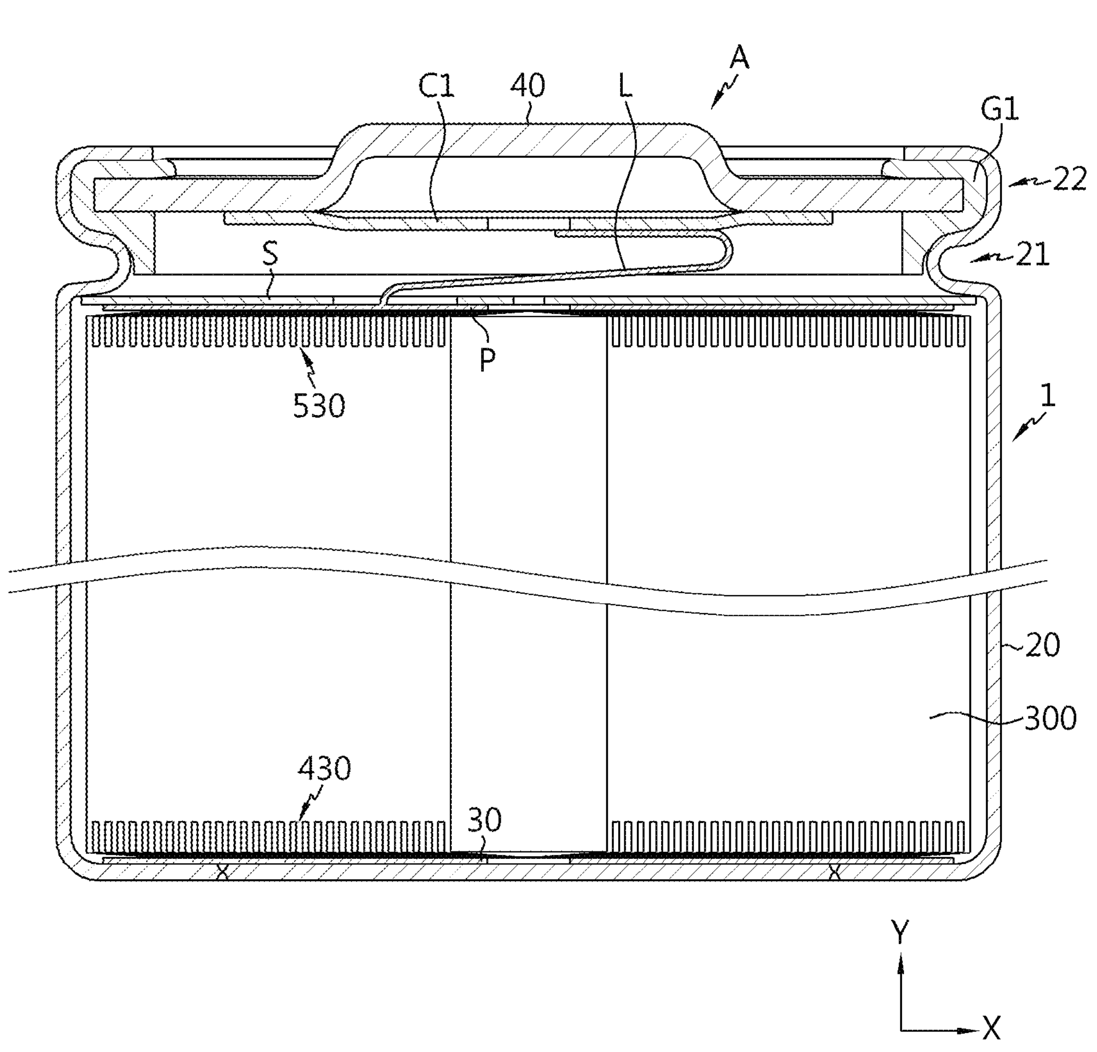
FIG. 4 is a sectional view showing a conventional tab-less cylindrical battery cell, taken along a longitudinal direction Y.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In addition, in order to help the understanding of the present disclosure, the accompanying drawings are not drawn to scale, but dimensions of some components may be exaggerated. Also, the same reference signs may be assigned to the same components in different embodiments.

Since the size and thickness of each component shown in the drawings are arbitrarily illustrated for convenience of description, the present disclosure is not necessarily limited to the drawings. In the drawings, the thickness is shown enlarged to clearly express the various layers and regions. In addition, in the drawings, for convenience of explanation, the thicknesses of some layers and regions are exaggerated.

In addition, when a part such as a layer, film, region, plate, etc. is described to be "above" or "on" another part, this includes not only the case where it is "directly on" another part, but also the case where still another part exists therebetween. Conversely, when a part is described to be "directly on" another part, it means that there is no other part therebetween. In addition, to be "above" or "on" a reference part means to be located above or below the reference part, and does not mean to be located "above" or "on" in a direction opposite to gravity.

In addition, throughout the specification, when a certain part is described to "include" a certain component, it means that it may further include other components without excluding other components, unless otherwise stated.

In addition, throughout the specification, when it is referred to as "in a planar form", it means when the target part is viewed from above, and when it is referred to as "in a cross-sectional form", it means when the target part is vertically cut and viewed from the side.

Figure 5:
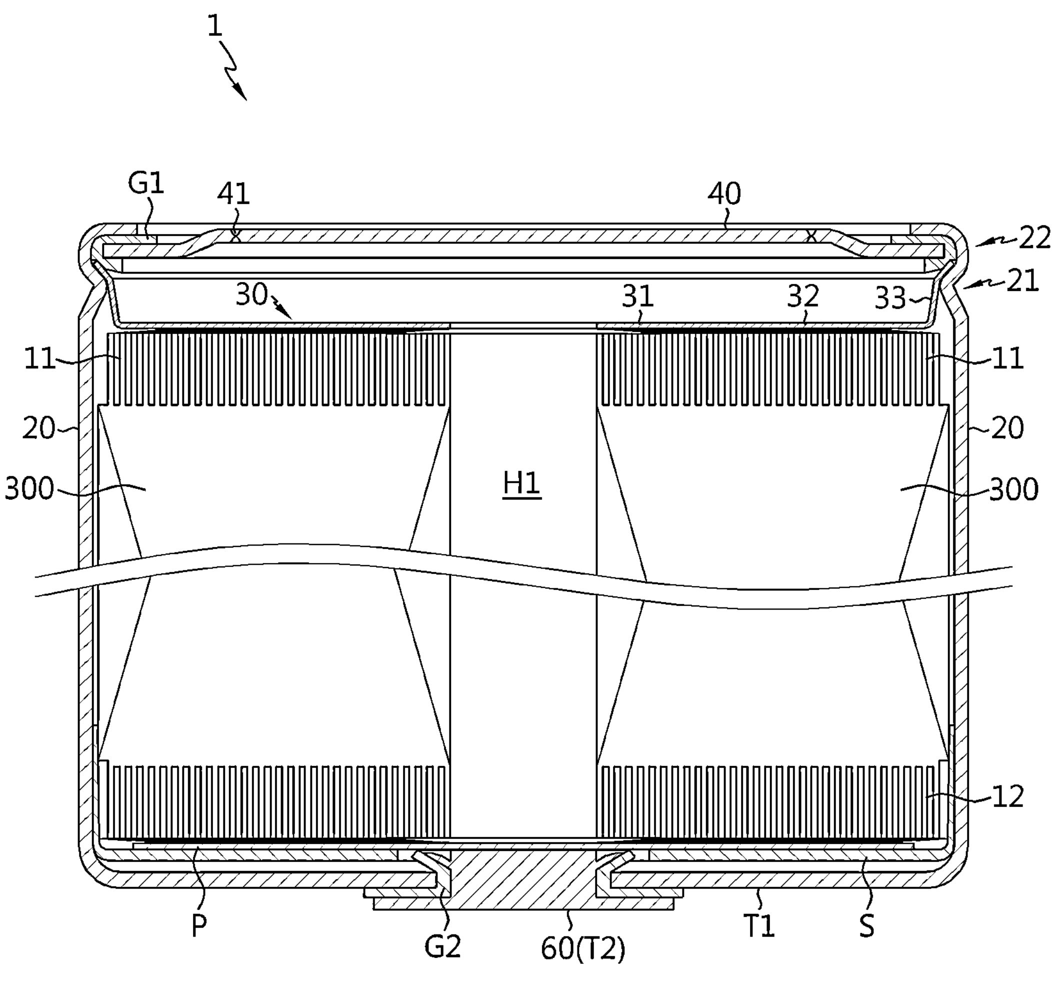
FIG. 5 is a diagram showing a part of a longitudinal cross-sectional view of a cylindrical battery according to an embodiment of the present disclosure.

Referring to FIG. 5, the cylindrical battery 1 according to an embodiment of the present disclosure includes an electrode assembly 300, a battery housing 20, a first current collecting plate 30, a cap plate 40, and a battery terminal 60. In addition, the cylindrical battery 1 may further include a sealing gasket G1 and/or an insulating gasket G2 and/or a second current collecting plate P and/or an insulator S.

The electrode assembly 300 includes a first electrode tab 11 and a second electrode tab 12. The electrode assembly 300 includes a first electrode having first polarity, a second electrode having second polarity, and a separator interposed between the first electrode and the second electrode. The first electrode is a negative electrode or a positive electrode, and the second electrode corresponds to an electrode having polarity opposite to that of the first electrode. More specifically, the electrode assembly 300 may be manufactured by winding a stack, which is formed by sequentially stacking a first electrode, a separator, a second electrode, and a separator at least once. That is, the electrode assembly 300 applied to the present disclosure may be a jelly-roll type electrode assembly. The jelly-roll type electrode assembly 300 may have a winding center hole H1 formed approximately at a center thereof and extending along a height direction (a direction parallel to the height direction of the cylindrical battery 1 shown in FIG. 5). Meanwhile, an additional separator may be provided on the outer circumference of the electrode assembly 300 to insulate the electrode assembly 300 from the battery housing 20.

The first electrode includes a first electrode current collector and a first electrode active material layer coated on one surface or both surfaces of the first electrode current collector. An uncoated portion where the first electrode active material is not coated is present at one end of the first electrode current collector in the width direction (a direction parallel to the height direction of the cylindrical battery 1 shown in FIG. 5). The first electrode uncoated portion has a shape extending from one end to the other end along the longitudinal direction of the first electrode, based on a state where the first electrode is in an unfolded state. The first electrode uncoated portion serves as the first electrode tab 11 as described above. The first electrode tab 11 is provided to an upper portion of the electrode assembly 300 accommodated in the battery housing 20 in the height direction (a direction parallel to the height direction of the cylindrical battery 1 shown in FIG. 5). The first electrode tab 11 may be, for example, a negative electrode tab.

The second electrode includes a second electrode current collector and a second electrode active material layer coated on one surface or both surfaces of the second electrode current collector. An uncoated portion to which the second electrode active material is not coated is present at the other end of the second electrode current collector in the width direction (a direction parallel to the height direction of the cylindrical battery 1 shown in FIG. 5). The second electrode uncoated portion has a shape extending from one end to the other end along the longitudinal direction of the second electrode, based on a state where the second electrode is in an unfolded state. The second electrode uncoated portion serves as the second electrode tab 12 as described above. The second electrode tab 12 is provided to the lower portion of the electrode assembly 300 accommodated in the battery housing 20 in the height direction. The second electrode tab 12 may be, for example, a positive electrode tab.

That is, the first electrode tab 11 and the second electrode tab 12 extend and protrude in opposite directions along the height direction of the cylindrical battery 1.

However, the present disclosure is not limited to this type of the electrode assembly 300.

The battery housing 20 is a substantially cylindrical receptor having an open portion formed on one side thereof, and is made of a conductive metal material. The side surface of the battery housing 20 and the lower surface thereof located on the opposite side of the open portion (lower surface based on FIG. 5) may be integrally formed. That is, the battery housing 20 may have an open upper end and a closed lower end in the height direction. The lower surface of the battery housing 20 may have a substantially flat shape. The battery housing 20 accommodates the electrode assembly 300 through the open portion formed on one side in the height direction. The battery housing 20 may also accommodate an electrolyte through the open portion. However, the present disclosure is not limited to this type of the battery housing 20.

The battery housing 20 is electrically connected to the electrode assembly 300. The battery housing 20 is connected to the first electrode tab 11 of the electrode assembly 300. Therefore, the battery housing 20 electrically has the same polarity as the first electrode tab 11.

The battery housing 20 may include a beading portion 21 formed at an end adjacent to the open portion and press-fitted toward the inner side. The battery housing 20 may have a beading portion 21 formed at an upper end thereof. The battery housing 20 may further include a crimping portion 22 formed higher than the beading portion 21. The beading portion 21 has a shape in which the periphery of the outer circumferential surface of the battery housing 20 is press-fitted to a predetermined depth. The beading portion 21 is formed on the upper portion of the electrode assembly 300. The inner diameter of the battery housing 20 in a region where the beading portion 21 is formed is smaller than the diameter of the electrode assembly 300.

Figure 6:
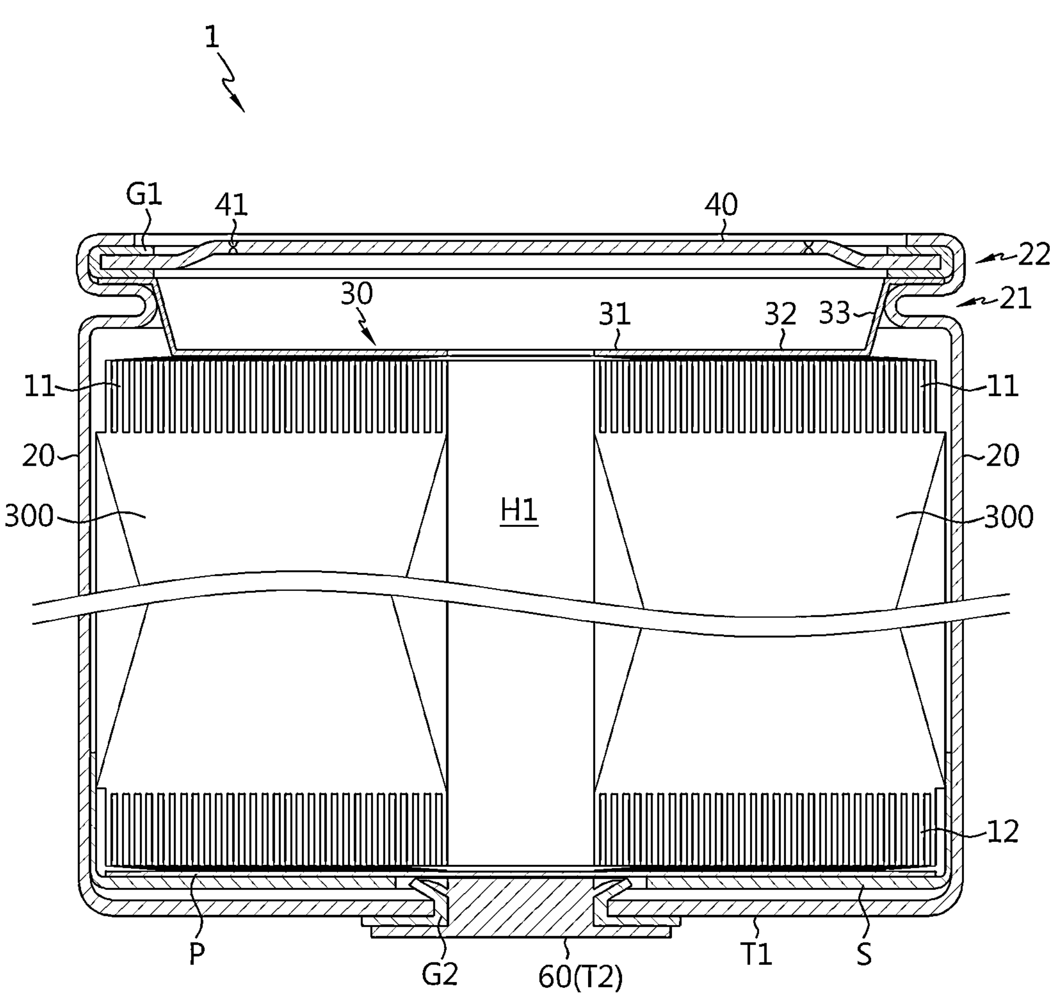
FIG. 6 is a diagram showing part of a longitudinal cross-sectional view of a cylindrical battery according to another embodiment of the present disclosure.
Figure 7:
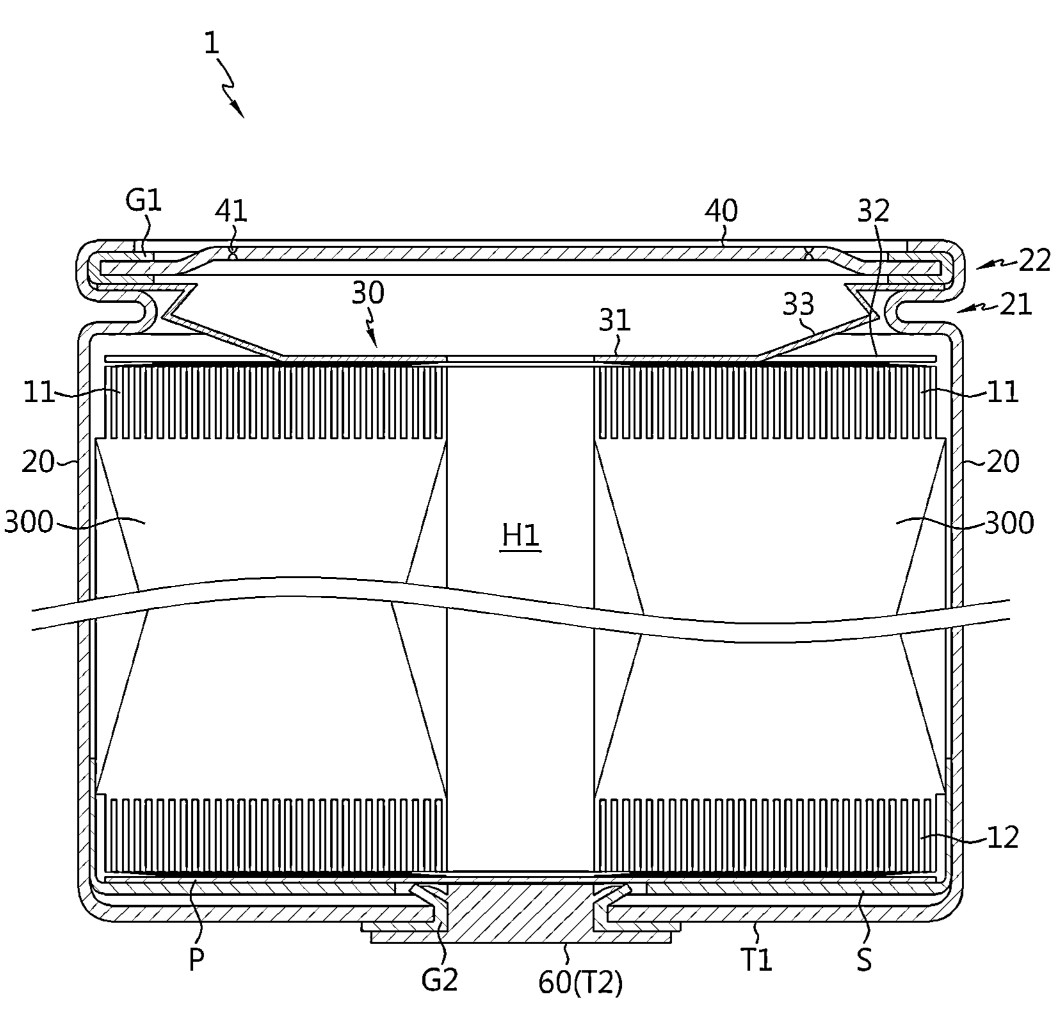
FIG. 7 is a diagram showing part of a longitudinal cross-sectional view of a cylindrical battery according to still another embodiment of the present disclosure.

The beading portion 21 provides a support surface on which the cap plate 40 may be seated. In addition, the beading portion 21 may provide a support surface on which at least a part of the edge circumference of the first current collecting plate 30, explained later, may be seated and coupled. That is, on the upper surface of the beading portion 21, at least a part of the edge periphery of the first current collecting plate 30 of the present disclosure and/or the edge periphery of the cap plate 40 of the present disclosure may be seated. As shown in FIGS. 6 and 7, in order to stably support at least a part of the edge periphery of the first current collecting plate 30 and/or the edge periphery of the cap plate 40, at least a part of the upper surface of the beading portion 21 may have an extended form along a direction substantially parallel to the lower surface of the battery housing 20, that is, along a direction substantially perpendicular to the sidewall of the battery housing 20.

The crimping portion 22 is formed on the upper portion of the beading portion 21. The crimping portion 22 has an extended and bent shape to surround an edge periphery of the cap plate 40 disposed on the upper portion of the beading portion 21. Due to the shape of the crimping portion 22, the cap plate 40 is fixed on the beading portion 21. Of course, it is also possible that the crimping portion 22 is omitted and the cap plate 40 is fixed while covering the open portion of the battery housing 20 through another fixing structure.

Next, with reference to FIGS. 7 and 8, the first current collecting plate 30 according to an embodiment of the present disclosure will be described in detail.

First, referring to FIG. 7, the first current collecting plate 30 according to an embodiment of the present disclosure is accommodated inside the battery housing 20, electrically connected to the electrode assembly 300, and also electrically connected to the battery housing 20. That is, the first current collecting plate 30 electrically connects the electrode assembly 300 and the battery housing 20.

The first current collecting plate 30 includes a support portion 31 disposed on one surface of the electrode assembly 300, at least one tab coupling portion 32 extending from the support portion 31 and coupled to the first electrode tab 11, and at least one housing coupling portion 33 extending from the tab coupling portion 32 and coupled to the inner surface of the battery housing 20, and is located within the battery housing.

The support portion 31 and the at least one tab coupling portion 32 are disposed on the upper portion of the electrode assembly 300, and may be located below the beading portion 21 when the beading portion 21 is formed in the battery housing 20.

The support portion 31 may include a first current collecting plate hole H2 formed at a position corresponding to the winding hole H1 formed approximately at the center of the electrode assembly 300. The winding hole H1 and the first current collecting plate hole H2 communicating with each other may function as a passage for insertion of a welding rod for welding between the battery terminal 60, explained later, and a second current collecting plate P or welding between the battery terminal 60 and a lead tab (not shown), or for laser irradiation.

The support portion 31 may have a substantially circular plate shape. For example, referring to FIG. 8, the support portion 31 may have a ring-shaped plate shape having a first current collecting plate hole H2 at its center.

The at least one tab coupling portion 32 may have a shape extending substantially radially toward the sidewall of the battery housing 20 from the support portion 31. The tab coupling portion 32 may be provided in plurality, for example. For example, referring to FIG. 8, the plurality of tab coupling portions 32 may be spaced apart from each other along the circumference of the support portion 31. As the cylindrical battery 1 of the present disclosure includes a plurality of tab coupling portions 32 in this way, a coupling area with the first electrode tab 11 may be increased. Accordingly, the coupling force between the first electrode tab 11 and the tab coupling portion 32 may be secured and electrical resistance may be reduced.

An end in the longitudinal direction of the tab coupling portion 32 may be located inner than an innermost portion of the beading portion 21 formed in the battery housing 20. More specifically, the boundary portion of the tab coupling portion 32 and the housing coupling portion 33 may be located inner in a direction toward the winding hole H1 than the innermost portion of the beading portion 21 formed in the battery housing 20. According to this structure, it is possible to prevent damage to the coupling portion between parts that may occur due to excessive bending of the first current collecting plate 30 to place the end of the housing coupling portion 33 on the beading portion 21.

Meanwhile, in order to secure the coupling force and reduce electrical resistance by increasing the coupling area between the first current collecting plate 30 and electrode assembly 300, not only the tab coupling portion 32 but also the support portion 31 may be coupled with the first electrode tab 11. An end of the first electrode tab 11 may be formed in a bent shape parallel to the tab coupling portion 32. When the end of the first electrode tab 11 is formed and coupled to the tab coupling portion 32 in a state parallel to the tab coupling portion 32 in this way, the coupling area may be increased to obtain an effect of improving the coupling force and reducing the electrical resistance, and the energy density may be improved by minimizing the total height of the electrode assembly 300.

The housing coupling portion 33 may extend from an end of the tab coupling portion 32 and be coupled to an inner surface of the battery housing 20. For example, the housing coupling portion 33 may have a shape extending from the end of the tab coupling portion 32 toward a sidewall of the battery housing 20. The housing coupling portion 33 may be provided in plurality, for example. For example, referring to FIG. 8, the plurality of housing coupling portions 33 may be spaced apart from each other along the circumference of the support portion 31, respectively. Referring to FIG. 5, the housing coupling portion 33 may be coupled to the beading portion 21, among the inner surface of the battery housing 20. As shown in FIGS. 6 and 7, as the upper surface of the beading portion 21 extends in a direction substantially parallel to the lower surface of the battery housing 20, that is, in a direction substantially perpendicular to the sidewall of the battery housing 20, and the housing coupling portion 33 also extends in the same direction, the housing coupling portion 33 may make stable contact to the beading portion 21. In addition, since the housing coupling portion 33 is in stable contact with the beading portion 21, welding between the two components may be performed smoothly, thereby improving the coupling force between the two components and minimizing the increase in resistance at the coupling portion. In addition, by the structure in which the first current collecting plate 30 is coupled to the beading portion 21 of the battery housing 20 instead of the inner surface of the cylindrical portion of the battery housing 20, the distance between the first current collecting plate 30 and the beading portion 21 may be reduced. Therefore, the dead space inside the battery housing 20 is minimized, and the energy density of the cylindrical battery 1 may be improved.

Figure 8:
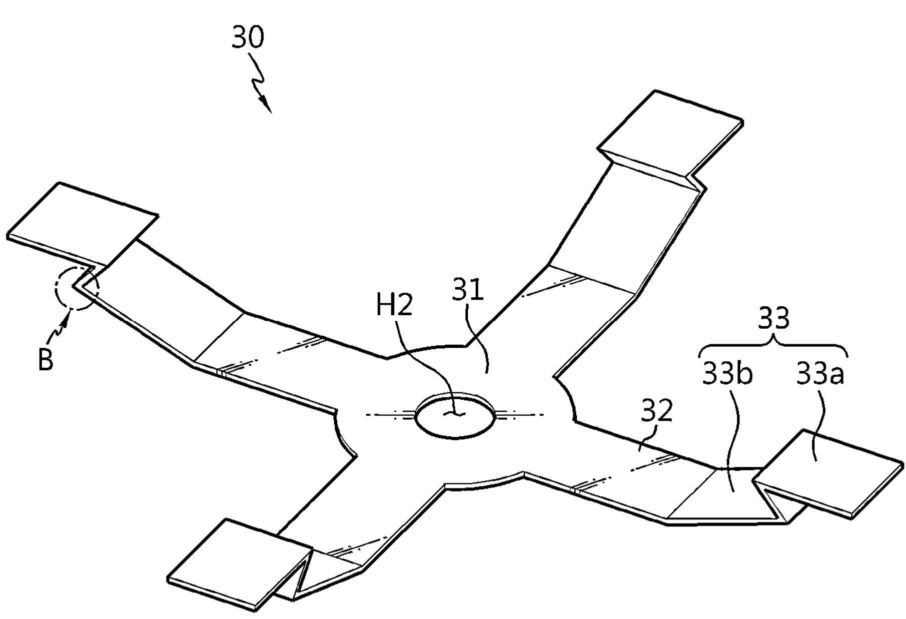
FIG. 8 is a diagram for explaining a first current collecting plate included in the cylindrical battery of FIG. 3.

Referring to FIGS. 7 and 8, the housing coupling portion 33 includes a contact portion 33*a* coupled to the inner surface of the battery housing 20 and a connection portion 33*b* for connecting between the tab coupling portion 32 and the contact portion 33*a* to each other.

The contact portion 33*a* is coupled to the inner surface of the battery housing 20. In the case where the beading portion 21 is formed in the battery housing 20, the contact portion 33*a* may be coupled to the beading portion 21 as described above. In this case, as described above, for stable contact and coupling, both the beading portion 21 and the contact portion 33*a* may have a shape extending in a direction substantially parallel to the lower surface of the battery housing 20, that is, in a direction substantially perpendicular to the sidewall of the battery housing 20.

Referring to FIG. 7, the connection portion 33*b* may include at least one bending portion B in which an extension direction is changed between the support portion 31 and the contact portion 33*a*. That is, the connection portion 33*b* may have a spring-like structure or bellows-like structure capable of contraction and expansion within a certain range. In this structure of the connection portion 33*b*, even if the height distribution of the electrode assembly 300 exists within a certain range, the contact portion 33*a* may be closely adhered on the beading portion 21 in the process of accommodating the electrode assembly 300 to which the first current collecting plate 30 is coupled within the battery housing 20.

In the drawings of the present disclosure, only the case where one bending portion B is provided is illustrated, but the present disclosure is not limited thereto, and a plurality of bending portions B may be provided.

For example, the vertical distance (D) between the contact portion 33*a* and the support portion 31 in a state where no external force is applied to the first current collecting plate 30 and there is no deformation is preferably equal to the vertical distance between the upper surface of the beading portion 21 and the support portion 31 when the electrode assembly 300 to which the first current collecting plate 30 is coupled is seated in the battery housing 20 or smaller within the extendable range of the connection portion 33*b*. If the connection portion 33*b* is configured to satisfy the above conditions, when the electrode assembly 300 to which the first current collecting plate 30 is coupled is seated in the battery housing 20, the contact portion 33*a* may naturally come into close contact with the beading portion 21.

Moreover, even if the electrode assembly 300 moves up and down due to vibration and/or shock occurring in the use of the cylindrical battery 1 (see FIG. 5), the structure capable of contraction and expansion of the connection portion 33*b* may alleviate the impact caused by the movement of the electrode assembly 300.

Meanwhile, when the connection portion 33*b* includes only one bending portion B, the bending portion B may protrude in a direction toward the winding center of the electrode assembly 300, unlike shown in the drawing. The bending direction of the connection portion 33*b* is to prevent damage to the coupling portion between the first current collecting plate 30 and the electrode assembly 300 and/or the coupling portion between the first current collecting plate 30 and the battery housing 20 during the sizing process. The sizing process is a compression process for reducing the height occupied by the region of the beading portion 21 of the battery housing 20 in order to reduce the total height of the cylindrical battery 1 in manufacturing the cylindrical battery 1. As a result of checking the degree of damage to the welding portion after the sizing process by selecting whether or not to form the bending portion B and changing the protruding direction of the bending portion B, it has been found that almost no damage has occurred in the cylindrical battery 1 having a structure in which the connection portion 33*b* is bent so that the bending portion B protrudes toward the center of the cylindrical battery 1.

Figure 9:
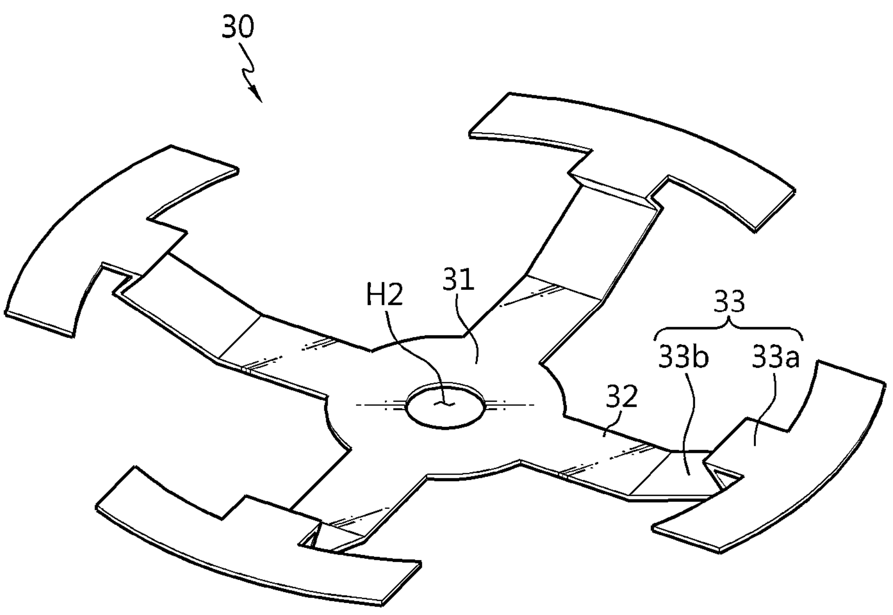
FIG. 9 is a diagram for explaining a first current collecting plate according to another embodiment of the present disclosure.

Next, referring to FIG. 9, a first current collecting plate 30 according to another embodiment of the present disclosure is shown. The first current collecting plate 30 according to another embodiment of the present disclosure has a difference only in the shape of the contact portion 33*a* compared to the first current collecting plate 30 of FIG. 8 described above, and the structure of the first current collecting plate 30 described above may be applied in substantially the same way.

Referring to FIG. 9, at least a part of the contact portion 33*a* may have a shape extending along the inner circumferential surface of the battery housing 20. For example, the contact portion 33*a* may have an arc shape extending along the beading portion 21. In addition, although not shown in the drawing, in order to maximize the contact area, the first current collecting plate 30 may be configured so that the sum of the extended lengths of the contact portions 33*a* of the at least one housing coupling portion 33 is approximately equal to the inner circumference of the battery housing 20. Accordingly, it is possible to have an effect of improving the coupling force and reducing the electrical resistance due to maximized coupling area.

Figure 10:
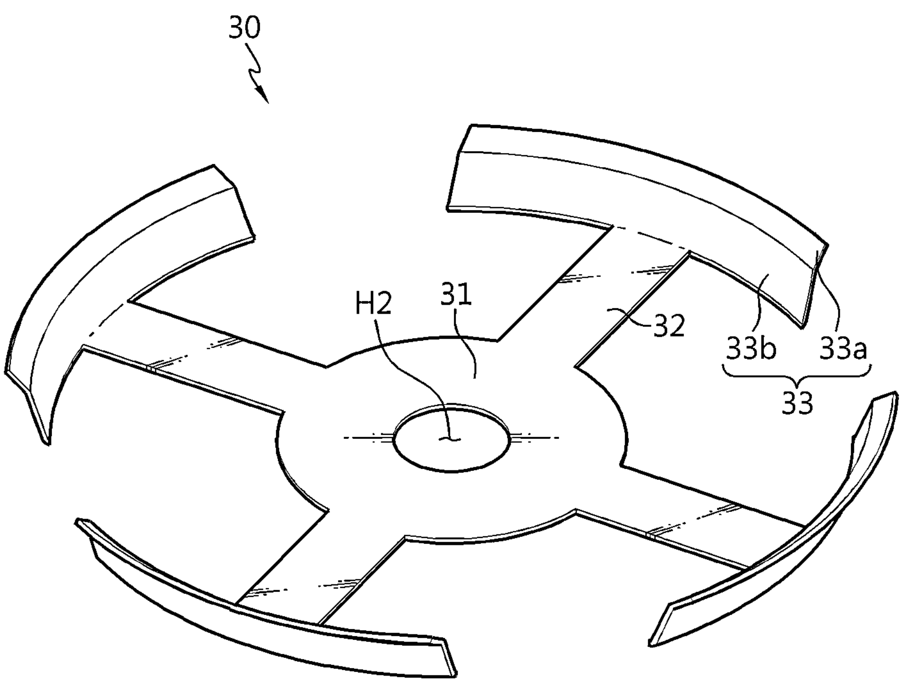
FIG. 10 is a diagram for explaining a first current collecting plate according to still another embodiment of the present disclosure.
Figure 11:
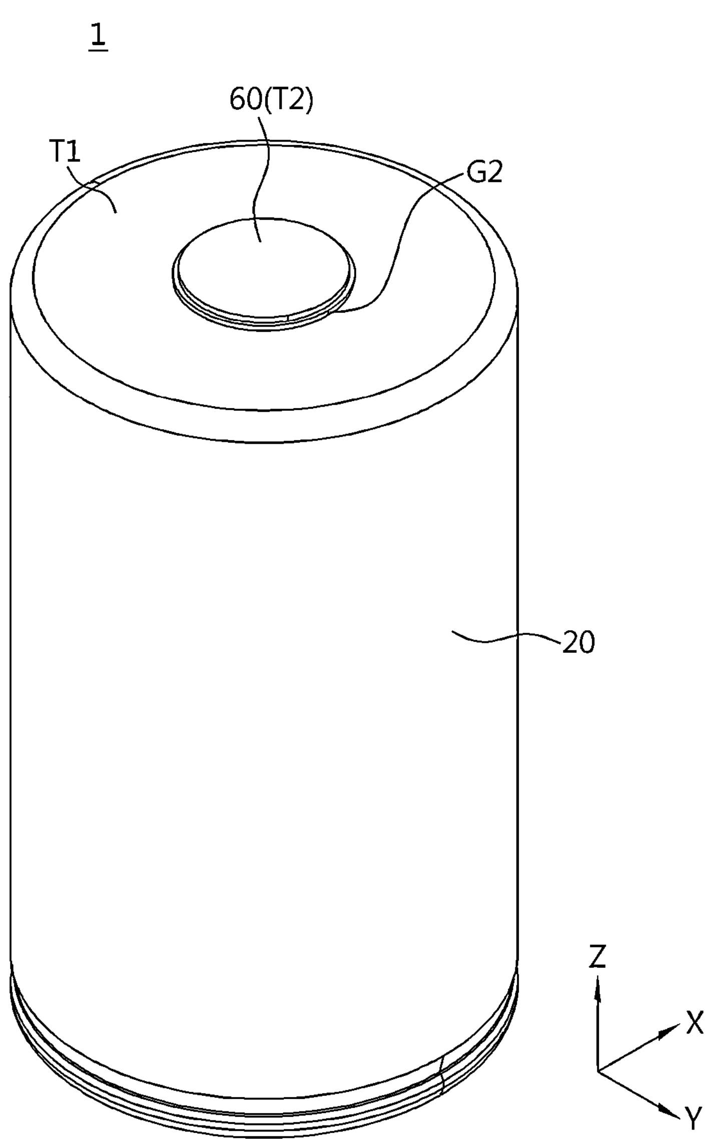
FIG. 11 is a perspective view showing the appearance of a cylindrical battery according to an embodiment of the present disclosure.

Next, referring to FIG. 10, a first current collecting plate 30 according to still another embodiment of the present disclosure is shown. Compared to the first current collecting plate 30 of FIG. 9, the first current collecting plate 30 according to still another embodiment of the present disclosure has only a difference in the shape of the connection portion 33*b*, and the structure of the first current collecting plate 30 described above may be applied in substantially the same way.

Referring to FIG. 10, at least a part of the connection portion 33*b* may extend along the inner circumferential surface of the battery housing 20. For example, the contact portion 33*a* may have an arc shape extending along the beading portion 21 of the battery housing, and the connection portion 33*b* may have an arc shape extending along the contact portion 33*a*. According to this structure, the area of the first current collecting plate 30 may be additionally increased compared to the first current collecting plate 30 shown in FIG. 9, thereby maximizing the effect of reducing electrical resistance.

Meanwhile, referring to FIG. 10, the first current collecting plate 30 may not include a bending portion B, unlike the first current collecting plate 30 shown in FIG. 8 or 9. If the bending portion B is not provided in this way, raw materials required for manufacturing the first current collecting plate 30 may be saved. Accordingly, the production cost for the first current collecting plate 30 may be saved.

Referring to FIG. 5, the cap plate 40 covers the open portion formed on one side of the battery housing 20. When the battery housing 20 of the present disclosure includes the beading portion 21, the cap plate 40 may be seated on the beading portion 21 formed in the battery housing 20. In addition, when the battery housing 20 of the present disclosure includes the crimping portion 22, the cap plate 40 may be fixed by the crimping portion 22. In this case, a sealing gasket G1 may be interposed between the battery housing 20 and the cap plate 40 to improve the fixing force and the sealing property of the battery housing 20. However, in the present disclosure, the cap plate 40 is not a component that should function as a current passage. Therefore, as long as it is possible to firmly fix the battery housing 20 and the cap plate 40 through welding or fixing by applying other components and to secure the sealing property of the open portion of the battery housing 20, the application of the sealing gasket G1 is not essential.

The cap plate 40 may be made of, for example, a metal material to secure rigidity. In the cylindrical battery 1 of the present disclosure, the cap plate 40 may not have polarity even if it is made of a metal material having conductivity. Not having polarity may mean that the cap plate 40 is electrically insulated from the battery housing 20 and the battery terminal 60, explained later. Therefore, the cap plate 40 does not function as a positive electrode terminal or a negative electrode terminal. Therefore, the cap plate 40 does not need to be electrically connected to the electrode assembly 300 and the battery housing 20, and the material does not necessarily have to be a conductive metal.

Meanwhile, in a case where the sealing gasket G1 is applied as an example, the sealing gasket G1 may have a substantially ring shape surrounding the cap plate 40. The sealing gasket G1 may cover the upper, lower and side surfaces of the cap plate 40 at the same time. A radial length of a region of the sealing gasket G1 covering the lower surface of the cap plate 40 may be smaller than or equal to a radial length of a region of the sealing gasket G1 covering the upper surface of the cap plate 40. If the radial length of the region of the sealing gasket G1 covering the lower surface of the cap plate 40 is too long, in the process of vertically compressing the battery housing 20, the sealing gasket G1 may pressurize the first current collecting plate 30, which may cause damage to the first current collecting plate 30 or the battery housing 20. Therefore, it is necessary to keep the radial length of the region of the sealing gasket G1 covering the lower surface of the cap plate 40 to be small at a certain level. For example, as shown in FIG. 5, the radial length of the region of the sealing gasket G1 covering the lower surface of the cap plate 40 may be smaller than the radial length of the region of the sealing gasket G1 covering the upper surface of the cap plate 40. Alternatively, as shown in FIGS. 6 and 7, the radial length of the region of the sealing gasket G1 covering the lower surface of the cap plate 40 may be equal to the radial length of the region of the sealing gasket G1 covering the upper surface of the cap plate 40.

Meanwhile, the contact portion 33*a* may be interposed and fixed between the beading portion 21 and the sealing gasket G1. That is, in a state in which the contact portion 33*a* is interposed between the beading portion 21 and the sealing gasket G1, the contact portion 33*a* may be fixed due to the crimping force of the crimping portion 22.

Alternatively, a welding portion may be formed between the beading portion 21 and the contact portion 33*a*. For example, the contact portion 33*a* may not be securely fixed by only the crimping force. Alternatively, when the sealing gasket G1 is shrunk by heat or the crimping portion 22 is deformed due to external impact, there is a possibility that the coupling force between the current collecting plate and the battery housing 20 is deteriorated. Accordingly, the first current collecting plate 30 may be fixed to the battery housing 20 through welding in a state where the contact portion 33*a* is placed on the beading portion 21. After that, the cap plate surrounded by the sealing gasket G1 may be placed on the top of the contact portion 33*a* and the crimping portion 22 may be formed, thereby completing the cylindrical battery 1. At this time, as a welding method, for example, laser welding, resistance welding, ultrasonic welding, or the like are possible, but the welding method is not limited thereto.

Meanwhile, the cap plate 40 may include a venting portion 41 formed to prevent an increase in internal pressure due to gas generated inside the battery housing 20. The venting portion 41 is formed on a part of the cap plate 40 and corresponds to an area that is structurally weaker than the surrounding area so that it can be easily ruptured when internal pressure is applied. The venting portion 41 may be a region having a smaller thickness than the surrounding region. Therefore, when an abnormality occurs in the cylindrical battery 1 and the internal pressure of the battery housing 20 increases to a certain level or above, the venting portion 41 is ruptured so that the gas generated inside the battery housing 20 may be discharged. The venting portion 41 may be formed by partially reducing the thickness of the battery housing 20 by notching one side or both sides of the cap plate 40, for example.

The battery terminal 60 is electrically connected to the second electrode tab 12. The battery terminal 60 may be electrically connected to the second electrode tab 12 of the electrode assembly 300 through the battery housing 20 on the opposite side of the open portion of the battery housing 20. The battery terminal 60 may pass through the approximate center of the lower surface of the battery housing 20. A part of the battery terminal 60 may be exposed to the outside of the battery housing 20 and the remaining part may be located inside the battery housing 20. The battery terminal 60 may be electrically connected to the electrode assembly 300 by, for example, being coupled with the second current collecting plate P coupled to the second electrode tab 12, explained later, or being coupled to a lead tab (not shown) coupled to the second electrode tab 12. Therefore, the battery terminal 60 has the same polarity as the second electrode of electrode assembly 300 and may function as the second electrode terminal T2. When the second electrode tab 12 is a positive electrode tab, the battery terminal 60 may function as a positive electrode terminal.

Considering the polarity and function of the battery terminal 60, the battery terminal 60 must remain an insulated state from the battery housing 20 having the opposite polarity. To this end, an insulating gasket G2 may be applied between the battery terminal 60 and the battery housing 20. Alternatively, a part of the surface of the battery terminal 60 may be coated with an insulating material to implement insulation. Alternatively, the battery terminal 60 and the battery housing 20 may be disposed to be spaced apart from each other so as not to contact each other, but the battery terminal 60 may be structurally firmly fixed. Alternatively, some of the above methods may be applied together.

That is, the cylindrical battery 1 of the present disclosure has a structure in which a pair of electrode terminals 60, T1 are located in the same direction. Therefore, when electrically connecting a plurality of cylindrical batteries 1, it is possible to dispose electrical connection components such as bus bars only on one side of the cylindrical batteries 1. This may lead to simplification of the battery pack structure and improvement of energy density. In addition, the cylindrical battery 1 has a structure in which one surface of the battery housing 20 having a substantially flat shape can be used as the first electrode terminal T1, so that it is possible to sufficiently secure the bonding area when bonding electrical connection components such as bus bars to the first electrode terminal T1. Accordingly, in the cylindrical battery 1, sufficient bonding strength between the electrical connection components and the first electrode terminal T1 may be secured, and resistance at the bonding site may be reduced to a desired level.

Meanwhile, when the insulating gasket G2 is applied for electrical insulation and riveting is applied to fix the battery terminal 60, the insulating gasket G2 may be deformed together when riveting the battery terminal 60 and thus be bent toward the inner surface of the closed portion at the upper portion of the battery housing 20. When the insulating gasket G2 is made of a resin material, the insulating gasket G2 may be coupled to the battery housing 20 and the battery terminal 60 by thermal fusion. In this case, airtightness at the coupling interface between the insulating gasket G2 and the battery terminal 60 and the coupling interface between the insulating gasket G2 and the battery housing 20 may be enhanced.

In the present disclosure, the entire surface of the battery housing 20 may function as a first electrode terminal T1. For example, when the first electrode tab 11 is a negative electrode tab, the first electrode terminal T1 may be a negative electrode terminal. The cylindrical battery 1 according to the present disclosure has a structure in which the battery terminal 60 exposed on the lower surface located on the opposite side of the open portion of the battery housing 20 and the rest of the area of the lower surface of the battery housing 20 except for the area occupied by the battery terminal 60 may be used as the second electrode terminal T2 and the first electrode terminal T1, respectively. Therefore, according to the cylindrical battery 1 of the present disclosure, in electrically connecting a plurality of cylindrical batteries 1, both the positive electrodes and the negative electrodes may be connected in one direction, thereby simplifying the electrical connection structure. In addition, since the cylindrical battery 1 according to the present disclosure has a structure in which most of the lower surface located on the opposite side of the open portion of the battery housing 20 can be used as an electrode terminal, there is an advantage of securing a sufficient area for welding components for electrical connection.

Preferably, the cylindrical battery may be, for example, a battery whose form factor ratio (defined as a value obtained by dividing the diameter of a cylindrical battery by height, namely a ratio of height (H) to diameter (Φ)) is greater than about 0.4.

Here, the form factor means a value indicating the diameter and height of a cylindrical battery. The form factor of the cylindrical battery according to an embodiment of the present disclosure may be, for example, 46110 battery, 48750 battery, 48110 battery, 48800 battery, or 46800 battery. In the numerical value representing the form factor, first two numbers indicate the diameter of the battery, next two numbers indicate the height of the battery, and the last number '0' indicates that the battery has a cylindrical section.

A battery according to an embodiment of the present disclosure may be a cylindrical battery having an approximately cylindrical shape, whose diameter is approximately 46 mm, height is approximately 110 mm, and form factor ratio is 0.418.

A battery according to another embodiment may be a cylindrical battery having an approximately cylindrical shape, whose diameter is about 48 mm, height is about 75 mm, and form factor ratio is 0.640.

A battery according to still another embodiment may be a cylindrical battery having an approximately cylindrical shape, whose diameter is approximately 48 mm, height is approximately 110 mm, and form factor ratio is 0.436.

A battery according to still another embodiment may be a cylindrical battery having an approximately cylindrical shape, whose diameter is approximately 48 mm, height is approximately 80 mm, and form factor ratio is 0.600.

A battery according to still another embodiment may be a cylindrical battery having an approximately cylindrical shape, whose diameter is approximately 46 mm, height is approximately 80 mm, and form factor ratio is 0.575.

Conventionally, batteries having a form factor ratio of about 0.4 or less have been used. That is, conventionally, for example, 18650 battery, 21700 battery, etc. were used. The 18650 battery has a diameter of approximately 18 mm, height of approximately 65 mm, and a form factor ratio of 0.277. The 21700 battery has a diameter of approximately 21 mm, a height of approximately 70 mm, and a form factor ratio of 0.300.

Next, with reference to FIGS. 11 to 19, the aforementioned cylindrical battery 1 will be described in more detail. In the following description, be other embodiments can be selectively applied in describing the same components as in the previous description. In addition, in the following description, some descriptions may overlap with the previous description.

Referring to FIGS. 12, 13, 16 and 17, the electrode assembly 300 includes a first electrode tab 11 and a second electrode tab 12. The first electrode tab 11 is provided to the lower portion of the electrode assembly 300 accommodated in the battery housing 20 in the height direction (a direction parallel to the Z-axis). The second electrode tab 12 is provided to the upper portion of the electrode assembly 300 accommodated in the battery housing 20 in the height direction (a direction parallel to the Z-axis).

Referring to FIGS. 11, 12, 13, and 16, the battery housing 20 may accommodate the electrode assembly 300 through the open portion formed at the lower end thereof. The battery housing 20 is a substantially cylindrical container with an open portion formed at the lower end and a closed portion formed at the upper end.

Figure 12:
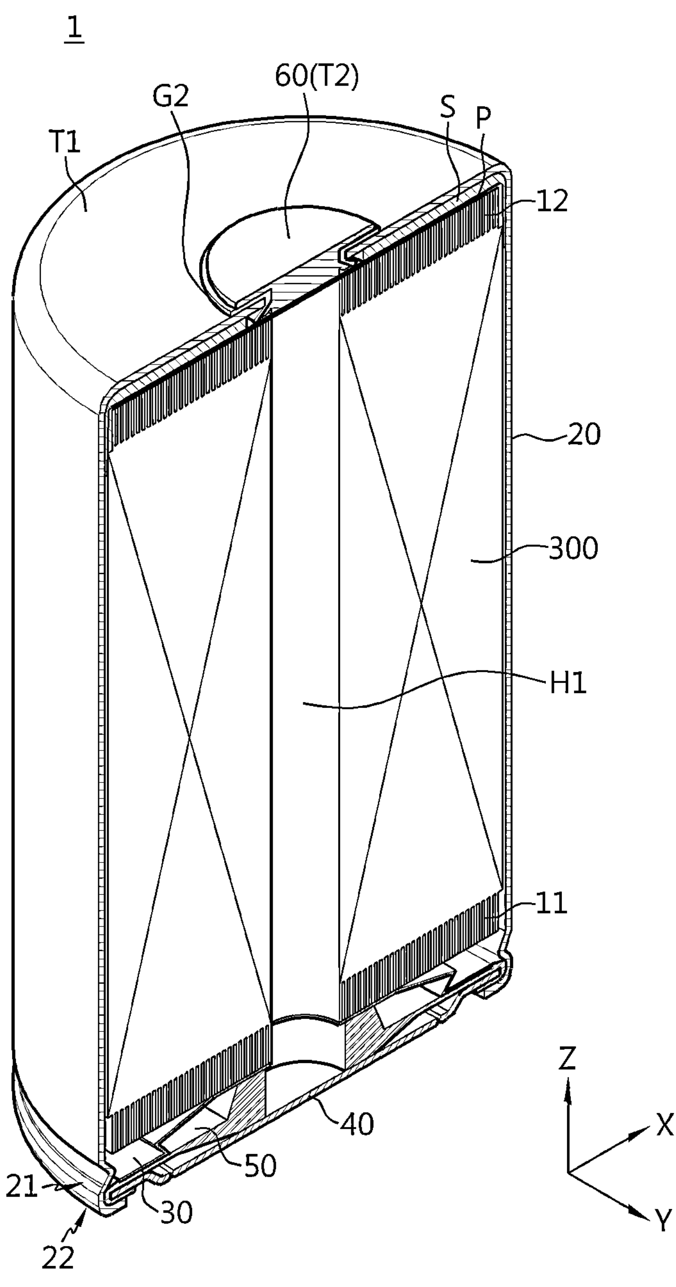
FIG. 12 is a cross-sectional view showing the internal structure of the cylindrical battery according to an embodiment of the present disclosure.
Figure 13:
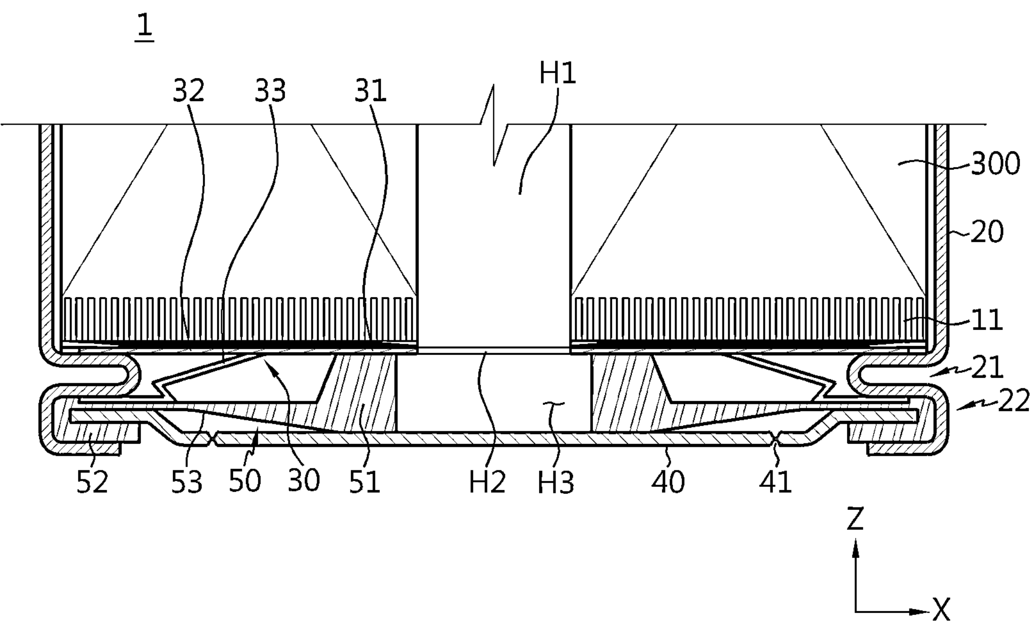
FIG. 13 is a partial cross-sectional view showing a region to which a sealing spacer of the present disclosure is applied.

Referring to FIGS. 12 and 13, the battery housing 20 may include a beading portion 21 and a crimping portion 22 formed at a lower end thereof. The beading portion 21 may be located below the electrode assembly 300 accommodated inside the battery housing 20. The beading portion 21 may be formed by press-fitting a periphery of the outer circumference of the battery housing 20. The beading portion 21 may partially reduce the inner diameter of the battery housing 20 to prevent the electrode assembly 300, which may have a size approximately corresponding to the width of the battery housing 20, from escaping out through the open portion formed at the lower end of the battery housing 20. The beading portion 21 may also function as a support portion on which the cap plate 40 is seated.

The crimping portion 22 is formed below the beading portion 21. The crimping portion 22 may have an extended and bent shape to surround a periphery of the edge of the cap plate 40 in a state where the periphery of the edge of the sealing spacer 50 is interposed therebetween.

Figure 15:
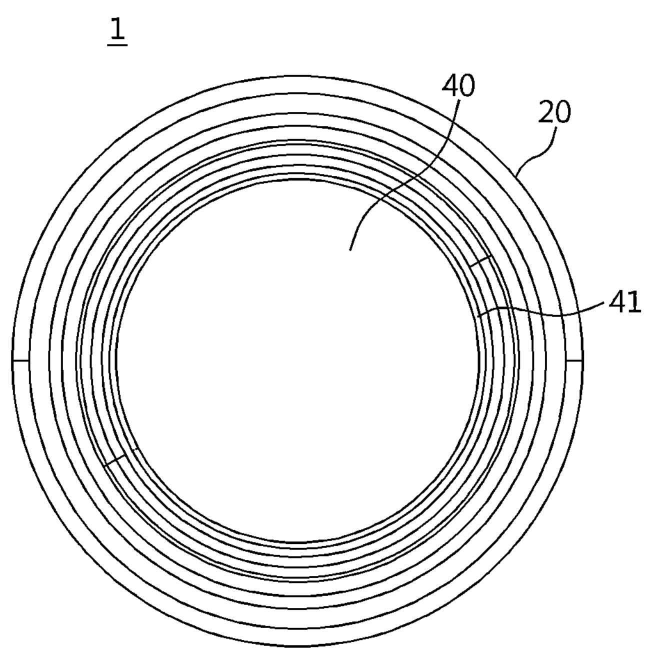
FIG. 15 is a plan view showing a bottom surface of the cylindrical battery of the present disclosure.

Referring to FIGS. 12, 13 and 15, the cap plate 40 may cover the open portion formed in the battery housing 20. The cap plate 40 may form a lower surface of the cylindrical battery 1.

As shown in FIGS. 13 and 15, the lower end of the cap plate 40 is preferably located higher than the lower end of the battery housing 20. In this case, even if the lower end of the battery housing 20 comes into contact with the ground or the bottom surface of a housing for module or pack configuration, the cap plate 40 does not touch the ground or the bottom surface of the housing. Therefore, it is possible to prevent a phenomenon in which the pressure required for rupturing the venting portion 41 differs from a design value due to the weight of the cylindrical battery 1, and accordingly, the smooth rupturing of the venting portion 41 may be secured.

Meanwhile, when the venting portion 41 has a closed loop shape as shown in FIGS. 13 and 15, it is more advantageous that the distance from the center of the cap plate 40 to the venting portion 41 is longer in terms of ease of rupture. This is because, when the same venting pressure is applied, as the distance from the center of the cap plate 40 to the venting portion 41 increases, the force acting on the venting portion 41 increases, thereby facilitating rupture. In addition, in terms of smooth discharge of the venting gas, it is more advantageous that the distance from the center of the cap plate 40 to the venting portion 41 is longer. From this point of view, it may be advantageous that the venting portion 41 is formed along the periphery of an edge of a substantially flat area, which protrudes downward (in a downward direction based on FIG. 15) from the peripheral edge area of the cap plate 40.

FIG. 15 shows a case where the venting portion 41 is continuously formed in a substantially circular shape, but the present disclosure is not limited thereto. The venting portion 41 may be discontinuously formed on the cap plate 40 in a substantially circular shape, or may be formed in a substantially straight line shape or other shapes.

Figure 14:
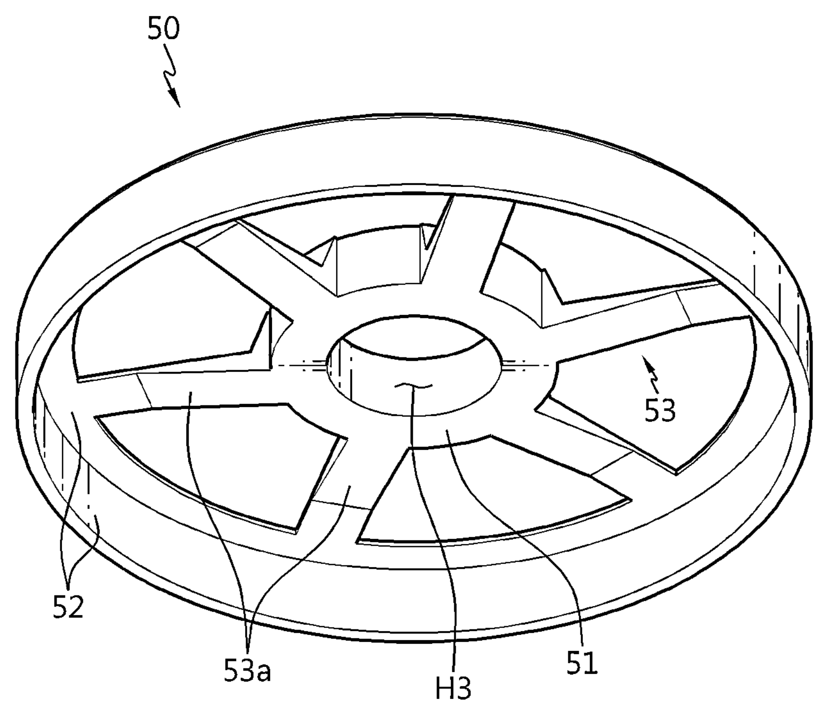
FIG. 14 is a diagram for explaining the sealing spacer according to an embodiment of the present disclosure.

Referring to FIGS. 12, 13 and 14, the sealing spacer 50 is configured to prevent the movement of the electrode assembly 300 and to enhance the sealing force of the battery housing 20. The sealing spacer 50 may include, for example, a movement prevention unit 51, a sealing portion 52, and a connection portion 53. The movement prevention unit 51 is interposed between the first current collecting plate 30 and the cap plate 40. The movement prevention unit 51 may have a height corresponding to a distance between the first current collecting plate 30 and the cap plate 40. In this case, the movement prevention unit 51 may effectively prevent the electrode assembly 300 from moving within the battery housing 20 due to the gap formed between the first current collecting plate 30 and the cap plate 40. Accordingly, the movement prevention unit 51 may prevent damage to the coupling portion between the electrode assembly 300 and the first current collecting plate 30 and/or the coupling portion between the first current collecting plate 30 and the battery housing 20.

The movement prevention unit 51 may be located at an approximate center on one surface of the bottom of the electrode assembly 300. The movement prevention unit 51 may include a spacer hole H3 formed at a position corresponding to the winding center hole H1 of the electrode assembly 300. The spacer hole H3 may function as a passage for inserting a welding rod or a passage for laser irradiation, like the above-described first current collecting plate hole H2. The spacer hole H3 may also function as a passage through which electrolyte may be smoothly impregnated into the electrode assembly 300 when the electrolyte is injected, like the first current collecting plate hole H2 described above.

The sealing portion 52 is interposed between the battery housing 20 and the cap plate 40. The sealing portion 52 may have a shape extending along the periphery of the inner circumference of the battery housing 20. When the battery housing 20 includes the crimping portion 22, the sealing portion 52 may be bent together along the bent shape of the crimping portion 22 to cover a peripheral area of the edge of the cap plate 40. As such, the sealing portion 52 may function as a gasket for improving the fixing force of the cap plate 40 and the sealing force of the battery housing 20. When the cylindrical battery 1 of the present disclosure includes the sealing spacer 50 as above, the sealing portion 52 of the sealing spacer 50 may replace the sealing gasket G1 shown in FIGS. 5 to 7.

The connection portion 53 connects the movement prevention unit 51 and the sealing portion 52. The connection portion 53 may include, for example, a plurality of extension legs 53*a* radially extending from the movement prevention unit 51. When the connection portion 53 is configured in this way, the electrolyte may be smoothly injected through the space between the extension legs 53*a* adjacent to each other, and internal gas may be smoothly discharged when venting occurs due to an increase in internal pressure.

As shown in to FIGS. 13 to 14, the plurality of extension legs 53*a* are configured not to come into contact with the cap plate 40 and/or a region of the housing coupling portion 33 of the first current collecting plate 30 except for the region inserted into the crimping portion 22. For example, the connection portion 53 may be located not to overlap with the housing coupling portion 33 along the height direction (a direction parallel to the Z-axis) of the cylindrical battery 1. In particular, when the extension legs 53*a* have a shape extending radially from the movement prevention unit 51 and the plurality of housing coupling portions 33 have a shape extending radially from the support portion 31, the extension legs 53*a* and the housing coupling portions 33 may be arranged at staggered positions so as not to overlap each other along the vertical direction. In this case, even if a compressive force in the vertical direction is applied to the battery housing 20 to deform the shape of components, the possibility of interference between the extension leg 53*a* and the housing coupling portions 33 may be significantly lowered, and as a result, the possibility of breakage of the coupling portion between the components may be significantly reduced.

In this case, even if the shape of the sealing spacer 50 is deformed due to a sizing process for compressing the cylindrical battery 1 along the height direction (a direction parallel to the Z-axis) or other causes, the interference between the connection portion 53 of the sealing spacer 50 and the housing coupling portion 33 of the first current collecting plate 30 may be minimized. In particular, when the extension leg 53*a* is configured not to contact the cap plate 40, even if the battery housing 20 is deformed due to a sizing process or an external impact, the possibility of deformation of the extension leg 53*a* may be reduced.

Meanwhile, the components constituting the sealing spacer 50 may be integrally formed. For example, the sealing spacer 50 in which the movement prevention unit 51, the sealing portion 52, and the connection portion 53 are integrated may be manufactured by the injection molding. In other words, in the cylindrical battery 1 of the present disclosure, it is possible to obtain both effects of enhancing the sealing force for the open portion of the battery housing 20 and preventing movement of the electrode assembly 300 by using one component manufactured by modifying gasket components used to seal the open portion of the battery housing 20. Therefore, according to the present disclosure, it is possible to prevent the complexity of the manufacturing process and the increase in manufacturing cost caused by the application of additional components.

Figure 16:
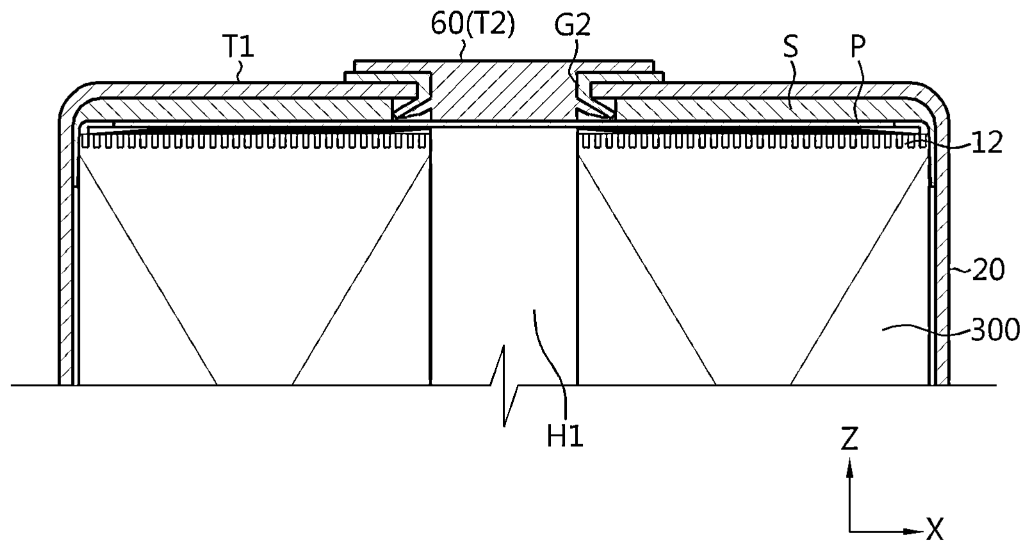
FIG. 16 is a partial cross-sectional view showing a region to which the insulator of the present disclosure is applied.
Figure 17:
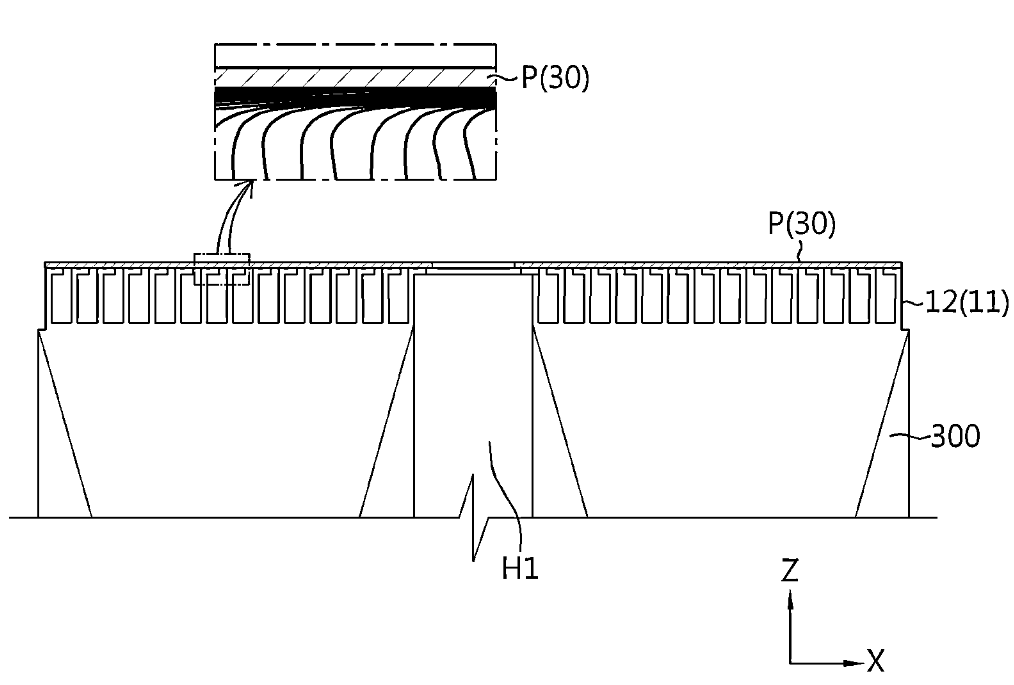
FIG. 17 is a partial cross-sectional view showing the coupled structure of the current collecting plate and the electrode tab of the present disclosure.

Referring to FIGS. 12, 16 and 17, the second current collecting plate P is coupled to the upper portion of the electrode assembly 300. The second current collecting plate P is made of a conductive metal material and is coupled to the second electrode tab 12. The second electrode tab 12 and the second current collecting plate P may be coupled by, for example, laser welding. Referring to FIG. 13, the second current collecting plate P may be coupled to a coupling surface formed by bending an end of the second electrode tab 12 in a direction parallel to the second current collecting plate P. The bending direction of the second electrode tab 12 may be, for example, a direction toward the winding center of the electrode assembly 300. When the second electrode tab 12 has such a bent shape, the space occupied by the second electrode tab 12 may be reduced, thereby improving energy density. In addition, the increase in the coupling surface area between the second electrode tab 12 and the second current collecting plate P may result in improved bonding strength and reduced resistance. Meanwhile, the coupling structure and coupling method between the second electrode tab 12 and the second current collecting plate P as described above may be equally applied to the coupling between the first electrode tab 11 and the first current collecting plate 30.

Referring to FIGS. 12 and 16, the insulator S is interposed between the closed portion formed at the top of the battery housing 20 and the top of the electrode assembly 300 or between the closed portion and the second current collecting plate P. The insulator S may be made of, for example, an insulating resin material. The insulator S prevents contact between the electrode assembly 300 and the battery housing 20 and/or between the electrode assembly 300 and the second current collecting plate P. To this end, an insulator S may be interposed between the second electrode tab 12 and the battery housing 20 and/or between the second current collecting plate P and the battery housing 20. When the insulator S is applied, the battery terminal 60 may pass through the insulator S for electrical connection with the second electrode tab 12.

The insulator S may also be interposed between the top of the outer circumference of the electrode assembly 300 and the inner surface of the battery housing 20. In this case, the second electrode tab 12 of the electrode assembly 300 may contact the inner surface of the sidewall of the battery housing 20 to prevent a short circuit from occurring.

The insulator S may have a height corresponding to a distance between the closed portion formed at the top of the battery housing 20 and the electrode assembly 300 or a distance between the closed portion and the second current collecting plate P. In this case, it is possible to prevent the electrode assembly 300 from moving inside the battery housing 20, thereby significantly reducing the risk of damage to the coupling portion for electrical connection between components. When the insulator S is applied together with the sealing spacer 50 described above, the effect of preventing movement of the electrode assembly 300 may be maximized.

The insulator S may have an opening formed at a position corresponding to the winding center hole H1 of the electrode assembly 300. The electrode terminal 50 may directly contact the second current collecting plate P through the opening.

Figure 18:
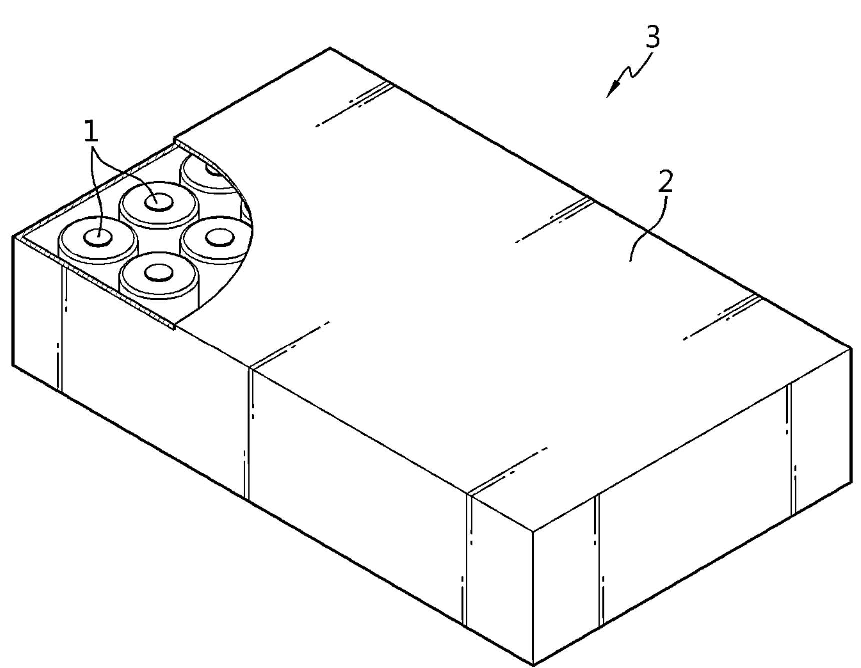
FIG. 18 is a schematic view showing a battery pack according to an embodiment of the present disclosure.

Referring to FIG. 18, a battery pack 3 according to an embodiment of the present disclosure includes the cylindrical battery 1 according to an embodiment of the present disclosure as described above. In the drawing of the present disclosure, components for electrical connection such as a bus bar, a cooling unit and a power terminal are not depicted for convenience of illustration.

Figure 19:
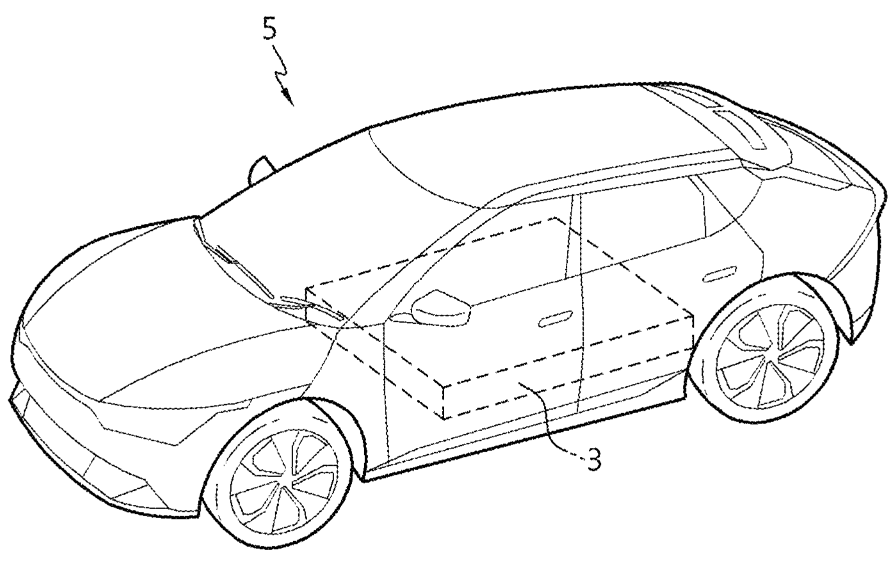
FIG. 19 is a conceptual view showing a vehicle according to an embodiment of the present disclosure.

Referring to FIG. 19, a vehicle 5 according to an embodiment of the present disclosure may be, for example, an electric vehicle, a hybrid electric vehicle or a plug-in vehicle, and includes the battery pack 3 according to an embodiment of the present disclosure. The vehicle 5 includes a four-wheeled vehicle and a two-wheeled vehicle. The vehicle 5 operates by receiving a power from the battery pack 3 according to an embodiment of the present disclosure.

Hereinafter, an embodiment of a positive electrode active material used in the cylindrical battery according to the present disclosure will be described.

In an embodiment, the "primary particle" is a particle in which no grain boundary appears when observed in a field of view of 5000 to 20000 magnification using a scanning electron microscope (SEM) or an electron back scatter diffraction (EBSD). "Average particle diameter of primary particles" means an arithmetic average value calculated after measuring particle diameters of primary particles observed in a SEM or EBSD image.

"Secondary particle" is a particle formed by aggregating a plurality of primary particles. In the present disclosure, a secondary particle in which 10 or less primary particles are aggregated will be referred to as pseudo-single particles in order to distinguish it from a conventional secondary particle formed by aggregating tens to hundreds of primary particles.

In the present disclosure, "specific surface area" is measured by the BET method, and may be specifically calculated from the nitrogen gas adsorption amount under liquid nitrogen temperature (77K) using BELSORP-mino II of BEL Japan.

In the present disclosure, "$D_{min}$", "$D_{50}$" and "$D_{max}$" are particle size values of the cumulative volume distribution of the positive electrode active material measured using a laser diffraction method. Specifically, $D_{min}$ is a minimum particle size appearing in the cumulative volume distribution, $D_{50}$ is a particle size when the volume cumulative amount is 50%, and $D_{max}$ is a maximum particle size appearing in the cumulative volume distribution. If the positive electrode active material is a single particle, $D_{50}$ means an average particle diameter of the primary particles. In addition, when the positive electrode active material is a pseudo-single particle, $D_{50}$ means an average particle diameter of particles formed by aggregating primary particles.

The particle size value of the cumulative volume distribution may be measured by, for example, dispersing the positive electrode active material in a dispersion medium, then introducing the same into a commercially available laser diffraction particle size measuring device (e.g., Microtrac MT 3000), irradiating ultrasonic waves of about 28 kHz with output of 60-W thereto, and obtaining a volume cumulative particle size distribution graph.

In the present disclosure, "consist essentially of A" indicates that the A component and any unmentioned components that do not substantially affect the basic and novel characteristics of the present disclosure are included. The basic and novel characteristics of the present disclosure include at least one of minimizing particle breakage during battery manufacturing, minimizing gas generated by such particle breakage, and minimizing the occurrence of internal cracks. A person skilled in the art may recognize the material influence of these characteristics.

As a result of repeated research to develop a positive electrode for an electrochemical device with high safety while realizing high capacity and an electrochemical device including the same, inventors of the present discloser have confirmed that the safety of a large cylindrical battery can be dramatically improved when the positive electrode active material in the form of a single particle composed of one primary particle or a pseudo-single particle, which is an aggregate of 10 or less primary particles, is used alone as a positive electrode active material.

According to one aspect, the positive electrode includes a positive electrode current collector; and a positive electrode active material layer formed on at least one side surface of the positive electrode current collector, wherein the positive electrode active material layer may include a positive electrode active material, and optionally, a conductive material and/or a binder.

The positive electrode may have a structure in which a positive electrode active material layer is formed on at least one surface or both surfaces of a long sheet-shaped positive electrode current collector, and the positive electrode active material layer may include a positive electrode active material and a binder.

Specifically, the positive electrode may be manufactured by applying a positive electrode slurry, which is prepared by dispersing a positive electrode active material, a conductive material and a binder in a solvent such as dimethyl sulfoxide (DMSO), isopropyl alcohol, N-methyl pyrrolidone (NMP), acetone, water or the like, on one surface or both surfaces of a long sheet-shaped positive electrode current collector, removing the solvent of the positive electrode slurry through a drying process, and then roll-pressing the same. Meanwhile, when the positive electrode slurry is applied, a positive electrode including an uncoated portion (non-coated portion) may be manufactured by not applying the positive electrode slurry to a partial area of the positive electrode current collector, for example, one end of the positive electrode current collector.

In another aspect, the positive electrode active material includes single particle-based active material particles. In one embodiment, the single particle-based active material particles may be 90 wt % or more, 95 wt % or more, 98 wt % or more, or 99 wt % or more, based on 100 wt % of the positive electrode active material. In one specific embodiment, the positive electrode active material may be composed of only the single particle-based active material particles.

In this specification, the single particle-based active material particle refers to a single particle, a pseudo-single particle, or both of them. The single particle is a particle composed of one primary particle, and the pseudo-single particle is an aggregate of 10 or less primary particles.

Conventionally, it has been common to use a spherical secondary particle in which tens to hundreds of primary particles are aggregated as a positive electrode active material of a lithium battery. However, in the case of a positive electrode active material in the form of secondary particles in which many primary particles are aggregated, particle breakage in which primary particles fall off is easy to occur in the rolling process when manufacturing a positive electrode, and cracks occur inside the particles during the charging and discharging process. When particles of the positive electrode active material are broken or cracks occur inside the particles, the contact area with the electrolyte increases, so there is a problem in that gas generation due to a side reaction with the electrolyte increases. If the gas generation inside the cylindrical battery increases, the pressure inside the battery increases and there is a risk of battery explosion. In particular, when the volume of the cylindrical battery is increased, the amount of active material inside the battery increases as the volume increases, and as a result, the amount of gas generated increases significantly, so the risk of ignition and/or explosion of the battery increases further.

In contrast, the single particle-based active material particles in the form of a single particle composed of one primary particle or a pseudo-single particle in which 10 or less primary particles are aggregated have a higher particle strength than the positive electrode active material in the existing secondary particle form in which tens to hundreds of primary particles are aggregated, so particle breakage rarely occurs during the rolling process. In addition, since the number of primary particles constituting the single-particle-based active material particle is small, the volume expansion and contraction of the primary particles during charging and discharging is small, and thus the occurrence of cracks inside the particle is significantly reduced.

Therefore, when using the single particle-based active material particles as in the present disclosure, the amount of gas generated due to particle breakage and internal cracks may be significantly reduced. Accordingly, when the single particle-based active material particles are applied to a large cylindrical battery, excellent safety may be realized.

Meanwhile, the single particle and/or pseudo-single particle is included in an amount of 95 wt % to 100 wt %, preferably 98 wt % to 100 wt %, more preferably 99 wt % to 100 wt %, further preferably 100 wt %, based on the entire weight of the positive electrode active material included in the positive electrode.

When the content of single particle and/or pseudo-single particle satisfies the above range, sufficient safety may be obtained when applied to a large-sized battery. When the positive electrode active material in the form of a secondary particle is included in an amount exceeding 5 wt % in the entire positive electrode active material, the side reaction with the electrolyte increases due to fine powder generated from the secondary particle during electrode manufacturing and charging/discharging, which may deteriorate suppression of gas generation and lower the stability improvement effect when applied to a large-sized battery.

Meanwhile, positive electrode active materials including single particles and/or pseudo-single particles according to the present disclosure may have $D_{min}$ of 1.0 μm or more, 1.1 μm or more, 1.15 μm or more, 1.2 μm or more, or 1.25 μm or more, 1.3 μm or more, or 1.5 μm or more. When the $D_{min}$ of the positive electrode active material is less than 1.0 μm, the linear pressure increases during the positive electrode rolling process, which may easily cause particle breakage and deteriorate thermal stability, making it impossible to secure sufficient thermal stability when applied to a large-sized cylindrical battery.

Meanwhile, considering resistance and power characteristics, $D_{min}$ of the positive electrode active material may be 3 μm or less, 2.5 μm or less, or 2 μm or less. If $D_{min}$ is too large, the lithium ion diffusion distance within the particles may increase, and thus the resistance and power characteristics may deteriorate.

For example, $D_{min}$ of the positive electrode active material may be 1.0 μm to 3 μm, 1.0 μm to 2.5 μm, or 1.3 μm to 2.0 μm.

Meanwhile, the positive electrode active material may have a $D_{50}$ of 5 μm or less, 4 μm or less, or 3 μm or less, and may be, for example, 0.5 μm to 5 μm, preferably 1 μm to 5 μm, more preferably 2 μm to 5 μm.

The positive electrode active material in the form of single particles and/or pseudo-single particles has less lithium mobility than the positive electrode active material in the form of secondary particles because there are fewer interfaces between primary particles that serve as a diffusion path for lithium ions inside the particles, and accordingly there is a problem that the resistance increases. The increase in resistance intensifies as the size of the particles increases, and when the resistance increases, capacity and power characteristics are adversely affected. Therefore, by adjusting $D_{50}$ of the positive electrode active material to 5 μm or less, it is possible to suppress an increase in resistance by minimizing the lithium ion diffusion distance inside the positive electrode active material particle.

In addition, the positive electrode active material may have $D_{max}$ of 12 μm to 17 μm, preferably 12 μm to 16 μm, and more preferably 12 μm to 15 μm. When $D_{max}$ of the positive electrode active material satisfies the above range, resistance characteristics and capacity characteristics are more excellent. If $D_{max}$ of the positive electrode active material is too large, aggregation has occurred between single particles, and the lithium movement path inside the agglomerated particles is lengthened, resulting in poor lithium mobility, which may increase resistance. Meanwhile, if $D_{max}$ of the positive electrode active material is too small by excessive crushing process, $D_{min}$ may decrease to less than 1 μm, which causes particle breakage during rolling and deteriorates thermal stability.

Meanwhile, the positive electrode active material may have a particle size distribution (PSD) represented by Formula 1 below of 3 or less, preferably 2 to 3, more preferably 2.3 to 3.

$$\text{particle size distribution } (PSD) = (D_{max} - D_{min})/D_{50} \qquad \text{Formula 1}$$

When the positive electrode active material has the above particle size distribution, the electrode density of the positive electrode may be properly maintained, and particle breakage and resistance increase may be effectively suppressed.

Meanwhile, the positive electrode active material may have an average particle diameter of the primary particles of 5 μm or less, 4 μm or less, 3 μm or less, or 2 μm or less, and may be, for example, 0.5 μm to 5 μm, preferably 1 μm to 5 μm, more preferably 2 μm to 5 μm. When the average particle diameter of the primary particles satisfies the above range, the positive electrode active material in the form of a single particle and/or pseudo-single particle having excellent electrochemical properties may be formed. If the average particle diameter of the primary particles is too small, the number of aggregations of the primary particles forming the positive electrode active material increases, reducing the effect of suppressing particle breakage during rolling. If the average particle diameter of the primary particles is too large, the lithium diffusion path may be elongated, increasing resistance and deteriorating power characteristics.

In the present disclosure, the positive electrode active material preferably has a unimodal particle size distribution. Conventionally, in order to improve the electrode density of the positive electrode active material layer, bimodal positive electrode active materials in which a large particle diameter positive electrode active material with a large average particle diameter and a small particle diameter positive electrode active material with a small average particle diameter are mixed has been used frequently. However, in the positive electrode active material in the form of single particles or pseudo-single particles, when the particle size increases, the lithium movement path lengthens and the resistance increases remarkably. Thus, when large-diameter particles are mixed and used, a problem of deterioration in capacity and power characteristics may occur. Therefore, in the present disclosure, the increase in resistance may be minimized by using a positive electrode active material having a unimodal distribution.

Meanwhile, the positive electrode active material may include lithium nickel-based oxide, and specifically, may include lithium nickel-based oxide containing 80 mol % or more of Ni based on the total number of moles of transition metal. Preferably, the lithium nickel-based oxide may include 80 mol % or more and less than 100 mol % of Ni, 82 mol % or more and less than 100 mol % of Ni, or 83 mol % or more and less than 100 mol % of Ni. When the lithium nickel-based oxide having a high Ni content is used as above, high capacity may be realized.

More specifically, the positive electrode active material may include a lithium nickel-based oxide represented by the following [Chemical Formula 1].

[Chemical Formula 1]

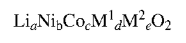

$Li_aNi_bCo_cM^1_dM^2_eO_2$

In Chemical Formula 1, $M^1$ may be Mn, Al or a combination thereof, and may be preferably Mn or Mn and Al.

$M^2$ is at least one selected from the group consisting of Zr, W, Y, Ba, Ca, Ti, Mg, Ta and Nb, preferably at least one selected from the group consisting of Zr, Y, Mg, and Ti, more preferably Zr, Y or a combination thereof. The $M^2$ element is not necessarily included, but when included in an appropriate amount, it may play a role of promoting grain growth or improving crystal structure stability during sintering.

The a represents the molar ratio of lithium in the lithium nickel-based oxide, and may be $0.8 \leq a \leq 1.2$, $0.85 \leq a \leq 1.15$, or $0.9 \leq a \leq 1.2$. When the molar ratio of lithium satisfies the above range, a crystal structure of lithium nickel-based oxide may be stably formed.

The b represents the molar ratio of nickel among all metals except lithium in the lithium nickel-based oxide, and may be $0.8 \leq b < 1$, $0.82 \leq b < 1$, $0.83 \leq b < 1$, $0.85 \leq b < 1$, $0.88 \leq b < 1$ or $0.90 \leq b < 1$. When the molar ratio of nickel satisfies the above range, it is possible to realize high capacity by exhibiting high energy density.

The c represents the molar ratio of cobalt among all metals except lithium in the lithium nickel-based oxide, and may be $0 < c < 0.2$, $0 < c < 0.18$, $0.01 \leq c \leq 0.17$, $0.01 \leq c \leq 0.15$, $0.01 \leq c \leq 0.12$ or $0.01 \leq c \leq 0.10$. When the molar ratio of cobalt satisfies the above range, good resistance characteristics and power characteristics may be implemented.

The d represents the molar ratio of $M^1$ element among all metals except lithium in the lithium nickel-based oxide, and may be $0<d<0.2$, $0<d<0.18$, $0.01\leq d\leq 0.17$, $0.01\leq d\leq 0.15$, $0.01\leq d\leq 0.12$, or $0.01\leq d\leq 0.10$. When the molar ratio of $M^1$ element satisfies the above range, the structural stability of the positive electrode active material is excellent.

The e represents the molar ratio of $M^2$ element among all metals except for lithium in the lithium nickel-based oxide, and may be $0\leq e\leq 0.1$ or $0\leq e\leq 0.05$.

Meanwhile, the positive electrode active material according to the present disclosure may further include, if necessary, a coating layer including at least one coating element selected from the group consisting of Al, Ti, W, B, F, P, Mg, Ni, Co, Fe, Cr, V, Cu, Ca, Zn, Zr, Nb. Mo, Sr, Sb, Bi, Si and S on the surface of the lithium nickel-based oxide particle. Preferably, the coating element may be Al, B, Co, or a combination thereof.

When the coating layer is present on the surface of lithium nickel-based oxide particles, contact between the electrolyte and the lithium nickel-based oxide is suppressed by the coating layer, thereby reducing transition metal elution or gas generation due to side reactions with the electrolyte.

The positive electrode active material may be included in an amount of 80 wt % to 99 wt %, preferably 85 wt % to 99 wt %, more preferably 90 wt % to 99 wt %, based on the total weight of the positive electrode active material layer.

Meanwhile, as the positive electrode current collector, various positive electrode current collectors used in the art may be used. For example, stainless steel, aluminum, nickel, titanium, calcined carbon or aluminum, or stainless steel surface-treated with carbon, nickel, titanium, silver, or the like may be used as the positive electrode current collector. The positive electrode current collector may typically have a thickness of 3 μm to 500 μm, and fine irregularities may be formed on the surface of the positive electrode current collector to increase adhesion of the positive electrode active material. The positive electrode current collector may be used in various forms of, for example, film, sheet, foil, net, porous material, foam, or nonwoven fabric.

Meanwhile, in one embodiment of the present disclosure, all or some of the single particle-based active material particles may have a core-shell structure in which the particle surface is coated with a conductive coating layer. The conductive coating layer may cover at least some or all of the particles. The conductive coating layer includes conductive nanomaterials.

The single particle-based active material particle has a problem in that the electrical conductivity is lowered because the resistance is higher than that of the conventional secondary particle type positive electrode active material and the contact area with the conductive material is small. When an excessive amount of conductive material is added to improve electrical conductivity, aggregation occurs in the positive electrode slurry, resulting in increased viscosity, which causes poor coating properties. Therefore, in order to implement smooth coating properties, the viscosity of the positive electrode slurry must be lowered by reducing the solid content. However, if the solid content in the positive electrode slurry decreases, the active material content decreases, which may deteriorate the capacity characteristics. In the present disclosure, in order to solve this problem, the surface of the single particle-based active material is coated with a conductive nanomaterial, so that excellent electrical conductivity may be realized without adding a separate conductive material to the positive electrode slurry.

In one embodiment of the present disclosure, when the single particle-based active material coated with a conductive nanomaterial is applied as the positive electrode active material, the positive electrode active material layer may not include a conductive material on a portion other than the conductive coating layer. Since there is no need to additionally use a conductive material that causes aggregation of the positive electrode slurry as described above, the viscosity of the positive electrode slurry may be reduced, the solid content may be decreased, and the electrode coating process efficiency and electrode adhesion may be improved.

In the present disclosure, the conductive nanomaterial may be a conductive material having a nano size so as to be smoothly coated on particles, and the type is not particularly limited. For example, the conductive nanomaterial may be a carbon nanotube, carbon nanoparticle, or the like.

The conductive nanomaterial may have various shapes, and may be, for example, spherical, flaky, or fibrous.

Meanwhile, the conductive coating layer may be formed by mixing single particle-based active material particles, which are a core part, and a conductive nanomaterial, and then thermally treating the mixture. At this time, the mixing may be performed as solid mixing or liquid mixing.

In one embodiment of the present disclosure, the positive electrode active material layer contains flake graphite. When using the single particle-based active material as the positive electrode active material, if the positive electrode active material layer contains flake graphite, in the case of rolling the positive electrode active material layer, the sliding effect of the flake graphite on the positive electrode active material is provided to improve the rolling characteristics of the electrode, and the porosity of the electrode may be lowered to a desired level. Accordingly, stability, initial resistance characteristics, and charge/discharge efficiency of a battery to which the positive electrode according to the present disclosure is applied may be improved.

In one embodiment of the present disclosure, the flake graphite may be included in an amount of 0.1 wt % to 5 wt %, preferably 0.1 wt % to 3 wt %, based on 100 wt % of the positive electrode active material layer.

When the content of flake graphite satisfies the above range, the positive electrode rolling characteristics are improved and excellent electrode density may be realized. If the content of flake graphite is too small, the effect of improving the rolling properties is insignificant, and if it is too large, it may cause an increase in slurry viscosity and decrease in phase stability, and resistance may increase due to a decrease in electrode uniformity through coupling with a conductive material.

Meanwhile, the flake graphite used in the present disclosure may have an average particle diameter of 1 μm to 20 μm, preferably 2 μm to 10 μm, more preferably 3 μm to 5 μm, but is not limited thereto. If the size of the flake graphite is too small, it is difficult to realize the desired porosity, and the current density may be lowered, resulting in lower capacity. At this time, the average particle diameter of the flake graphite may be measured using a laser diffraction method (ISO 13320).

In addition, the flake graphite may have an aspect ratio of 0.1 to 500, preferably 1 to 100, more preferably 1 to 30. When the aspect ratio of flake graphite satisfies the above range, the effect of lowering electrode resistance by improving conductivity occurs.

In addition, the flake graphite may have a density of 2.0 $g/cm^3$ to 2.5 $g/cm^3$, preferably 2.1 $g/cm^3$ to 2.4 $g/cm^3$, more preferably 2.2 $g/cm^3$ to 2.3 $g/cm^3$.

Meanwhile, in the present disclosure, the porosity of the positive electrode active material layer may be 15% to 23%, preferably 17% to 23%, more preferably 18% to 23%. When the porosity of the positive electrode active material layer satisfies the above range, the electrode density increases to realize excellent capacity and the resistance decreases. If the porosity is too low, the electrolyte impregnability is low, and lithium precipitation may occur due to non-impregnation of the electrolyte. If the porosity is too high, the contact between the electrodes is not good, which increases the resistance and decreases the energy density, so the capacity improvement effect is insignificant.

The porosity value of the positive electrode active material layer may be achieved i) by the positive electrode active material containing single particle-based active material particles and ii) by adding flake graphite to the positive electrode active material.

In implementing a high loading electrode with a relatively high loading amount of the positive electrode active material, when using a positive electrode active material in the form of a single particle or pseudo-single particle as in the present disclosure, particle breakage of the active material during rolling is significantly reduced compared to the conventional positive electrode active material in the form of a secondary particle, and damage to the positive electrode current collector (Al foil) is reduced, so rolling is possible with a relatively high linear pressure. Therefore, the porosity of the positive electrode active material layer may be decreased to the numerical range as described above, so the energy density may be increased.

In addition, if the positive electrode active material layer contains flake graphite as in the present disclosure, the flake graphite may provide a sliding effect during rolling and fill the pores of the positive electrode active material layer, so the porosity of the positive electrode active material layer may be reduced to the above numerical range.

In addition, the positive electrode may have a loading amount of 570 mg/25 $cm^2$ or more, preferably 600 mg/25 $cm^2$ to 800 mg/25 $cm^2$, more preferably 600 mg/25 $cm^2$ to 750 mg/25 $cm^2$. Specifically, in the lithium secondary battery according to the present disclosure, the loading amount of the positive electrode may be secured in a relatively high level because the rolling characteristics of the electrode are improved by applying a single particle and/or pseudo-single particle positive electrode active material and flake graphite, and through this, high-capacity characteristics may be implemented.

In one embodiment of the present disclosure, the positive electrode active material layer may further include a conductive material. The conductive material is used to impart conductivity to the electrode, and any material that does not cause chemical change inside the battery and has electronic conductivity may be used without particular limitations. Specific examples may include graphite such as natural graphite or artificial graphite; carbon-based materials such as carbon black, acetylene black, Ketjen black, channel black, furnace black, lamp black, thermal black, carbon fiber, or carbon nanotube; metal powder or metal fiber such as copper, nickel, aluminum, or silver; conductive whiskers such as zinc oxide or potassium titanate; conductive metal oxides such as titanium oxide; and conductive polymers of polyphenylene derivatives and the like, which may be used alone or as a mixture. The conductive material may be typically included in an amount of 1 wt % to 30 wt %, preferably 1 wt % to 20 wt %, more preferably 1 wt % to 10 wt %, based on the total weight of the positive electrode active material layer.

In one specific embodiment of the present disclosure, the conductive material may include carbon nanotube.

In one embodiment of the present disclosure, the positive electrode active material may include a multi-wall carbon nanotube having a large specific surface area and a small wall number as a conductive material. The multi-wall carbon nanotube may be included in an amount of 50 wt % or more, 70 wt % or more, 90 wt % or more, or 99 wt % or more, based on 100 wt % of the conductive material. In a specific embodiment of the present disclosure, the conductive material may include only the multi-walled carbon nanotube.

In the present disclosure, the multi-wall carbon nanotube has a BET specific surface area of 300 $m^2/g$ to 500 $m^2/g$. The multi-wall carbon nanotube is referred to as 'new CNT' in order to be distinguished from the conventional one.

Figure 20:
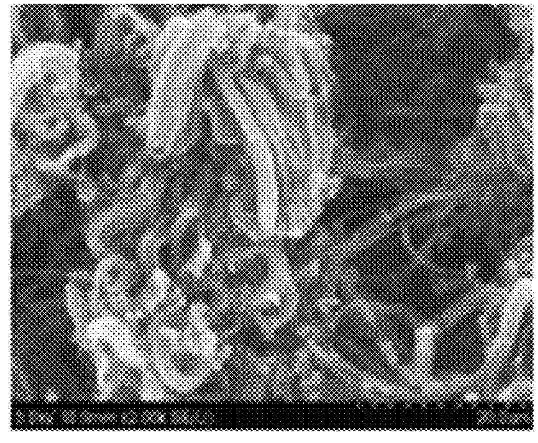
FIG. 20 is a scanning electron microscope (SEM) photograph showing a carbon nanotube (existing CNT) commonly used in the prior art.
Figure 20:
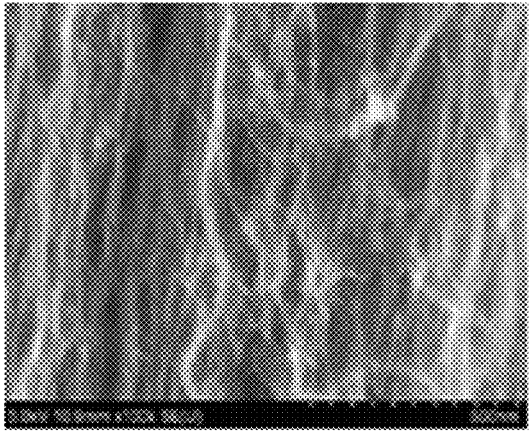
Figure 23:
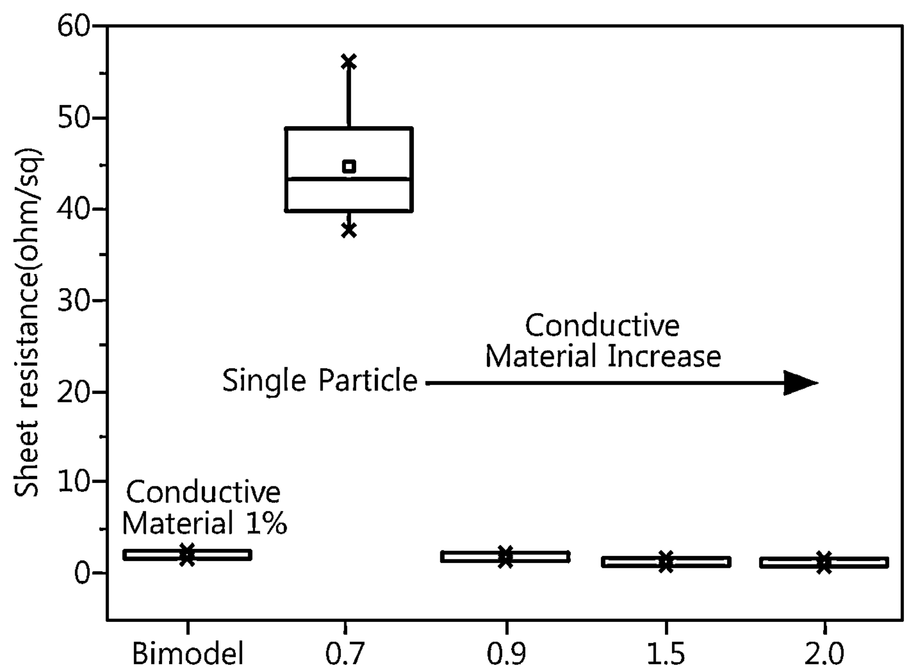
FIGS. 23 to 26 are graphs showing sheet resistance and high-temperature life characteristics for each conductive material ratio when single particle-based active material particles are applied as the positive electrode active material.
Figure 24:
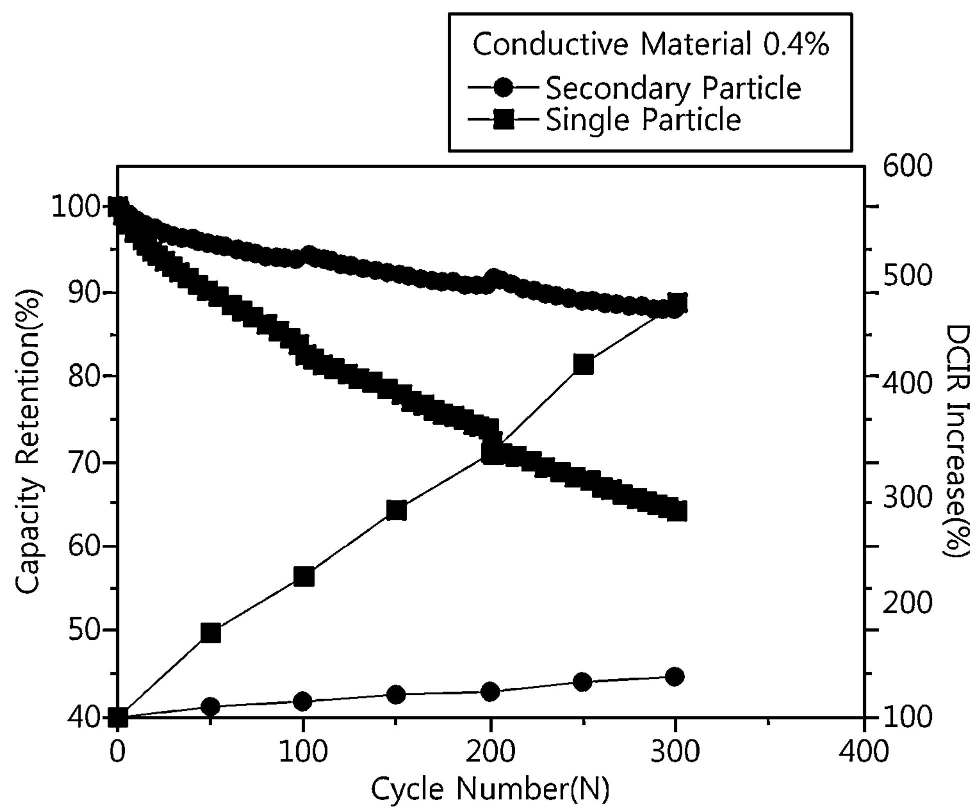
Figure 25:
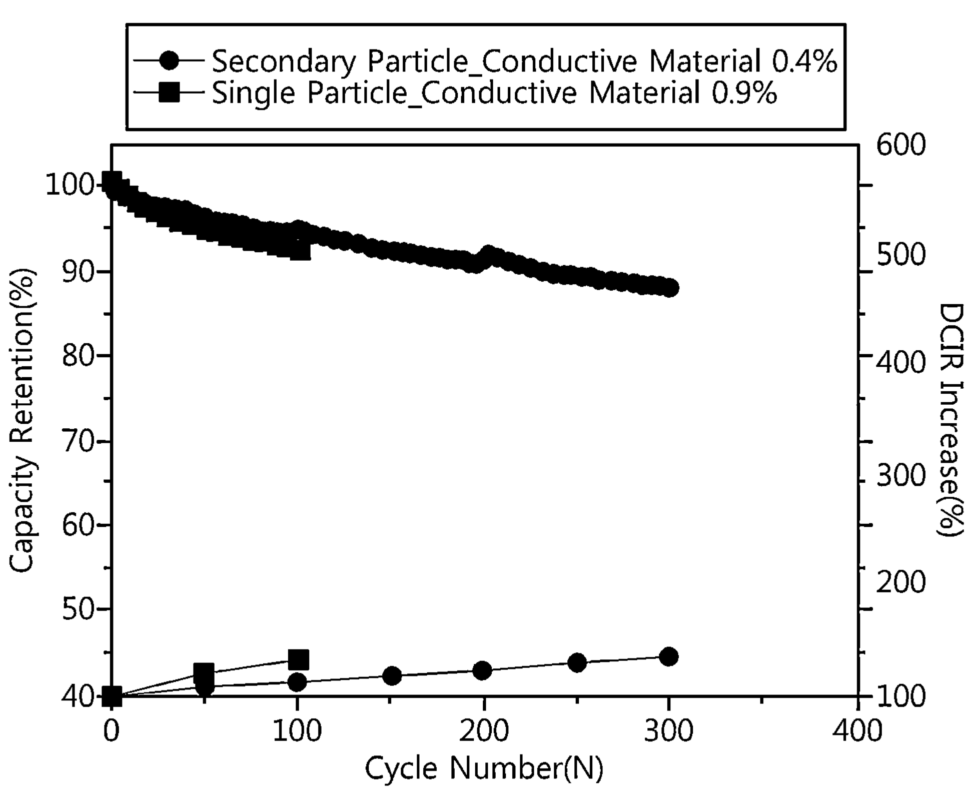

The carbon nanotube (existing CNT) commonly used in the art had a BET specific surface area of less than 300 $m^2/g$. The SEM images and physical properties (FIG. 22) of the new CNT (FIG. 20) used in the present disclosure and the existing CNT (FIG. 21) may be compared as follows.

As can be seen from the SEM images, the new CNT applied to the present disclosure is a bundled type and has a multi-wall structure, but has a higher BET and a smaller wall number and diameter than the conventional CNT.

In the case of using the positive electrode active material in the form of a secondary particle, sufficient electrical conductivity could be achieved even if the existing CNT was used at a level of 0.4 wt % to 0.6 wt %. However, the single particle or pseudo-single particle positive electrode active material has higher resistance, compared to the conventional secondary particle type positive electrode active material, and the contact area with the conductive material is small, so the electrical conductivity is low. Thus, in order to realize sufficient electrical conductivity using the existing CNT with a BET specific surface area of less than 300 $m^2/g$, the content of the conductive material must be 0.9 wt % or more.

FIGS. 23 to 26 are graphs showing sheet resistance and high-temperature life characteristics for each conductive material ratio when single particles or pseudo-single particles are applied as the positive electrode active material.

Through the graphs, it may be understood that when a single particle or pseudo-single particle is applied as the positive electrode active material, the usage amount of conductive material should increase compared to the case of applying an existing positive electrode active material in the form of a secondary particle.

However, when the content of carbon nanotube is increased to 0.9 wt % or more, aggregation occurs in the positive electrode slurry, resulting in an increase in viscosity, and thus coating properties deteriorate. Therefore, in order to implement smooth coating properties, the viscosity of the positive electrode slurry must be lowered by reducing the solid content in the positive electrode slurry. However, when the solid content in the positive electrode slurry decreases, the content of active material decreases and the capacity characteristics deteriorate.

As a result of repeated research to solve this problem, the inventors of the present disclosure have found that when a carbon nanotube with a BET specific surface area of 300 $m^2/g$ to 500 $m^2/g$ is applied as a conductive material together with a positive electrode active material, which is a single particle-based active material particle, sufficient electrical conductivity can be secured with only a relatively small amount of carbon nanotube, and accordingly, the slurry viscosity can be maintained low even when the solid content of the positive electrode slurry is formed as high as 70 wt % to 80 wt %.

Specifically, the carbon nanotube used in the present disclosure may be a multi-wall carbon nanotube having a BET specific surface area of 300 $m^2/g$ to 500 $m^2/g$, preferably 300 $m^2/g$ to 450 $m^2/g$. When the BET specific surface area satisfies the above range, sufficient electrical conductivity may be secured even with a small amount of carbon nanotube.

In addition, the carbon nanotube may be a multi-wall carbon nanotube having a wall number of 2 to 8, preferably 2 to 6, more preferably 3 to 6.

In addition, the carbon nanotube may have a diameter of 1 nm to 8 nm, preferably 3 nm to 8 nm, more preferably 3 nm to 6 nm.

The carbon nanotube may be included in an amount of 0.7 wt % or less, preferably 0.3 wt % to 0.7 wt %, more preferably 0.4 wt % to 0.6 wt %, based on the total weight of the positive electrode active material layer. When the content of the carbon nanotube satisfies the above range, sufficient electrical conductivity may be achieved, and the solid content in the positive electrode slurry may be maintained high, so that the content of the positive electrode active material may be high in the positive electrode active material layer and, as a result, excellent capacity characteristics may be implemented.

Figures 26, 27:
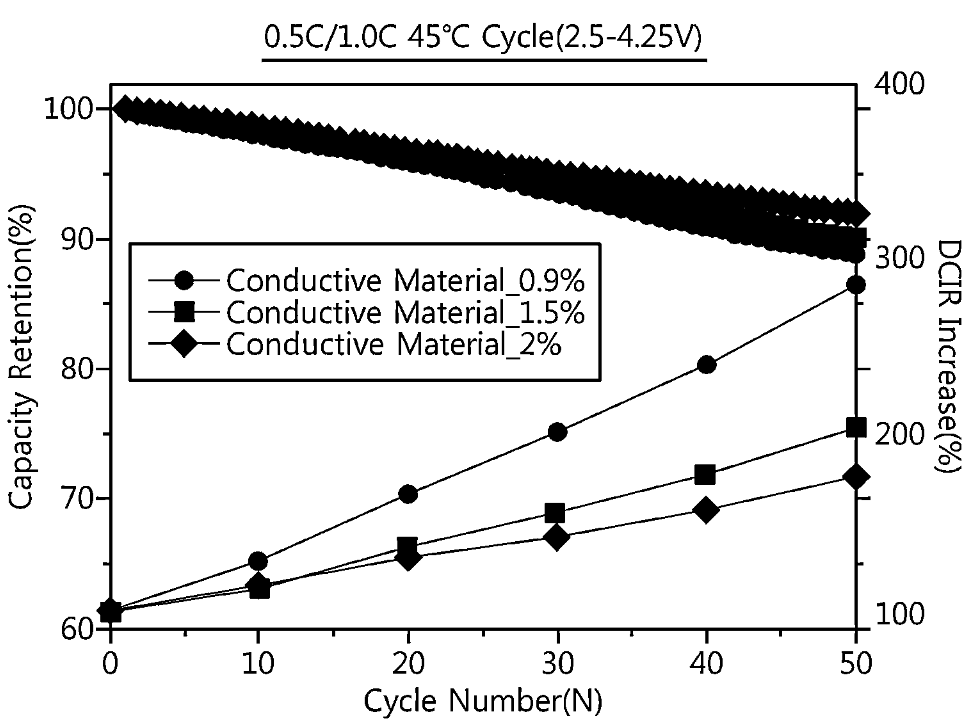
FIG. 27 is a table comparatively showing the solid content and viscosity of the positive electrode slurry and the resistance values of the MP coating layer and the MP interface layer when carbon nanotubes (new CNT) with a BET specific surface area of 300 $m^2/g$ to 500 $m^2/g$ are applied and when carbon nanotubes (existing CNT) with a BET of 200 $m^2/g$ or more and less than 300 $m^2/g$ are applied.

The table shown in FIG. 27 comparatively shows the solid content and viscosity of the positive electrode slurry and the resistance values at the MP coating layer and MP interface layer in the case where a carbon nanotube (new CNT) having a BET specific surface area of 300 $m^2/g$ to 500 $m^2/g$ is applied and the case where a carbon nanotube (existing CNT) having a BET of 200 $m^2/g$ or more and less than 300 $m^2/g$ is applied. Through the table, it may be found that when the new CNT is applied, the positive electrode slurry has a lower viscosity and excellent electrical conductivity even when the solid content of the positive electrode slurry is higher than that of the conventional CNT.

The binder serves to improve the attachment among the particles of the positive electrode active material and the adhesion between the positive electrode active material and the positive electrode current collector. Specific examples of the binder include polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer rubber (EPDM rubber), sulfonated-EPDM, styrene butadiene rubber (SBR), fluoro rubber, or various copolymers thereof, which may be used alone or as a mixture. The binder may be included in an amount of 1 wt % to 30 wt %, preferably 1 wt % to 20 wt %, more preferably 1 wt % to 10 wt %, based on the total weight of the positive electrode active material layer.

Another aspect of the present disclosure relates to an electrode assembly including the positive electrode, and a battery including the electrode assembly. The electrode assembly includes a negative electrode and a positive electrode, and the positive electrode has the above-described characteristics.

In the electrode assembly, for example, a separator may be stacked to be interposed between the negative electrode and the positive electrode to form a stacked or stacked/folded structure, or may be wound to form a jelly-roll structure. In addition, when the jelly-roll structure is formed, a separator may be additionally placed on the outer side in order to prevent the negative electrode and the positive electrode from contacting each other.

The negative electrode includes a negative electrode current collector; and a negative electrode active material layer formed on at least one side surface of the negative electrode current collector. The negative electrode may have a structure in which a negative electrode active material layer is formed on one surface or both surfaces of a long sheet-shaped negative electrode current collector, and the negative electrode active material layer may include a negative electrode active material, a conductive material, and a binder.

Specifically, the negative electrode may be manufactured by coating a negative electrode slurry, which is prepared by dispersing a negative electrode active material, a conductive material and a binder in a solvent such as dimethyl sulfoxide (DMSO), isopropyl alcohol, N-methylpyrrolidone (NMP), acetone, or water, on one surface or both surfaces of a long sheet-shaped negative electrode current collector, removing the solvent of the negative electrode slurry through a drying process, and then roll-pressing. When the negative electrode slurry is coated, a negative electrode having an uncoated portion may be manufactured by not applying the negative electrode slurry to a partial area of the negative electrode current collector, for example, one end of the negative electrode current collector.

As the negative electrode active material, a compound capable of reversible intercalation and de-intercalation of lithium may be used. Specific examples of the negative electrode active material include carbonaceous materials such as artificial graphite, natural graphite, graphitized carbon fiber, or amorphous carbon; silicon-based materials such as Si, Si-Me alloy (where Me is at least one selected from the group consisting of Al, Sn, Mg, Cu, Fe, Pb, Zn, Mn, Cr, Ti, and Ni), $SiO_y$ (where $0<y<2$), or Si—C composites; lithium metal thin film; metal materials capable of being alloyed with lithium, such as Sn or Al; and the like, which may be used alone or as a mixture.

In the present disclosure, the negative electrode may include a silicon-based negative electrode active material. The silicon-based negative electrode active material may be a Si, Si-Me alloy (where Me is one selected from the group consisting of Al, Sn, Mg, Cu, Fe, Pb, Zn, Mn, Cr, Ti, and Ni), $SiO_y$ (here, 0<<2), Si—C composites, or a combination thereof, and may be preferably $SiO_y$ (here, $0<y<2$). Since the silicon-based negative electrode active material has a high theoretical capacity, capacity characteristics may be improved when the silicon-based negative electrode active material is included.

The silicon-based negative electrode active material may be doped with Mb metal, and in this case, the Mb metal may be a Group 1 metal element or a Group 2 metal element, and specifically, may be Li, Mg, or the like. Specifically, the silicon-based negative electrode active material may be Si, $SiO_y$ (here, $0<y<2$), Si—C composites, or the like, doped with Mb metal. In the case of the metal-doped silicon-based negative electrode active material, the active material capacity is somewhat lowered due to the doping element, but high energy density may be realized due to its high efficiency.

Figure 44:
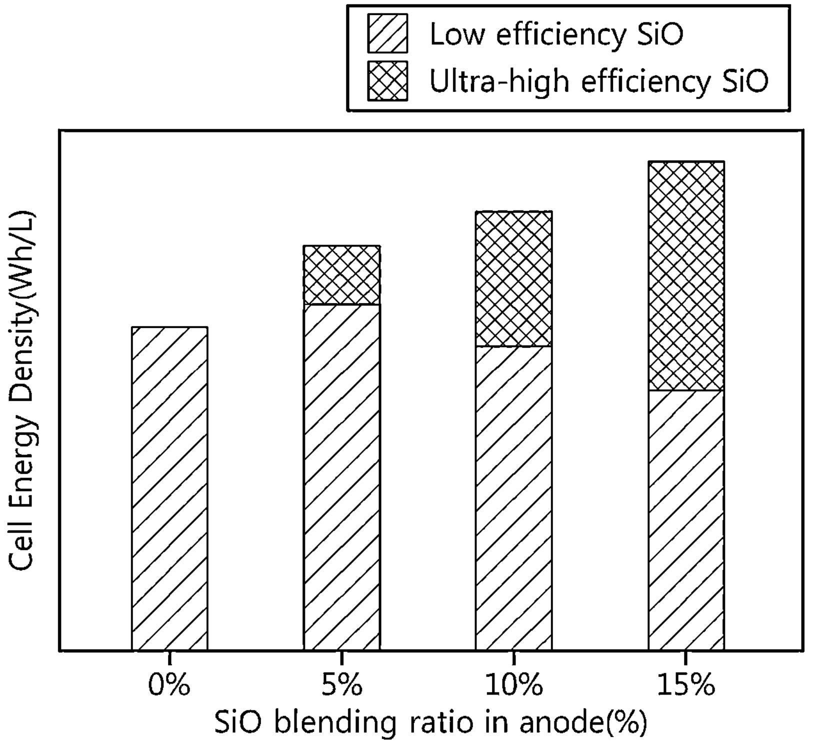
FIG. 44 is a graph showing the change in energy density depending on the content of a silicon-based negative electrode active material and the presence or absence of doping of the silicon-based negative electrode active material, in a battery using a mixture of a silicon-based negative electrode active material and a carbon-based negative electrode active material as a negative electrode active material.

FIG. 44 is a graph showing the change in energy density depending on the content of a silicon-based negative electrode active material and the presence or absence of doping of the silicon-based negative electrode active material, in a battery using a mixture of a silicon-based negative electrode active material and a carbon-based negative electrode active material as a negative electrode active material.

In FIG. 44, low efficiency SiO refers to un-doped SiO, and ultra-high efficiency SiO refers to Mg/Li-doped SiO. Through FIG. 44, it may be found that the energy density improves as the content of the silicon-based negative electrode active material among the total negative electrode active materials increases. In addition, it may be found that as the ratio of the doped silicon-based negative electrode active material among the silicon-based negative electrode active materials increases, the effect of improving the energy density becomes better.

The silicon-based negative electrode active material may further include a carbon coating layer on the particle surface. At this time, the carbon coating amount may be 20 wt % or less, preferably 1 wt % to 20 wt %, based on the total weight of the silicon-based negative electrode active material. The carbon coating layer may be formed through a method such as dry coating, wet coating, chemical vapor deposition (CVD), physical vapor deposition (PVD), or atomic layer deposition (ALD).

In one embodiment of the present disclosure, the silicon-based negative electrode active material may have a capacity of 1000 mAh/g to 4000 mAh/g, and an initial efficiency of about 60% to 95%.

In another embodiment of the present disclosure, $D_{50}$ of the silicon-based negative electrode active material may be 3 μm to 8 μm, and $D_{min}$ to $D_{max}$ may be included in the range of 0.5 μm to 30 μm.

The negative electrode, if necessary, may further include a carbon-based negative electrode active material as a negative electrode active material. The carbon-based negative electrode active material may be, for example, artificial graphite, natural graphite, graphitized carbon fiber, amorphous carbon, soft carbon, hard carbon, or the like, but is not limited thereto.

When using a mixture of the silicon-based negative electrode active material and the carbon-based negative electrode active material as the negative electrode active material, the mixing ratio of the silicon-based negative electrode active material and the carbon-based negative electrode active material may be 1:99 to 20:80, preferably 1:99 to 15:85, more preferably 1:99 to 10:90, in weight ratio.

The negative electrode active material may be included in an amount of 80 wt % to 99 wt %, preferably 85 wt % to 99 wt %, more preferably 90 wt % to 99 wt %, based on the total weight of the negative electrode active material layer.

If necessary, the negative electrode active material may further include at least one selected from lithium metal and metal materials capable of alloying with lithium, such as Sn or Al.

As the negative electrode current collector, negative electrode current collectors generally used in the art may be used, and, for example, copper, stainless steel, aluminum, nickel, titanium, calcined carbon; copper or stainless steel surface-treated with carbon, nickel, titanium, silver, etc.; aluminum-cadmium alloy; and the like may be used. The negative electrode current collector may typically have a thickness of 3 μm to 500 μm, and, like the positive electrode current collector, fine irregularities may be formed on the surface of the current collector to enhance the bonding force of the negative electrode active material. For example, the negative electrode current collector may be used in various forms such as films, sheets, foils, nets, porous materials, foams, or nonwoven fabrics.

The conductive material is used to impart conductivity to the negative electrode, and any material that has electronic conductivity without causing chemical change inside the battery may be used without particular limitations. Specific examples of the conductive material include graphite such as natural graphite or artificial graphite; carbon-based materials such as carbon black, acetylene black, Ketjen black, channel black, furnace black, lamp black, thermal black, carbon fiber, or carbon nanotube; metal powders or metal fibers such as copper, nickel, aluminum, or silver; conductive whiskers such as zinc oxide or potassium titanate; conductive metal oxides such as titanium oxide; and conductive polymers such as polyphenylene derivatives, which may be used alone or as a mixture. The conductive material may be typically included in an amount of 1 wt % to 30 wt %, preferably 1 wt % to 20 wt %, more preferably 1 wt % to 10 wt %, based on the total weight of the negative electrode active material layer.

The binder serves to improve the attachment among the particles of the negative electrode active material and the adhesion between the negative electrode active material and the negative electrode current collector. Specific examples of the binder include polyvinylidene fluoride (PVDF), vinylidene fluoride-hexafluoropropylene copolymer (PVDF-co-HFP), polyvinyl alcohol, polyacrylonitrile, and carboxymethyl cellulose. (CMC), starch, hydroxypropyl cellulose, regenerated cellulose, polyvinyl pyrrolidone, polytetrafluoroethylene, polyethylene, polypropylene, ethylene-propylene-diene monomer rubber (EPDM rubber), sulfonated-EPDM, styrene butadiene rubber (SBR), fluoro rubber, or various copolymers thereof, and the like, which may be used alone or as a mixture. The binder may be included in an amount of 1 wt % to 30 wt %, preferably 1 wt % to 20 wt %, more preferably 1 wt % to 10 wt %, based on the total weight of the negative electrode active material layer.

The electrode assembly further includes a separator, and the separator is disposed in the electrode assembly in a manner interposed between the negative electrode and the positive electrode. The separator separates the negative electrode from the positive electrode and provides a path for lithium ion movement. Any material used as a separator in a lithium battery may be used without particular limitations.

The separator may use a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure of two or more layers thereof used. In addition, conventional porous non-woven fabrics, for example, non-woven fabrics made of high melting point glass fibers, polyethylene terephthalate fibers, or the like may be used. In addition, a coated separator containing a ceramic component or a polymer material may be used to secure heat resistance or mechanical strength.

Another aspect of the present disclosure relates to a battery including the electrode assembly. The battery includes a battery case in which the electrode assembly and an electrolyte are accommodated together. As for the battery case, any case commonly used in the art such as a pouch type or a metal can type may be selected without particular limitation.

As the electrolyte used in the present disclosure, various electrolytes usable in lithium batteries, such as organic liquid electrolyte, inorganic liquid electrolyte, solid polymer electrolyte, gel polymer electrolyte, inorganic solid electrolyte, or molten inorganic electrolyte, may be used, and the type is not particularly limited.

Specifically, the electrolyte may include an organic solvent and a lithium salt.

The organic solvent may use any material that may serve as a medium through which ions involved in the electrochemical reaction of the battery may move without particular limitation. Specifically, as the organic solvent, ester-based solvents such as methyl acetate, ethyl acetate, γ-butyrolactone, or ε-caprolactone: ether-based solvents such as dibutyl ether or tetrahydrofuran: ketone-based solvents such as cyclohexanone; aromatic hydrocarbon-based solvents such as benzene or fluorobenzene; carbonate-based solvents such as dimethyl carbonate (DMC), diethyl carbonate (DEC), methylethyl carbonate (MEC), ethylmethyl carbonate (EMC), ethylene carbonate (EC) or propylene carbonate (PC): alcohol-based solvents such as ethyl alcohol or isopropyl alcohol: nitriles such as R—CN (R is a C2 to C20 straight-chain, branched or cyclic hydrocarbon group, and may contain a double-bonded aromatic ring or an ether bond); amides such as dimethylformamide; dioxolanes such as 1,3-dioxolane; or sulfolanes may be used. Among them, carbonate-based solvents are preferred, and a mixture of cyclic carbonates (e.g., ethylene carbonate or propylene carbonate) having high ionic conductivity and high permittivity capable of increasing the charge and discharge performance of the battery and low-viscosity linear carbonate-based compound (e.g., ethyl methyl carbonate, dimethyl carbonate or diethyl carbonate) is more preferred.

As the lithium salt, any compound capable of providing lithium ions used in a lithium battery may be used without particular limitation. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiCAF_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$ or the like may be used as the lithium salt. The concentration of the lithium salt is preferably within the range of 0.1M to 5.0M, preferably 0.1M to 3.0M. When the concentration of the lithium salt is within the above range, the electrolyte has appropriate conductivity and viscosity, so it may exhibit excellent electrolyte performance, and lithium ions may move effectively.

In addition to the components of the electrolyte, the electrolyte may additionally include additives for the purpose of improving the lifespan characteristics of the battery, suppressing the decrease in battery capacity, and improving the discharge capacity of the battery. For example, haloalkylene carbonate-based compounds such as difluoroethylene carbonate, pyridine, triethylphosphite, triethanolamine, cyclic ether, ethylene diamine, n-glyme, hexamethyl phosphate triamid, nitrobenzene derivatives, sulfur, quinone imine dyes, N-substituted oxazolidinones, N,N-substituted imidazolidines, ethylene glycol dialkyl ethers, ammonium salts, pyrroles, 2-methoxy ethanol, aluminum trichloride or the like may be used alone or as a mixture as the additives, without being limited thereto. The additive may be included in an amount of 0.1 wt % to 10 wt %, preferably 0.1 wt % to 5 wt %, based on the total weight of the electrolyte.

In another embodiment of the present disclosure, the positive electrode may include a loading reduction portion with a smaller loading amount of the positive electrode active material, compared to an adjacent region. If the positive electrode has such a structure, the region of the positive electrode active material portion may be increased without worrying about precipitation of lithium. Accordingly, the energy density of the electrode assembly may be improved.

Recently, in order to realize high energy density and reduce cost, development is progressing in the direction of increasing the size of the battery. Depending on the size of the battery, as the energy increases, the resistance of battery should decrease. To reduce the resistance, a method of using the current collector of the electrode as an electrode tab rather than a method of attaching an electrode tab to the electrode may be used. At this time, due to the nature of the electrode manufacturing process of applying the electrode slurry on the electrode current collector, a portion in which the loading amount is reduced occurs at the boundary between the negative electrode active material portion coated with the negative electrode slurry and the negative electrode current collector. Considering the N/P ratio, there is a possibility that metallic lithium is precipitated on the positive electrode active material portion facing the portion where the loading amount is reduced. Here, the N/P ratio is a value obtained by dividing the capacity of the negative electrode, which is calculated considering the area and capacity per mass of the negative electrode, by the capacity of the positive electrode, which is obtained considering the area and capacity per mass of the positive electrode, and generally has a value of 1 or more. That is, the capacity of the negative electrode is adjusted large. For reference, if the N/P ratio is less than 1, metallic lithium is likely to be precipitated during charging and discharging, which causes rapid deterioration in safety of the battery during high rate charging and discharging. In other words, the N/P ratio has a significant effect on the safety and capacity of the battery. Due to the risk of metal lithium precipitation as described above, the positive electrode active material portion cannot be located on the portion of the positive electrode facing the portion where the loading amount of the negative electrode is reduced. This causes the energy density of the battery not to increase. Accordingly, in the present disclosure, the energy density is improved by increasing the region of the positive electrode active material portion.

Figure 32:
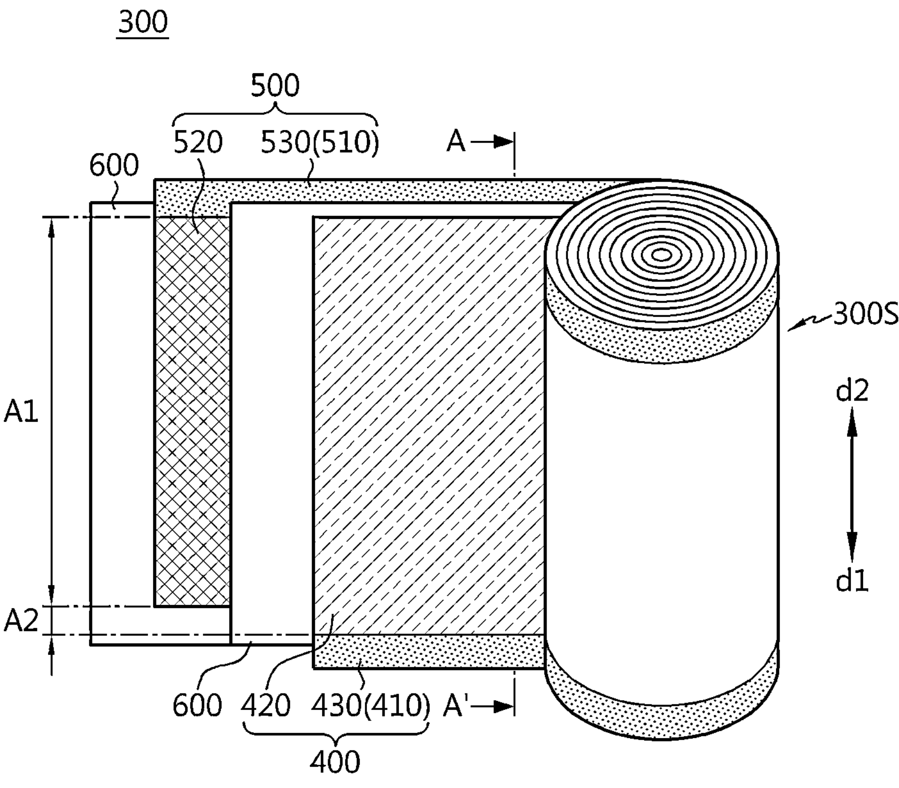
FIG. 32 is a diagram showing an electrode assembly according to an embodiment of the present disclosure.
Figure 33:
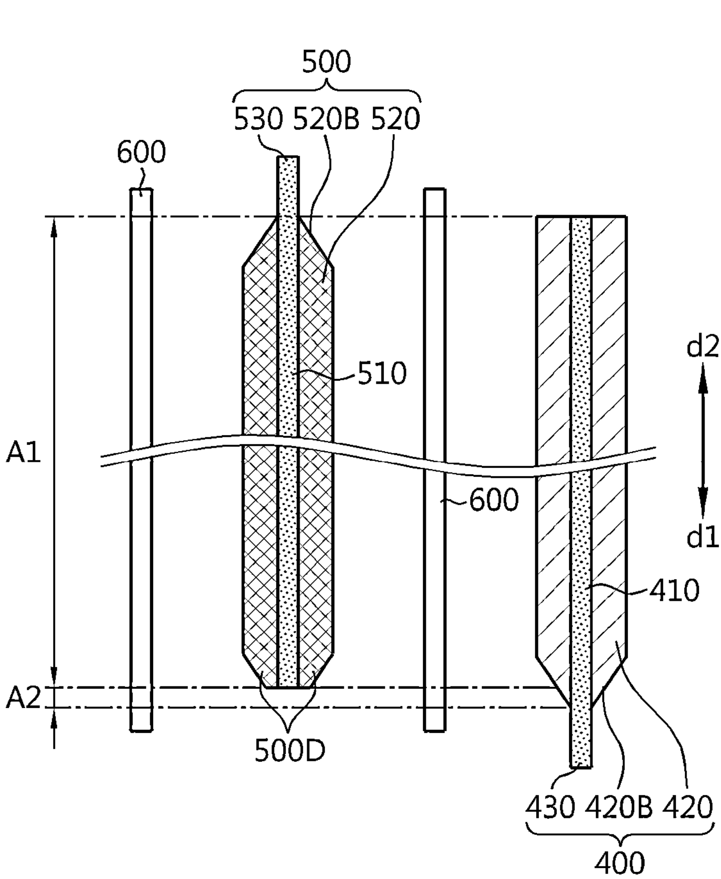
FIG. 33 is a cross-sectional view, taken along the cutting line A-A' in FIG. 32.

FIG. 32 is a diagram showing an electrode assembly according to an embodiment of the present disclosure, and FIG. 33 is a cross-sectional view, taken along the cutting line A-A' in FIG. 32.

Referring to FIGS. 32 and 33, an electrode assembly 300 according to an embodiment of the present disclosure includes a negative electrode 400, a positive electrode 500, and a separator 600. The separator 600 is located between the negative electrode 400 and the positive electrode 500. The negative electrode 400, the positive electrode 500, and the separator 600 are wound together to form a jelly-roll structure 300S. Here, the jelly-roll structure 300S refers to a structure formed by winding the negative electrode 400, the positive electrode 500, and the separator 600. In addition, when the jelly-roll structure 300S is formed, it is preferable that a separator 600 is additionally disposed on the outer side in order to prevent the negative electrode 400 and the positive electrode 500 from contacting each other.

The negative electrode 400 includes a negative electrode current collector 410 and a negative electrode active material portion 420 formed by coating a negative electrode active material on the negative electrode current collector 410. In particular, as shown in the drawings, the negative electrode active material may be coated on both surfaces of the negative electrode current collector 410 to form the negative electrode active material portion 420. In addition, in the negative electrode current collector 410, a negative electrode uncoated portion 430 to which the negative electrode active material is not applied extends in the first direction d1. The negative electrode uncoated portion 430 extends along one end of the wound negative electrode 400. In addition, the negative electrode uncoated portion 430 extends beyond the separator 600 in the first direction d1. Accordingly, the negative electrode uncoated portion 430 may be exposed at one end in the first direction of the jelly-roll structure 300S.

The positive electrode 500 includes a positive electrode current collector 510 and a positive electrode active material portion 520 formed by coating a positive electrode active material on the positive electrode current collector 510. In particular, as shown in the drawings, the positive electrode active material may be coated on both surfaces of the positive electrode current collector 510 to form the positive electrode active material portion 520. Also, in the positive electrode current collector 510, a positive electrode uncoated portion 530 to which the positive electrode active material is not applied extends in the second direction d2. The positive electrode uncoated portion 530 extends along one end of the wound positive electrode 500. In addition, the positive electrode uncoated portion 530 extends beyond the separator 600 in the second direction d2. Accordingly, the positive electrode uncoated portion 530 may be exposed at one end in the second direction of the jelly-roll structure 300S.

Here, first direction d1 and second direction d2 are directions opposite to each other. Also, the first direction d1 and the second direction d2 may be directions parallel to the height direction of the jelly-roll structure 300S.

The electrode assembly 300 according to this embodiment has a structure in which a separate electrode tab is not attached, but the negative electrode uncoated portion 430 of the negative electrode current collector 410 and the positive electrode uncoated portion 530 of the positive electrode current collector 510 themselves are used as electrode tabs in order to reduce resistance.

Although not shown in the drawings, the negative electrode uncoated portion 430 and/or the positive electrode uncoated portion 530 may have substantially the same structure of the uncoated portion of the electrode described above.

In one embodiment, the positive electrode active material portion 520 includes a loading reduction portion 500D having a smaller loading amount of positive electrode active material than an adjacent area, and the loading reduction portion 500D is located at one end in the first direction d1 of the positive electrode 500. Also, more specifically, in the loading reduction portion 500D, the loading amount of the positive electrode active material may gradually decrease in the first direction d1.

Here, the loading amount means the amount of active material applied per unit area. In a portion having a large loading amount, a lot of negative electrode active material or positive electrode active material is applied to the unit area, so the negative electrode active material portion or the positive electrode active material portion may have a relatively greater thickness. In a portion having a small loading amount, a small amount of negative electrode active material or positive electrode active material is applied to the unit area, so the negative electrode active material portion or the positive electrode active material portion may have a relatively smaller thickness.

The active material portion may be formed by applying a slurry containing an active material. In this process, a boundary portion having a gradually decreasing loading amount may be formed between the uncoated portion and the active material portion.

Specifically, the negative electrode active material portion 420 may include a negative electrode boundary portion 420B forming a boundary between the negative electrode active material portion 420 and the negative electrode uncoated portion 430. The loading amount of the negative electrode boundary portion 420B may decrease in a direction toward the negative electrode uncoated portion 430.

Similarly, the positive electrode active material portion 520 may include a positive electrode boundary portion 520B forming a boundary between the positive electrode active material portion 520 and the positive electrode uncoated portion 530. The loading amount of the positive electrode boundary portion 520B may decrease in a direction toward the positive electrode uncoated portion 530.

The negative electrode boundary portion 420B or the positive electrode boundary portion 520B in which the loading amount gradually decreases as above is naturally generated in the process of applying the slurry containing the active material to the negative electrode current collector 410 or the positive electrode current collector 510.

In this case, in a region corresponding to the positive electrode boundary portion 520B, based on a direction perpendicular to the second direction d2, the amount of the positive electrode active material may be smaller than the amount of the negative electrode active material. Since the N/P ratio has a value greater than 1, the problem of precipitation of metallic lithium does not occur.

However, there is a problem in a region corresponding to the negative electrode boundary portion 420B. In the region corresponding to the negative electrode boundary portion 420B, based on a direction perpendicular to the first direction d1, the amount of the negative electrode active material may be smaller than the amount of the positive electrode active material. This may cause a problem of precipitation of metallic lithium because the N/P ratio has a value smaller than 1.

Accordingly, in this embodiment, the loading reduction portion 500D is provided on the positive electrode 500, and the negative electrode active material portion 420 may be located in a portion corresponding to the loading reduction portion 500D based on a direction perpendicular to the first direction d1. More specifically, the negative electrode boundary portion 420B may be located at a portion corresponding to the loading reduction portion 500D based on a direction perpendicular to the first direction d1.

The loading reduction portion 500D having a smaller loading amount of positive electrode active material than adjacent areas is provided at a position corresponding to the negative electrode boundary portion 420B having a gradually decreasing loading amount, so that the region where the positive electrode active material is applied may be increased without worrying about lithium precipitation. In particular, the loading amount of the positive electrode active material may gradually decrease in the loading reduction portion 500D along the first direction d1, corresponding to the shape of the negative electrode boundary portion 420B in which the loading amount gradually decreases in a direction toward the negative electrode uncoated portion 430. Therefore, it is possible to maintain a high N/P ratio of the negative electrode 400 and the positive electrode 500 in the region where the negative electrode boundary portion 420B is formed, thereby preventing lithium precipitation.

Hereinafter, a method for manufacturing an electrode assembly according to an embodiment of the present disclosure will be described in detail with reference to FIGS. 34 to 39.

Figure 34:
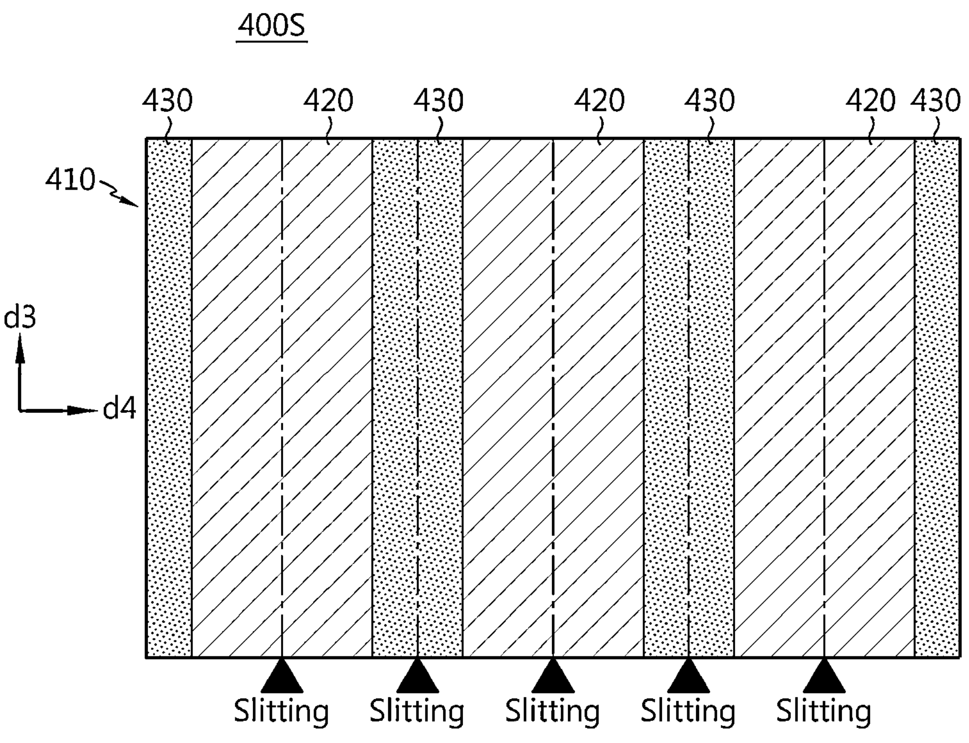
FIGS. 34 and 35 are diagrams showing a process of manufacturing a negative electrode according to an embodiment of the present disclosure.
Figure 35:
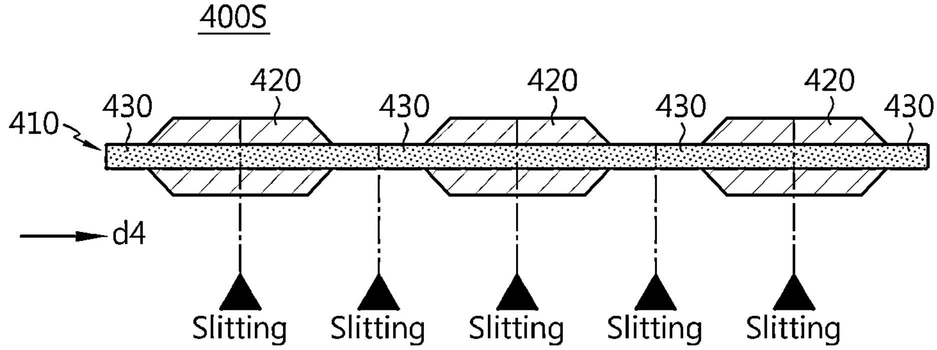

FIGS. 34 and 35 are diagrams illustrating a process of manufacturing a negative electrode according to an embodiment of the present disclosure. Specifically, FIG. 34 is a plan view showing the negative electrode sheet from above, and FIG. 35 is a front view showing the negative electrode sheet of FIG. 34 from the front.

Referring to FIGS. 34 and 35, in the method for manufacturing an electrode assembly according to an embodiment of the present disclosure includes a step of manufacturing a negative electrode sheet 400S so that a negative electrode active material portion 420 coated with a negative electrode active material and a negative electrode uncoated portion

430 not coated with a negative electrode active material are alternately located on a negative electrode current collector 410.

Specifically, the negative electrode active material portion 420 may be formed by applying the negative electrode active material to extend along the third direction d3. In addition, a plurality of negative electrode active material portions 420 may be located to be spaced apart along the fourth direction d4 by spacing the coated portions along the fourth direction d4 perpendicular to the third direction d3. That is, the coating process may be performed so that the negative electrode uncoated portion 430 is positioned between the plurality of negative electrode active material portions 420.

Here, the third direction d3 and the fourth direction d4 are directions for explanation based on the negative electrode sheet 400S, and are directions unrelated to the first direction d1 and the second direction d2 in the jelly-roll structure 300S described above.

Figure 36:
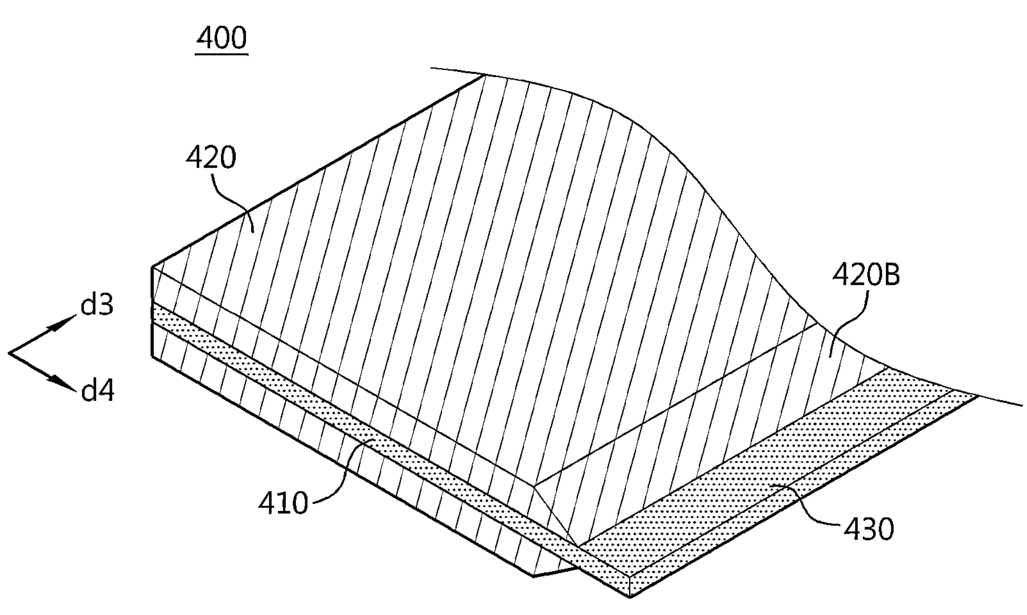
FIG. 36 is a perspective view showing a negative electrode according to an embodiment of the present disclosure.

After that, a step of manufacturing a negative electrode 400 by slitting the negative electrode uncoated portion 430 and the negative electrode active material portion 420 may be followed. FIG. 36 is a perspective view showing a negative electrode according to an embodiment of the present disclosure.

Referring to FIGS. 34 to 36, slitting may be performed in a direction parallel to the third direction d3 for the negative electrode uncoated portion 430 and the negative electrode active material portion 420, respectively, as indicated by dotted lines in FIGS. 34 and 35. Accordingly, several negative electrodes 400 as shown in FIG. 36 may be manufactured from the negative electrode sheet 400S. That is, the negative electrode 400 of FIG. 36 corresponds to one of several negative electrodes manufactured by slitting the negative electrode sheet 400S of FIGS. 34 and 35. By slitting the negative electrode uncoated portion 430 and the negative electrode active material portion 420 of the negative electrode sheet 400S, respectively, the negative electrode 400 in which the negative electrode uncoated portion 430 extends at one side may be manufactured.

When forming the negative electrode active material portion 420, a slurry containing the negative electrode active material may be applied on the negative electrode current collector 410. In the process of applying the slurry, a negative electrode boundary portion 420B having a loading amount decreasing in a direction toward the negative electrode uncoated portion 430 may be formed at the boundary between the negative electrode active material portion 420 and the negative electrode uncoated portion 430.

Figure 37:
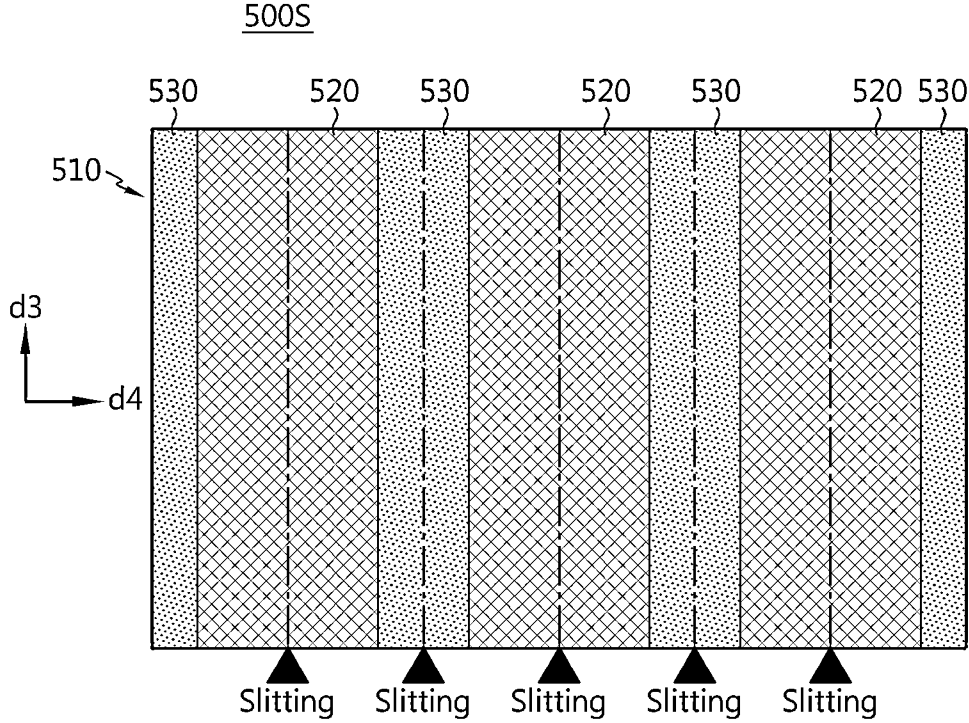
FIGS. 37 and 38 are diagrams showing a process of manufacturing a positive electrode according to an embodiment of the present disclosure.
Figure 38:
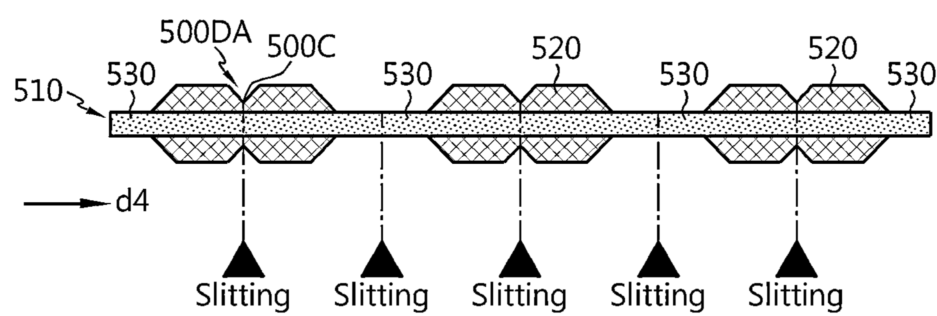

FIGS. 37 and 38 are diagrams showing a process of manufacturing a positive electrode according to an embodiment of the present disclosure. Specifically, FIG. 37 is a plan view showing the positive electrode sheet from above, and FIG. 38 is a front view showing the positive electrode sheet of FIG. 37 from the front.

Referring to FIGS. 37 and 38, the method for manufacturing an electrode assembly according to an embodiment of the present disclosure includes a step of manufacturing a positive electrode sheet 500S so that a positive electrode active material portion 520 coated with a positive electrode active material and a positive electrode uncoated portion 530 not coated with a positive electrode active material are alternately located on the positive electrode current collector 510.

Specifically, the positive electrode active material portion 520 may be formed by applying the positive electrode active material to extend along the third direction d3. In addition, a plurality of positive electrode active material portions 520 may be located to be spaced apart by adjusting the coating interval along the fourth direction d4 perpendicular to the third direction d3. That is, the coating process may be performed so that the positive electrode uncoated portion 530 is located between the plurality of positive electrode active material portions 520.

Here, third direction d3 and fourth direction d4 are directions for description based on the positive electrode sheet 500S, and are directions unrelated to the first direction d1 and the second direction d2 in the jelly-roll structure 300S described above.

Figure 39:
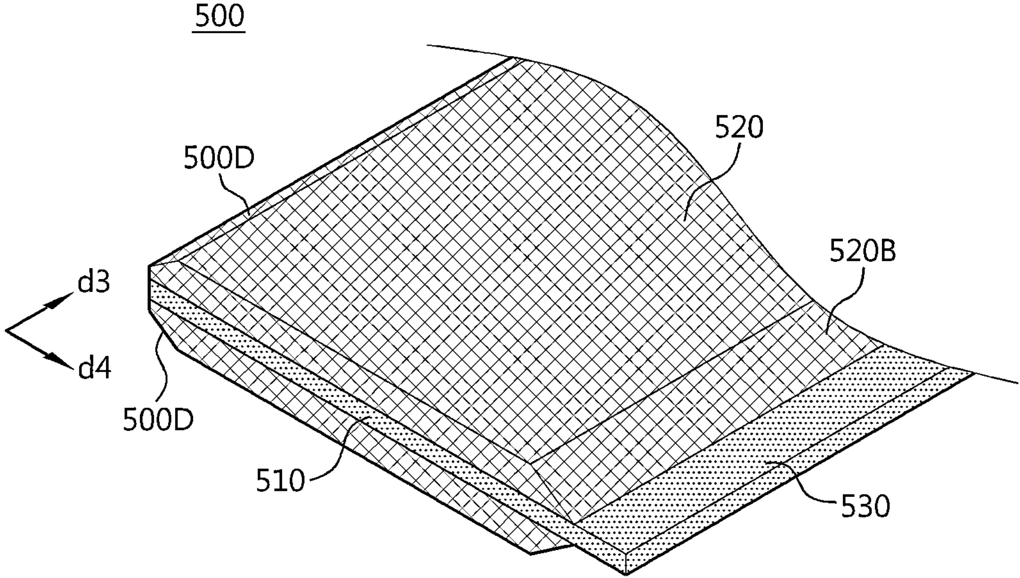
FIG. 39 is a perspective view showing a positive electrode according to an embodiment of the present disclosure.

After that, a step of manufacturing a positive electrode 500 by slitting the positive electrode uncoated portion 530 and the positive electrode active material portion 520 may be followed. FIG. 39 is a perspective view showing a positive electrode 500 according to an embodiment of the present disclosure.

Referring to FIGS. 37 to 39, slitting may be performed in a direction parallel to the third direction d3 for the positive electrode uncoated portion 530 and the positive electrode active material portion 520, respectively, as indicated by dotted lines in FIGS. 37 and 38. Accordingly, several positive electrodes 500 as shown in FIG. 39 may be manufactured from the positive electrode sheet 500S. That is, the positive electrode 500 of FIG. 39 corresponds to one of several positive electrodes manufactured by slitting the positive electrode sheet 500S of FIGS. 37 and 38. By slitting the positive electrode uncoated portion 530 and the positive electrode active material portion 520 of the positive electrode sheet 500S, respectively, the positive electrode 500 in which the positive electrode uncoated portion 530 extends at one side may be manufactured.

When forming the positive electrode active material portion 520, a slurry containing the positive electrode active material may be applied on the positive electrode current collector 510. In the process of applying the slurry, a positive electrode boundary portion 520B having a loading amount decreasing in a direction toward the positive electrode uncoated portion 530 may be formed at the boundary between the positive electrode active material portion 520 and the positive electrode uncoated portion 530.

Referring to FIGS. 32, 36 and 39 together, a step of forming a jelly-roll structure 300S by winding the negative electrode 400 and the positive electrode 500 together with the separator 600 may be followed. At this time, in the jelly-roll structure 300S, the negative electrode uncoated portion 430 may extend beyond the separator 600 in a first direction d1, and the positive electrode uncoated portion 530 may extend beyond the separator 600 in a second direction d2 opposite to the first direction d1.

Referring to FIGS. 37 to 39 again, in the method for manufacturing an electrode assembly according to an embodiment of the present disclosure, the positive electrode sheet 500S includes a loading reduction area 500DA in which the loading amount of the positive electrode active material is smaller than that of the adjacent area. There is no particular limitation in the method of forming the loading reduction area 500DA, and for example, it may be formed by adjusting the degree of coating of the slurry.

In the step of manufacturing the positive electrode 500, the loading reduction area 500DA of the positive electrode active material portion 520 is slit. The slitted loading reduction area 500DA forms a loading reduction portion 500D having a smaller loading amount of the positive electrode active material than the adjacent area in the jelly-roll structure 300S shown in FIGS. 32 and 33.

Specifically, a loading reduction area 500DA having a smaller loading amount of the positive electrode active material than the adjacent area is formed in the positive electrode active material portion 520 formed on the positive electrode sheet 500S. As shown in FIG. 38, the loading reduction area 500DA may be formed in the center of the positive electrode active material portion 520. Meanwhile, the loading reduction area 500DA may be configured such that the loading amount of the positive electrode active material gradually decreases toward the center portion 500C of the loading reduction area 500DA, and in the step of manufacturing the positive electrode 500, the loading reduction portion 500D according to this embodiment may be provided by slitting the center portion 500C of the loading reduction area 500DA.

That is, in applying the slurry containing a positive electrode active material, by forming the loading reduction area 500DA and slitting the center portion 500C of the loading reduction area 500DA, several positive electrodes 500 having the loading reduction portion 500D may be manufactured.

Referring to FIG. 39, the loading reduction portion 500D may be provided at one end of the manufactured positive electrode 500, and the positive electrode uncoated portion 530 may be provided at the other end of the positive electrode 500 opposite to the one end.

Referring to FIGS. 32 and 33, when the positive electrode 500 is wound to form a jelly-roll structure 300S, the loading reduction portion 500D may be located at one end in the first direction d1 of the positive electrode 500, and the positive electrode uncoated portion 530 may be located at one end in the second direction d2 of the positive electrode 500.

In addition, as the center portion 500C of the loading reduction area 500DA is slitted, the loading amount of the positive electrode active material in the loading reduction portion 500D may gradually decrease along the first direction d1.

In addition, in the jelly-roll structure 300S, the negative electrode active material portion 420 may be located at a portion corresponding to the loading reduction portion 500D based on a direction perpendicular to the first direction d1. More specifically, in the jelly-roll structure 300S, the negative electrode boundary portion 420B may be located at a portion corresponding to the loading reduction portion 500D based on a direction perpendicular to the first direction d1.

The corresponding positional relationship between the loading reduction portion 500D and the negative electrode boundary portion 420B has already been described above and thus will not be described again.

Hereinafter, with reference to FIGS. 40 to 43, an electrode assembly according to a comparative example will be described, and advantages of the electrode assembly according to this embodiment compared to the electrode assembly according to the comparative example will be described.

Figure 40:
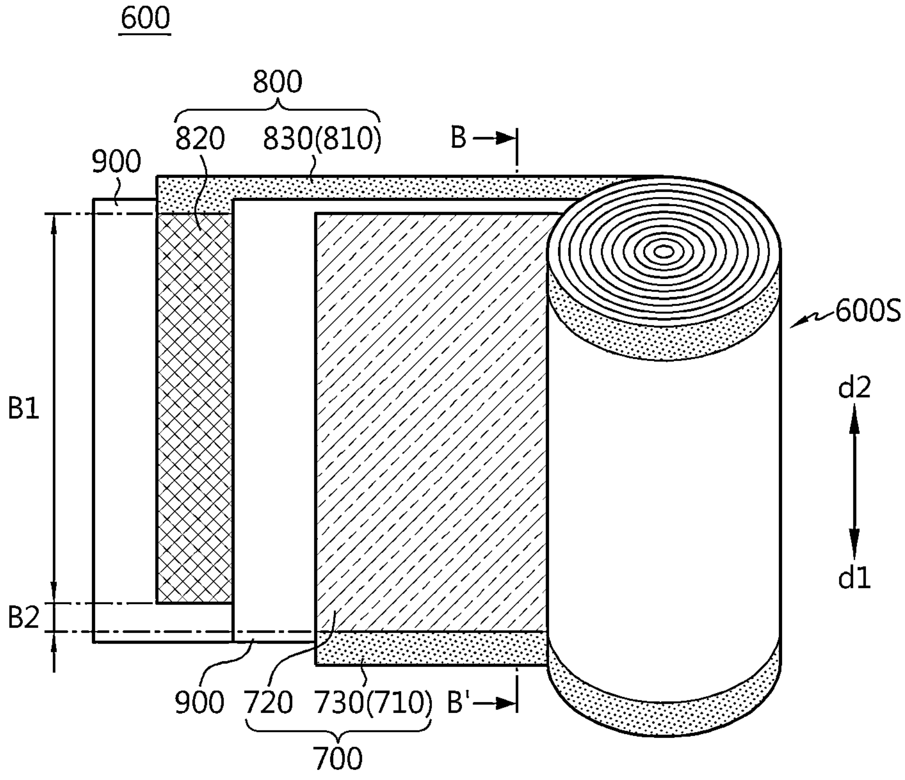
FIG. 40 is a diagram showing an electrode assembly according to a comparative example.
Figure 41:
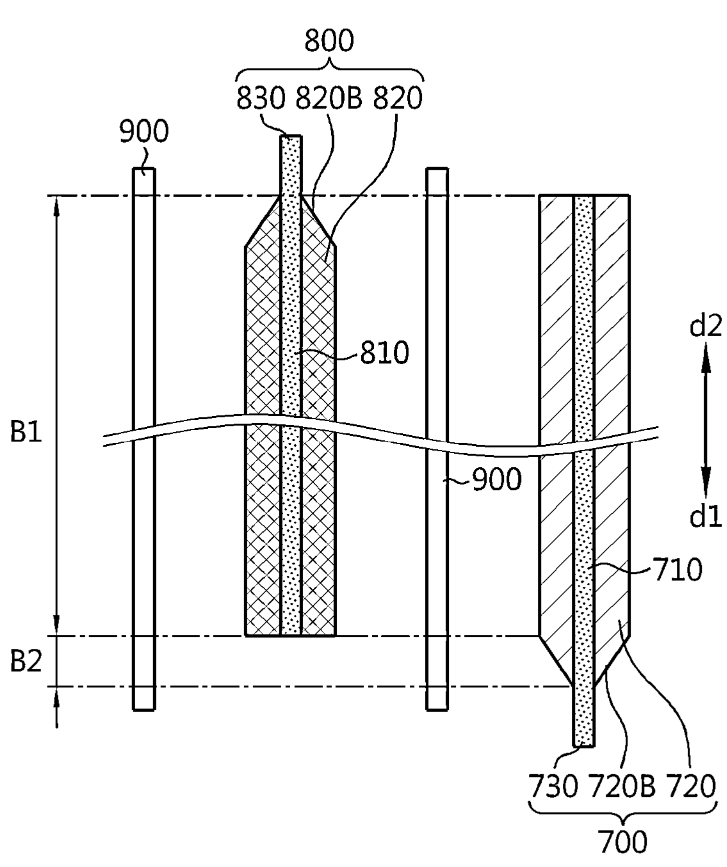
FIG. 41 is a cross-sectional view, taken along the cutting line B-B' in FIG. 40.

FIG. 40 is a diagram showing an electrode assembly according to a comparative example. FIG. 41 is a cross-sectional view, taken along the cutting line B-B' in FIG. 40.

Referring to FIGS. 40 and 41, the electrode assembly 600 according to the comparative example includes a negative electrode 700, a positive electrode 800 and a separator 900, and the negative electrode 700, the positive electrode 800 and the separator 900 are wound to form a jelly-roll structure 600S.

The negative electrode 700 may include a negative electrode current collector 710, a negative electrode active material portion 720, and a negative electrode uncoated portion 730. In addition, the negative electrode uncoated portion 730 may extend in the first direction d1, and the negative electrode active material portion 720 may include a negative electrode boundary portion 720B that forms a boundary between the negative electrode active material portion 720 and the negative electrode uncoated portion 730 and has a gradually decreasing loading amount.

Figure 42:
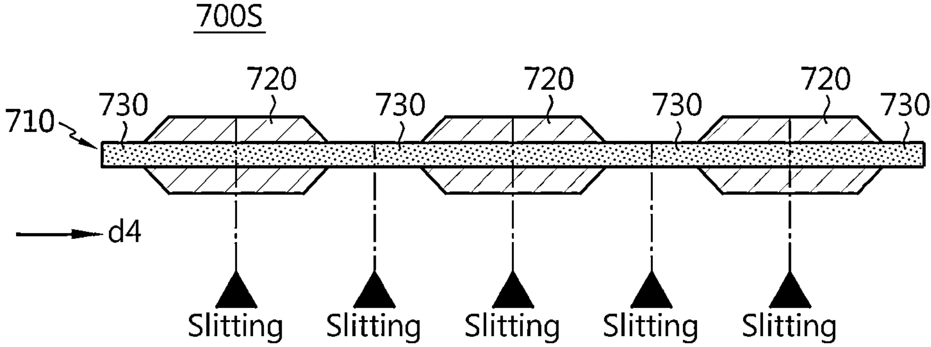
FIG. 42 is a diagram showing a process of manufacturing a negative electrode according to a comparative example.

FIG. 42 is a diagram showing a process of manufacturing a negative electrode 700 according to a comparative example.

Referring to FIG. 42, after the negative electrode sheet 700S is manufactured so that the negative electrode active material portion 720 and the negative electrode uncoated portion 730 are alternately positioned along the fourth direction d4, a plurality of negative electrodes 700 may be manufactured by slitting the negative electrode uncoated portion 730 and the negative electrode active material portion 720.

Meanwhile, referring to FIGS. 40 and 41 again, the positive electrode 800 may include a positive electrode current collector 810, a positive electrode active material portion 820, and a positive electrode uncoated portion 880. In addition, the positive electrode uncoated portion 830 may extend in the second direction d2 opposite to the first direction d1, and the positive electrode active material portion 820 may include a positive electrode boundary portion 820B that forms a boundary between the positive electrode active material portion 820 and the positive electrode uncoated portion 830 and has a gradually decreasing loading amount.

Figure 43:
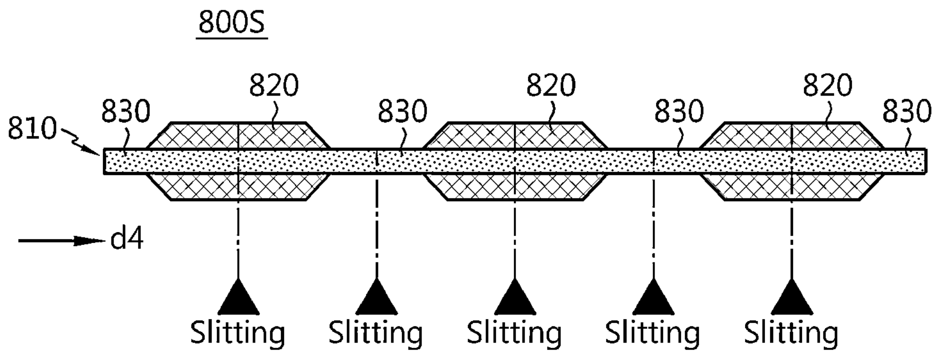
FIG. 43 is a diagram showing a process of manufacturing a positive electrode according to a comparative example.

FIG. 43 is a diagram showing a process of manufacturing a positive electrode 800 according to a comparative example.

Referring to FIG. 43, after the positive electrode sheet 800S is manufactured so that the positive electrode active material portion 820 and the positive electrode uncoated portion 830 are alternately positioned along the fourth direction d4, a plurality of positive electrodes 800 may be manufactured by slitting the positive electrode uncoated portion 830 and the positive electrode active material portion 820.

After that, the negative electrode 700 and the positive electrode 800 manufactured as above may be wound together with the separator 900 to manufacture an electrode assembly 600 according to the comparative example.

That is, the electrode assembly 600 according to the comparative example may have a structure similar to that of the electrode assembly 300 according to this embodiment, except for the loading reduction portion 500D (see FIG. 33).

Referring to FIGS. 40 and 41, in the case of the electrode assembly 600 according to the comparative example, the positive electrode active material portion 820 cannot be located in a portion corresponding to the negative electrode boundary portion 720B, based on a direction perpendicular to the first direction d1. If the positive electrode active material portion 820 extends to a portion corresponding to the negative electrode boundary portion 720B, the corresponding portion has a low N/P ratio value and is highly likely to precipitate metallic lithium. Therefore, in order to prevent lithium precipitation, the length of the positive electrode active material portion 820 must be limited. That is, the positive electrode active material portion 820 can be formed only in the region B1 shown in the drawing, and the positive electrode active material portion 820 cannot be formed in the region B2. This results in reducing the length of the positive electrode active material portion 820 due to the negative electrode boundary portion 720B.

Meanwhile, referring to FIGS. 32 and 33, in the case of the electrode assembly 300 according to this embodiment, based on the direction perpendicular to the first direction d1, the positive electrode active material portion 520, particularly the loading reduction portion 500D, may be located in a portion corresponding to the negative electrode boundary portion 420B. Since the loading reduction portion 500D having a smaller loading amount of the positive electrode active material than the adjacent area is provided at a position corresponding to the negative electrode boundary portion 420B, the N/P ratio in the corresponding portion may be maintained high and lithium precipitation may be prevented. Accordingly, the positive electrode active material portion 520 may be formed as much as the region A1, and the region A2 in which the positive electrode active material portion 520 cannot be formed may be reduced. For example, the width of the positive electrode 500 in the height direction compared to the width of the negative electrode 400 in the height direction may be increased to 98% or more.

If the region A1 of FIGS. 32 and 33 is compared with the region B1 of FIGS. 40 and 41, in the electrode assembly 300 according to this embodiment, the length of the positive electrode active material portion may be increased as much as the loading reduction portion 500D, and thus a higher energy density may be provided in a limited space compared to the electrode assembly 600 according to the comparative example.

Another aspect of the present disclosure relates to a cylindrical battery, which includes a jelly-roll type electrode assembly having a structure in which a positive electrode, a negative electrode, and a separator interposed between the positive electrode and the negative electrode are wound in one direction: a cylindrical battery housing in which the electrode assembly is accommodated; and a battery cap serving as a sealing body disposed at the upper portion of the battery housing to seal the battery housing. Here, the positive electrode is prepared according to the present disclosure and includes single particle-based active material particles having an average particle diameter $D_{50}$ of 5 μm or less as the positive electrode active material. The cylindrical battery may further include an electrolyte, and the above description may be referred to for the electrolyte.

The electrode assembly may have a stack type, stack/folding type, or jelly-roll type structure as described above. In one specific embodiment of the present disclosure, in the electrode assembly, the positive electrode may have a loading reduction portion as described above.

In the case of a conventional cylindrical battery, current is concentrated on a strip-shaped electrode tab, resulting in great resistance, high heat generation, and poor current collection efficiency.

As the demand for high-capacity batteries increases with the recent development of electric vehicle technology, the development of bulky large-sized cylindrical batteries is required. In the case of a conventional small cylindrical battery generally used in the art, that is, a cylindrical battery having a form factor of 1865 or 2170, resistance or heat generation does not seriously affect battery performance because the capacity is small. However, when the specifications of the conventional small cylindrical battery are applied as they are to a large cylindrical battery, a serious problem may occur in battery safety.

As the size of the battery increases, the amount of heat and gas generated inside the battery also increases, and the temperature and pressure inside the battery rise due to such heat and gas, which may cause the battery to ignite or explode. In order to prevent this, heat and gas inside the battery must be properly discharged to the outside, and for this, the cross-sectional area of the battery, which serves as a passage for discharging heat to the outside of the battery, must increase to match the increase in volume. However, in general, since the increase in cross-sectional area does not reach the increase in volume, as the size of the battery increases, the amount of heat generated inside the battery increases, resulting in problems such as increased risk of explosion and reduced output. In addition, when rapid charging is performed at a high voltage, a large amount of heat is generated around the electrode tab for a short period of time, and the battery may ignite. Accordingly, the present disclosure proposes a cylindrical battery having a high safety while having a large volume to implement a high capacity.

In addition, since a high loading electrode to which the positive electrode active material in the form of single particle or pseudo-single particle is applied may be applied to the cylindrical battery, the initial resistance characteristics and charge/discharge efficiency of the cylindrical battery may be improved.

The cylindrical battery according to the present disclosure significantly reduces gas generation compared to the prior art by applying a positive electrode active material in the form of single particle or pseudo-single particle. Accordingly, even a large cylindrical battery having a form factor ratio of 0.4 or more may exhibit excellent safety.

The cylindrical battery according to the present disclosure may preferably be a battery having a tab-less structure that does not include an electrode tab, but is not limited thereto.

In the battery of the tab-less structure, for example, each of the positive electrode and the negative electrode includes an uncoated portion on which an active material layer is not formed, and may have a structure in which the positive electrode uncoated portion and the negative electrode uncoated portion are respectively located at the upper and lower ends of the electrode assembly, a collector plate is coupled to the positive electrode uncoated portion and the negative electrode uncoated portion, and the collector plate is connected to an electrode terminal.

When the cylindrical battery is formed in a tab-less structure as described above, since the concentration of current is less than that of the conventional battery equipped with an electrode tab, heat generation inside the battery may be effectively reduced, thereby improving the thermal safety of the battery.

Hereinafter, the present disclosure will be described in more detail through specific examples.

Example 1

A single particle type positive electrode active material $Li[Ni_{0.9}Co_{0.06}Mn_{0.03}Al_{0.01}]O_2$ having a unimodal particle size distribution with an average particle diameter $D_{50}$ of 3 μm; carbon nanotube: PVDF binder were mixed in N-methyl pyrrolidone at a weight ratio of 97.8:0.6:1.6 to prepare a positive electrode slurry. The positive electrode slurry was coated on one surface of an aluminum current collector sheet, dried at 120° C., and then rolled to prepare a positive electrode.

A negative electrode active material (graphite:SiO=95:5 mixture by weight):conductive material (super C), styrene-butadiene rubber (SBR):carboxymethyl cellulose (CMC) were mixed in water at a weight ratio of 96:2:1.5:0.5 to prepare a negative electrode slurry. The negative electrode slurry was coated on one surface of a copper current collector sheet, dried at 150° C., and then rolled to prepare a negative electrode.

A separator was interposed between the positive electrode and the negative electrode prepared as above, stacked in the order of separator/positive electrode/separator/negative electrode, and then wound to prepare a jelly-roll type electrode assembly. The electrode assembly prepared as described above was inserted into a cylindrical battery can, and an electrolyte was injected thereto to prepare a 4680 cell.

Comparative Example 1

A 4680 cell was manufactured in the same manner as in Example 1, except that secondary particle type $Li[Ni_{0.9}Co_{0.05}Mn_{0.04}Al_{0.01}]O_2$ having a bimodal particle size distribution with a large particle average diameter $D_{50}$ of 9 μm and a small particle average diameter $D_{50}$ of 4 μm was used as the positive electrode active material.

Experimental Example 1

A hot box test was performed on the 4680 cells manufactured by Example 1 and Comparative Example 1.

Specifically, each of the 4680 cells manufactured by Example 1 and Comparative Example 1 was placed in a hot box chamber at room temperature, heated to 130° C. at a heating rate of 5° C./min, and maintained for 30 minutes to perform a hot box evaluation, and the temperature change of the battery over time was measured. For accurate evaluation, the hot box evaluation was performed twice on the cell of Example 1. The measurement results are shown in FIGS. 29*a* and 29*b*.

Figure 29A:
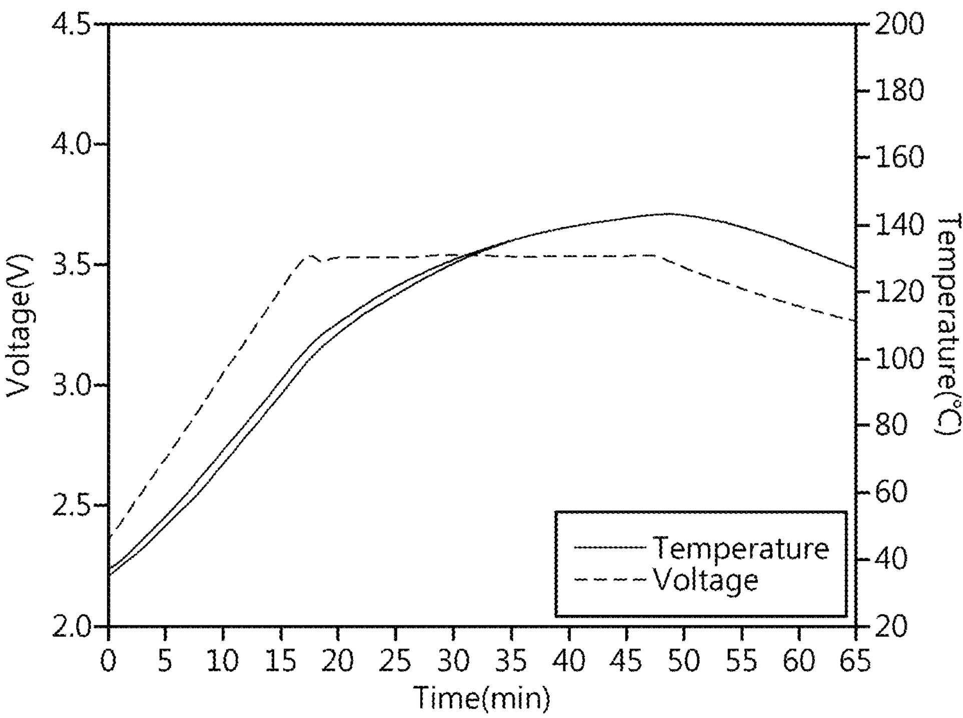
FIG. 29*a* is a graph showing a hot box test result of a 4680 cell manufactured by Example 1 of the present disclosure.
Figure 29B:
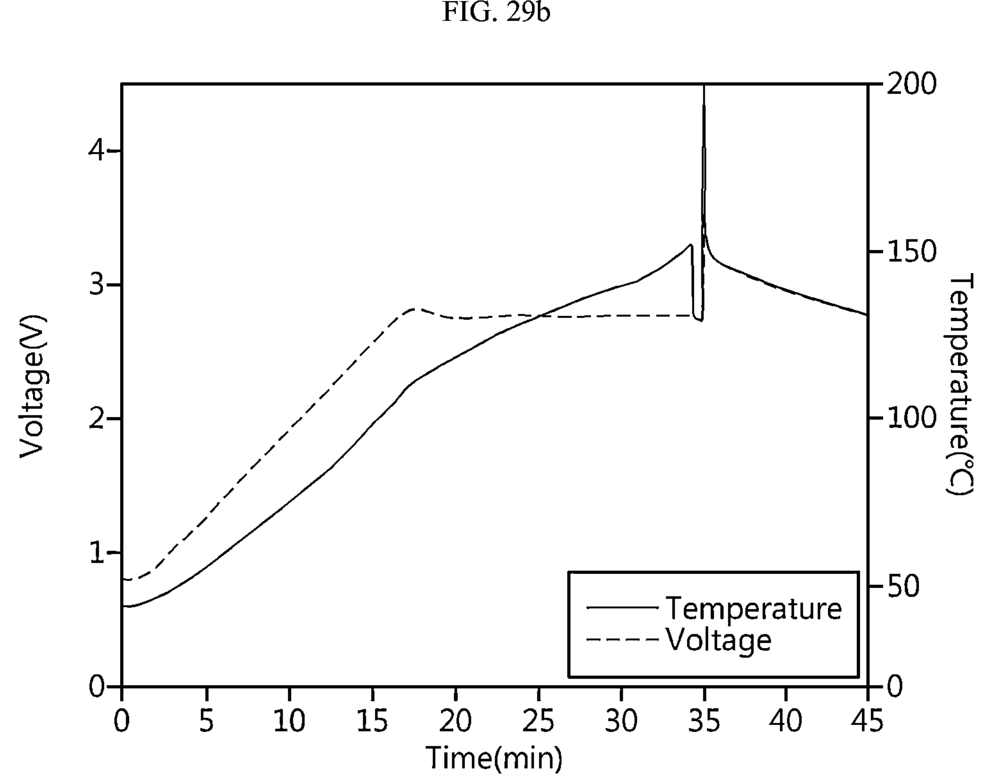
FIG. 29*b* is a graph showing a hot box test result of a 4680 cell manufactured by Comparative Example 1.

FIG. 29*a* is a graph showing a hot box test result of the 4680 cell manufactured by Example 1 of the present disclosure, and FIG. 29*b* is a graph showing a hot box test result of the 4680 cell manufactured by Comparative Example 1.

Through FIGS. 29*a* and 29*b*, it may be found that in the case of the lithium secondary battery of Example 1 using the single particle positive electrode active material, the voltage and temperature of the battery were maintained stably until 65 minutes, whereas in the lithium secondary battery of Comparative Example 1, the temperature of the battery rapidly increased after 35 minutes.

Example 2-1

Figure 28A:
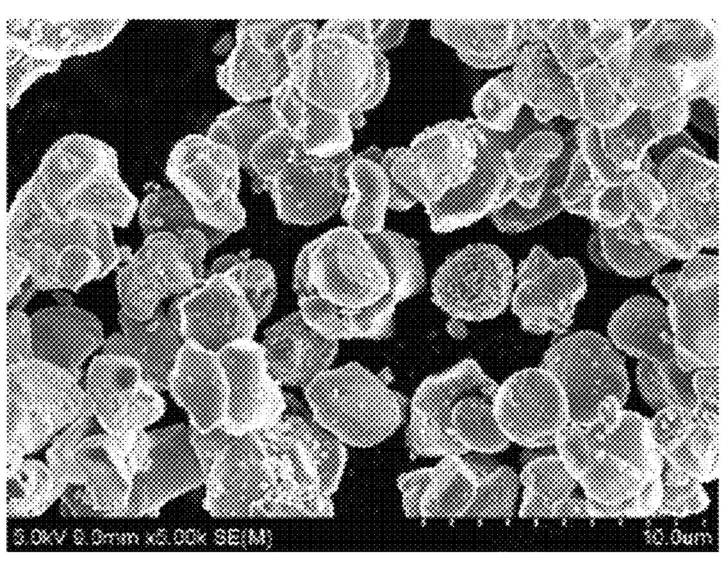
FIG. 28*a* is a SEM picture showing a positive electrode active material used in Example 2-1 of the present disclosure.

A positive electrode active material (composition: $Li[Ni_{0.9}Co_{0.06}Mn_{0.03}Al_{0.01}]O_2$), which has a unimodal particle size distribution where $D_{min}$=1.78 μm, $D_{50}$=4.23 μm, and $D_{max}$=13.1 μm and in which single particles and pseudo-single particles were mixed was prepared. FIG. 28*a* shows a SEM picture of the positive electrode active material used in Example 2-1.

The positive electrode active material:carbon nanotube: PVDF binder were mixed in N-methyl pyrrolidone at a weight ratio of 97.8:0.6:1.6 to prepare a positive electrode slurry. The positive electrode slurry was coated on one surface of an aluminum current collector sheet, dried at 120° C., and then rolled to prepare a positive electrode.

A negative electrode active material (graphite:SiO=95:5 mixture by weight):conductive material (super C):styrene-butadiene rubber (SBR):carboxymethyl cellulose (CMC) were mixed in water at a weight ratio of 96:2:1.5:0.5 to prepare a negative electrode slurry. The negative electrode slurry was coated on one surface of a copper current collector sheet, dried at 150° C., and then rolled to prepare a negative electrode.

A separator was interposed between the positive electrode and the negative electrode prepared as above, stacked in the order of separator/positive electrode/separator/negative electrode, and then wound to prepare a jelly-roll type electrode assembly. The electrode assembly prepared as described above was inserted into a battery can, and an electrolyte was injected thereto to prepare a 4680 cell.

Example 2-2

Figure 28B:
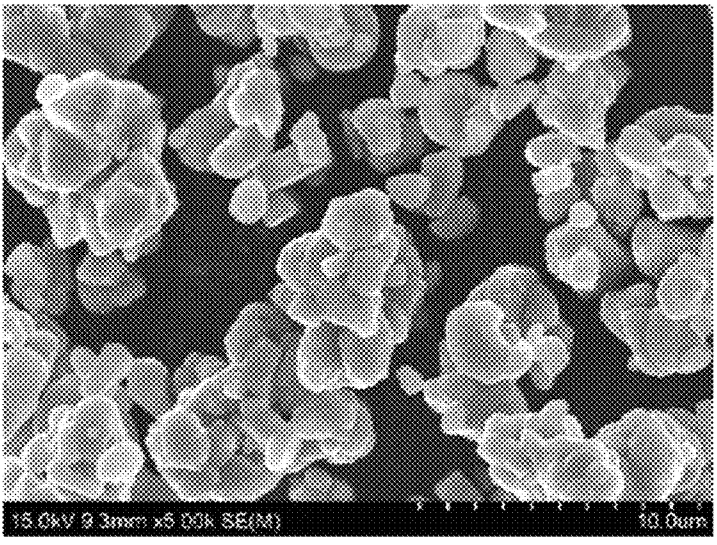
FIG. 28*b* is a SEM picture showing a positive electrode active material used in Example 2-2 of the present disclosure.

A 4680 cell was manufactured in the same manner as in Example 2-1, except that a positive electrode active material (composition: $Li[Ni_{0.9}Co_{0.06}Mn_{0.03}Al_{0.01}]O_2$), which has a unimodal particle size distribution where $D_{min}$=1.38 μm, $D_{50}$=4.69 μm, and $D_{max}$=18.5 μm and in which single particles and pseudo-single particles were mixed was used as the positive electrode active material. FIG. 28*b* shows a SEM picture of the positive electrode active material used in Example 2-2.

Comparative Example 2-1

A 4680 cell was manufactured in the same manner as in Example 2-1, except that a secondary particle type positive electrode active material (composition: $Li[Ni_{0.9}Co_{0.05}Mn_{0.04}Al_{0.01}]O_2$) having a bimodal particle size distribution with a large particle average diameter $D_{50}$ of 9 μm and a small particle average diameter $D_{50}$ of 4 μm was used as the positive electrode active material.

Comparative Example 2-2

A 4680 cell was manufactured in the same manner as in Example 2-1, except that a positive electrode active material (composition: $Li[Ni_{0.9}Co_{0.06}Mn_{0.03}Al_{0.01}]O_2$), which has a unimodal particle size distribution where $D_{min}$=0.892 μm, $D_{50}$=3.02 μm, and $D_{max}$=11 μm and in which single particles and pseudo-single particles were mixed was used as the positive electrode active material.

Figure 28C:
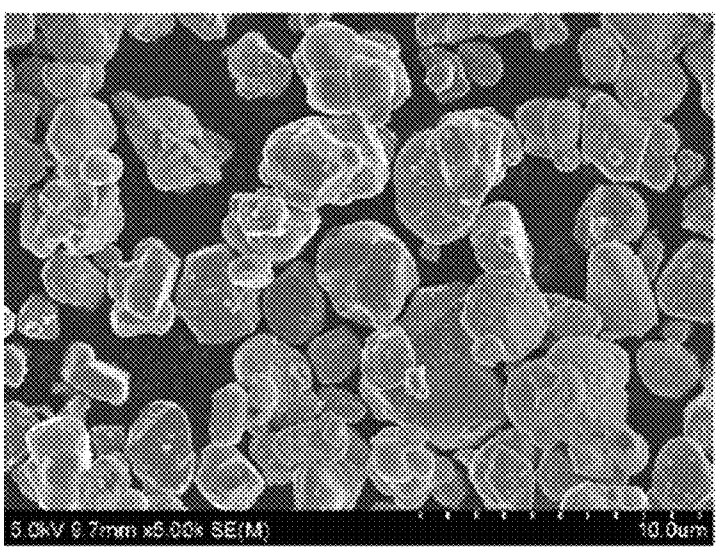
FIG. 28*c* is a SEM picture showing a positive electrode active material used in Comparative Example 2-2 of the present disclosure.

FIG. 28*c* shows a SEM picture of the positive electrode active material used in Comparative Example 2-2.

Experimental Example 2-1

A hot box test was performed on the 4680 cells manufactured by Examples 2-1 and 2-2 and Comparative Examples 2-1 and 2-2.

Specifically, each of the 4680 cells manufactured by Example 2-1 and Comparative Example 2-1 was placed in a hot box chamber at room temperature, heated up to 130° C. at a heating rate of 5° C./min, and maintained for 30 minutes, and then the temperature change of the cell was measured. A case in which thermal runaway and ignition did not occur during the test was marked as Pass, and a case in which thermal runaway and/or ignition occurred was marked as Fail. Also, for the accuracy of the test, the test was performed more than twice for the cells of Examples 2-1 and 2-2.

Figure 29C:
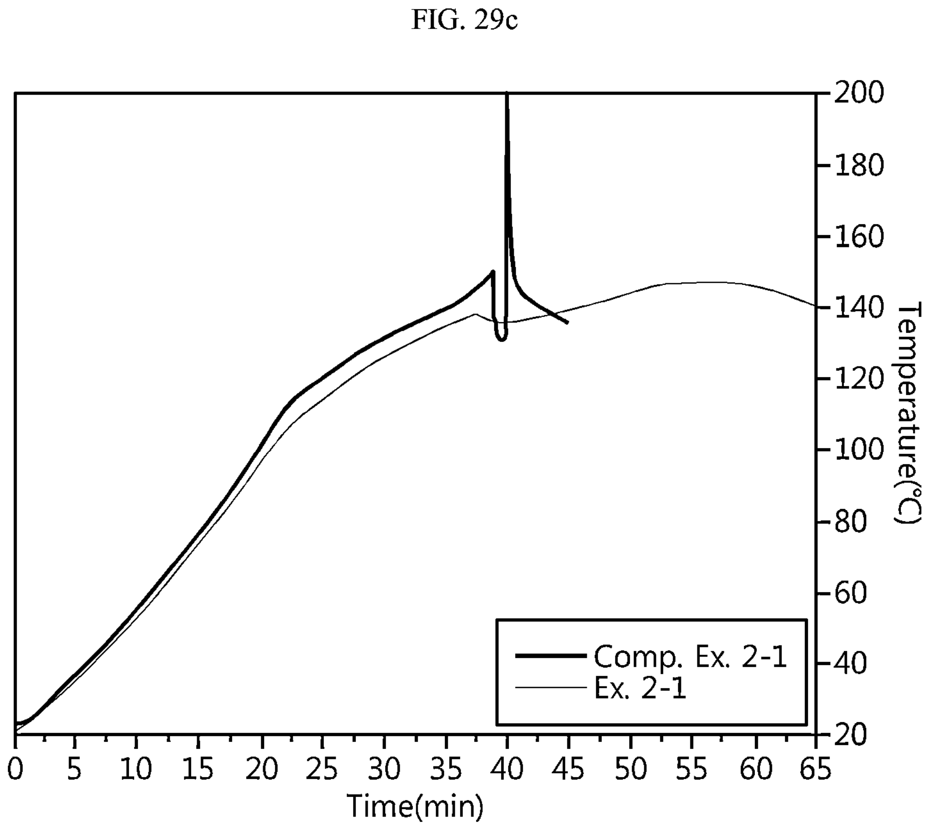
FIG. 29*c* is a graph showing hot box test results of Sample 1 of Example 2-1 of the present disclosure and a 4680 cell manufactured by Comparative Example 2-1.

Measurement results are shown in Table 1 below and FIGS. 29*c* and 29*d*. FIG. 29*c* is a graph showing hot box test results of Sample 1 of Example 2-1 and the 4680 cell manufactured by Comparative Example 2-1, and FIG. 29*d* is a graph showing hot box test results of Samples 2 and 3 of Example 2-1, Samples 1 and 2 of Example 2-2, and the 4680 cell manufactured by Comparative Example 2-2.

TABLE 1

| | Sample # | Venting time (min) | Maximum temperature (° C.) | Hot box test result |
|---|---|---|---|---|
| Example 2-1 | 1 | 16 | 139 | Pass |
| | 2 | 20.9 | 141 | Pass |
| | 3 | 23.7 | 137 | Pass |
| Example 2-2 | 1 | 16.0 | 148 | Pass |
| | 2 | 15.8 | 147 | Pass |
| Comparative Example 2-1 | 1 | 17 | not measurable | Fail |
| Comparative Example 2-2 | 1 | 16.2 | not measurable | Fail |

Figure 29D:
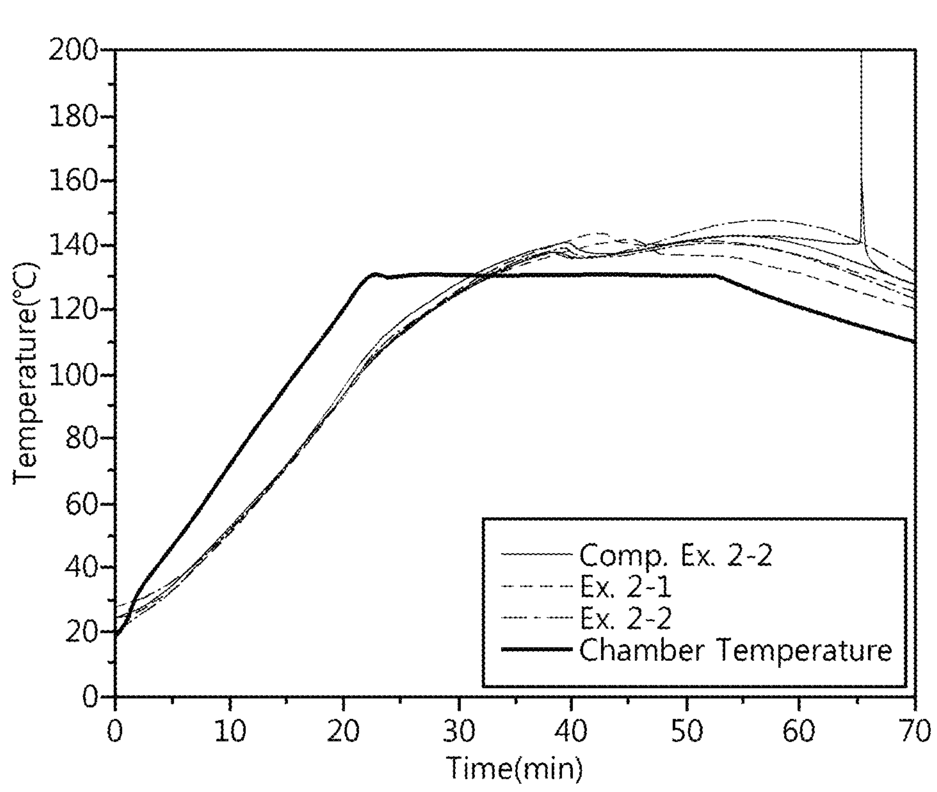
FIG. 29*d* is a graph showing hot box test results of Samples 2 and 3 of Example 2-1 of the present disclosure, Samples 1 and 2 of Example 2-2, and a 4680 cell manufactured by Comparative Example 2-2.

Referring to Table 1 and FIGS. 29*c* and 29*d*, it may be found that, in the case of the 4680 cell of Example 2-1 to which the positive electrode active material in the form of a single particle/pseudo-single particle with $D_{min}$ of 1.0 μm or more was applied, the voltage and temperature of the battery were maintained stably until 65 minutes, while in the case of the 4680 cells of Comparative Example 2-1 in which a secondary particle was applied as the positive electrode active material and Comparative Example 2-2 in which a positive electrode active material in the form of a single particle/pseudo-single particle with $D_{min}$ of less than 1.0 μm was applied, the battery temperature of the 4680 cell rapidly increased.

Experimental Example 2-2

Figure 30A:
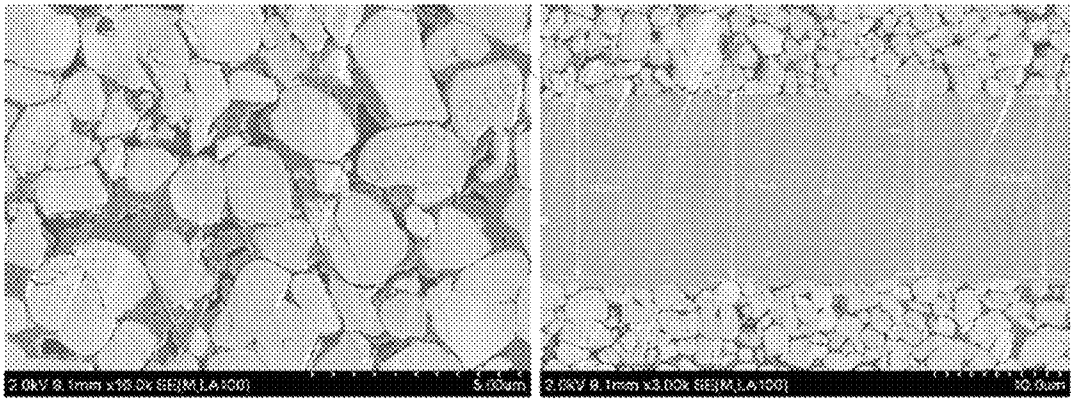
FIG. 30*a* is a cross-sectional SEM picture of the positive electrode manufactured in Example 2-1 of the present disclosure.

After rolling the positive electrodes manufactured in Example 2-1 and Comparative Example 2-1, in order to check the degree of breakage of the positive electrode active material particles, the positive electrode was cut with an ion milling device and the cross section was photographed with a SEM. FIG. 30*a* shows a cross-sectional SEM picture of the positive electrode manufactured in Example 2-1, and FIG. 30*b* shows a cross-sectional SEM picture of the positive electrode manufactured in Comparative Example 2-1.

Figure 30B:
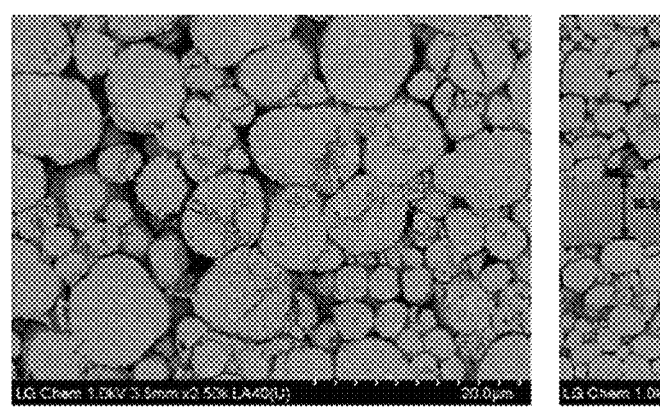
FIG. 30*b* is a cross-sectional SEM picture of the positive electrode manufactured in Comparative Example 2-1.
Figure 30B:
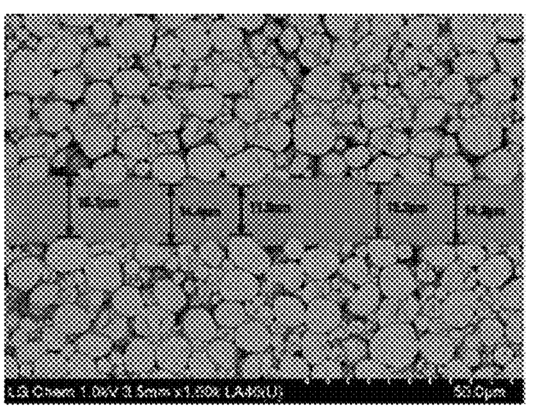

Through FIGS. 30*a* and 30*b*, the positive electrode of Example 2-1 has almost no particle breakage of the positive electrode active material even after rolling, whereas in the positive electrode of Comparative Example 2-2 using secondary particles, a number of cracks were observed in the particles of the positive electrode active material after rolling.

Example 3-1

A positive electrode active material powder (composition: $Li[Ni_{0.9}Co_{0.06}Mn_{0.03}Al_{0.01}]O_2$), which has a unimodal particle size distribution where $D_{min}$=1.78 μm, $D_{50}$=4.23 μm, $D_{max}$=13.1 μm and in which single particles and pseudo-single particles were mixed, flake graphite (SFG6L), conductive material (multi-wall carbon nanotube), and PVDF binder were mixed in N-methyl pyrrolidone at a weight ratio of 96.3:1.5:0.4:1.8 to prepare a positive electrode slurry. The positive electrode slurry was coated on one surface of an aluminum current collector sheet, dried, and rolled at a linear pressure of 3.0 ton/cm to prepare a positive electrode. The porosity of the positive electrode active material layer of the positive electrode prepared as described above was measured, and the porosity was measured to be 17.5%.

Example 3-2

A positive electrode was manufactured in the same manner as in Example 3-1, except that the positive electrode active material, flake graphite, conductive material, and binder were mixed in a weight ratio of 97.2:0.6:0.4:1.8, and the porosity of the positive electrode active material layer was measured. The porosity of the positive electrode active material layer was measured to be 19%.

Example 3-3

A positive electrode was manufactured in the same manner as in Example 3-1, except that the positive electrode active material, flake graphite, conductive material, and binder were mixed in a weight ratio of 97.4:0.4:0.4:1.8, and the porosity of the positive electrode active material layer was measured. The porosity of the positive electrode active material layer was measured to be 20%.

Example 3-4

A positive electrode was manufactured in the same manner as in Example 3-1, except that the positive electrode active material, flake graphite, conductive material, and binder were mixed in a weight ratio of 97.6:0.2:0.4:1.8, and the porosity of the positive electrode active material layer was measured. The porosity of the positive electrode active material layer was measured to be 21%.

Comparative Example 3-1

A positive electrode was prepared in the same manner as in Example 3-1, except that the positive electrode slurry was prepared by mixing the positive electrode active material, conductive material, and binder in N-methyl pyrrolidone at a weight ratio of 97.8:0.4:1.8 without adding flake graphite, and the porosity of the positive electrode active material layer was measured. The porosity of the positive electrode active material layer was measured to be 24%.

Comparative Example 3-2

A positive electrode was manufactured in the same manner as in Example 3-1 except that the positive electrode active material, conductive material, and binder were mixed in N-methyl pyrrolidone at a weight ratio of 97.8:0.4:1.8 to prepare a positive electrode slurry, and rolled at a line pressure of 2.0 ton/cm without adding flake graphite, and the porosity of the positive electrode active material layer was measured. The porosity of the positive electrode active material layer was measured to be 30%.

Experimental Example 3-1—Measurement of Charge/Discharge Capacity and Charge/Discharge Efficiency Coin half-cells including the positive electrodes according to Examples 3-1 to 3-4 and Comparative Examples 3-1 and 3-2 were manufactured, charged up to 4.25V under a 0.2 C current condition, and then discharged to 2.5V under a 0.2 C current condition, and the charge capacity (mAh/g) and discharge capacity (mAh/g) of each coin half-cell were measured. The measurement results are shown in Table 2 below.

TABLE 2

| | Add amount of flake graphite (wt %) | Porosity (%) | Charging capacity (mAh/g) | Discharging capacity (mAh/g) | Efficiency (%) |
|---|---|---|---|---|---|
| Example 3-1 | 1.5 | 17.5 | 230.3 | 209.3 | 90.9 |
| Example 3-2 | 0.6 | 19 | 229.4 | 206.9 | 90.2 |
| Example 3-3 | 0.4 | 20 | 230.4 | 207.3 | 90.0 |
| Example 3-4 | 0.2 | 21 | 229.1 | 205.5 | 89.7 |
| Comparative Example 3-1 | 0 | 24 | 229.1 | 204.2 | 89.1 |
| Comparative Example 3-2 | 0 | 30 | 225.4 | 199.7 | 88.6 |

Through Table 2, it may be found that Examples 3-1 to 3-4 using an positive electrode to which flake graphite is added shows lower porosity and excellent capacity characteristics compared to Comparative Examples 3-1 to 3-2.

Experimental Example 3-2—Check Resistance Characteristics

While charging the coin half-cells including the positive electrodes according to Example 3-3, Comparative Example 3-1, and Comparative Example 3-2 to 4.2V, resistance characteristics according to SOC were measured. The experimental results are shown in FIG. 31*a*.

Figure 31A:
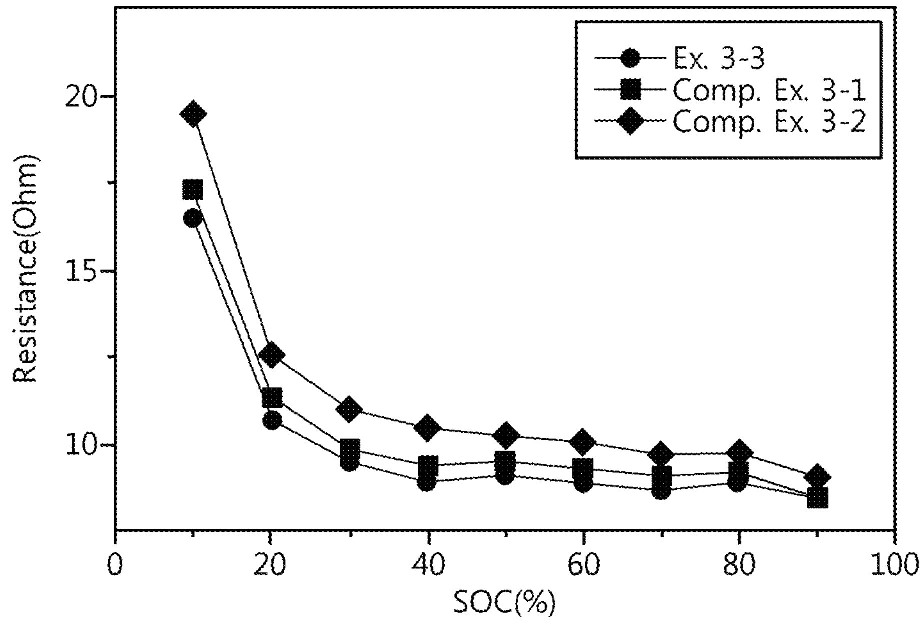
FIG. 31*a* is a graph showing the results of measuring resistance characteristics according to SOC while charging a coin half-cell including a positive electrode according to Example 3-3 of the present disclosure, Comparative Example 3-1 and Comparative Example 3-2 to 4.2V.

Referring to FIG. 31*a*, it may be found that the resistance value of Example 3-3, in which flake graphite is added to the positive electrode active material layer, is lower than those of Comparative Example 3-1 and Comparative Example 3-2, which do not include flake graphite, based on SOC 10%. This shows that when flake graphite is added to the positive electrode active material layer, resistance characteristics at low SOC are improved.

Experimental Example 3-3—Measurement of High-Temperature Life Characteristics and Resistance Increase Rate A separator was interposed between the positive electrode and the negative electrode according to Example 3-1, Example 3-3, and Comparative Example 3-1, and stacked in the order of separator/positive electrode/separator/negative electrode, and then wound to prepare a jelly-roll type electrode assembly. The electrode assembly prepared as described above was inserted into a cylindrical battery can, and then an electrolyte was injected thereto to manufacture a 4680 cell.

At this time, a negative electrode active material (graphite:SiO=95:5 mixture by weight):conductive material (super C):styrene-butadiene rubber (SBR):carboxymethyl cellulose (CMC) were mixed in water at a weight ratio of 96:2:1.5:0.5 to prepare a negative electrode slurry, and then the negative electrode slurry was coated on to one surface of a copper current collector sheet, dried at 150° C., and then rolled to prepare a negative electrode.

Based on one cycle in which the 4680 cell prepared as described above was charged to 4.2V at 40° C. at 0.5 C and then discharged to 2.5V at 0.5 C, 50 cycles of charge and discharge were performed, and then capacity retention and resistance increase rate (DCIR increase) were measured. The measurement results are shown in FIG. 31*b*.

Figure 31B:
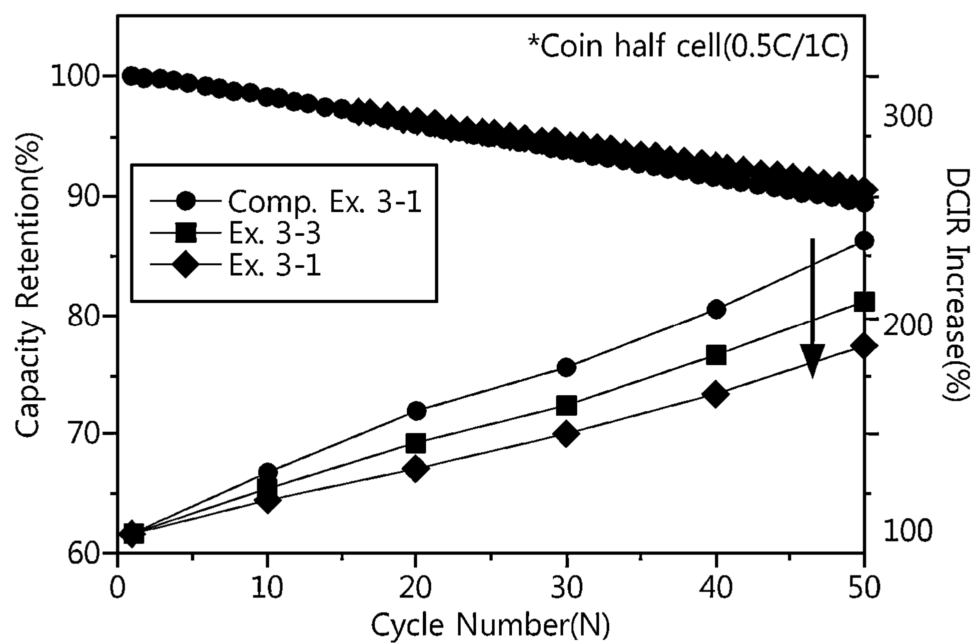
FIG. 31*b* is a graph showing the measurement result of capacity retention and resistance increase (DCIR increase) obtained through a charge/discharge cycle experiment for a 4680 cell according to Example 3-1 and Example 3-3 of the present disclosure, and Comparative Example 3-1.

Referring to FIG. 31*b*, in the case of the secondary batteries of Examples 3-1 and 3-3, it is shown that the change in capacity retention according to the number of cycles is smaller than that of the secondary battery of Comparative Example 3-1, and the change in resistance increase rate according to the number of cycles is also small.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A cylindrical battery, comprising:

an electrode assembly including a first electrode tab and a second electrode tab;

a battery housing configured to accommodate the electrode assembly through an open portion formed in a first side of the battery housing;

a first current collecting plate having a support portion disposed on a first surface of the electrode assembly, at least one tab coupling portion extending from the support portion and coupled to the first electrode tab, and at least one housing coupling portion extending from an end of the at least one tab coupling portion and coupled to an inner surface of the battery housing, the first current collecting plate being located within the battery housing;

a cap plate configured to cover the open portion of the battery housing;

a battery terminal electrically connected to the second electrode tab; and a sealing spacer configured to prevent movement of the electrode assembly and to enhance a sealing force of the battery housing.

2. The cylindrical battery according to claim 1, wherein the battery housing includes a beading portion formed at an end adjacent to the open portion and inwardly press-fitted, and wherein the at least one housing coupling portion is coupled to the beading portion.

3. The cylindrical battery according to claim 1, wherein the battery housing includes a beading portion formed at an end adjacent to the open portion and inwardly press-fitted, and wherein the at least one housing coupling portion includes:

a contact portion coupled to the beading portion; and a connection portion for connecting the at least one tab coupling portion and the contact portion.

4. The cylindrical battery according to claim 3, further comprising:

a sealing gasket provided between the battery housing and the cap plate.

5. The cylindrical battery according to claim 4, wherein the contact portion is interposed and fixed between the beading portion and the sealing gasket.

6. The cylindrical battery according to claim 3, wherein a welding portion is formed between the beading portion and the contact portion of the current collecting plate.

7. The cylindrical battery according to claim 1, wherein the battery housing includes a beading portion formed at an end adjacent to the open portion and inwardly press-fitted, and wherein a boundary portion of the at least one tab coupling portion and the at least one housing coupling portion is located inwardly of an innermost part of the beading portion.

8. The cylindrical battery according to claim 1, wherein the at least one tab coupling portion is a plurality of tab coupling portions and the at least one housing coupling portion is a plurality of housing coupling portions.

9. The cylindrical battery according to claim 3, wherein the connection portion includes at least one bending portion in which an extension direction is changed.

10. The cylindrical battery according to claim 3, wherein the contact portion has an arc shape extending along the beading portion.

11. The cylindrical battery according to claim 10, wherein the connection portion has an arc shape extending along the contact portion.

12. The cylindrical battery according to claim 1, wherein the sealing spacer includes:

a movement preventer interposed between the first current collecting plate and the cap plate;

a sealing portion interposed between the battery housing and the cap plate; and a connection portion configured to connect the movement preventer and the sealing portion.

13. The cylindrical battery according to claim 12, wherein the movement preventer has a height corresponding to a distance between the first current collecting plate and the cap plate.

14. The cylindrical battery according to claim 12, wherein the movement preventer is located at a center on the first surface of the electrode assembly.

15. The cylindrical battery according to claim 12, wherein the movement preventer has a spacer hole aligned with a winding center hole of the electrode assembly.

16. The cylindrical battery according to claim 12, wherein the sealing portion extends along a periphery of an inner circumference of the battery housing.

17. The cylindrical battery according to claim 12, wherein the connection portion includes a plurality of extension legs extending radially from the movement preventer.

18. The cylindrical battery according to claim 17, wherein the plurality of extension legs are configured not to contact the first current collecting plate.

19. The cylindrical battery according to claim 17, wherein the plurality of extension legs are configured not to contact the cap plate.

20. The cylindrical battery according to claim 12, wherein the connection portion is positioned not to overlap with the at least one housing coupling portion along a height direction of the cylindrical battery.

21. The cylindrical battery according to claim 1, wherein the cylindrical battery includes:

a second current collecting plate coupled with the second electrode tab; and an insulator interposed between a closed portion formed at an upper end of the battery housing and the second current collecting plate.

22. The cylindrical battery according to claim 21, wherein the insulator has a height corresponding to a distance between the second current collecting plate and the closed portion.

23. A battery pack, comprising the cylindrical battery according to claim 1.

24. A vehicle, comprising the battery pack according to claim 23.

* * * * *